(12) United States Patent
Teraguchi et al.

(10) Patent No.: US 11,872,915 B2
(45) Date of Patent: Jan. 16, 2024

(54) VEHICLE SEAT RECLINING DEVICE

(71) Applicant: TOYOTA BOSHOKU KABUSHIKI KAISHA, Aichi-ken (JP)

(72) Inventors: Hiroaki Teraguchi, Aichi (JP); Takeshi Nishiura, Aichi (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/780,583

(22) PCT Filed: Nov. 27, 2020

(86) PCT No.: PCT/JP2020/044358
§ 371 (c)(1),
(2) Date: May 27, 2022

(87) PCT Pub. No.: WO2021/107138
PCT Pub. Date: Jun. 3, 2021

(65) Prior Publication Data
US 2023/0001828 A1 Jan. 5, 2023

(30) Foreign Application Priority Data
Nov. 28, 2019 (JP) .................................. 2019-215013

(51) Int. Cl.
*B60N 2/235* (2006.01)
(52) U.S. Cl.
CPC .................................. *B60N 2/2356* (2013.01)
(58) Field of Classification Search
CPC .................................................... B60N 2/2356
See application file for complete search history.

(56) References Cited

U.S. PATENT DOCUMENTS

2013/0026808 A1 1/2013 Uramichi et al.
2014/0077537 A1 3/2014 Higashi et al.
(Continued)

FOREIGN PATENT DOCUMENTS

CN 112339625 A * 2/2021 ........... B60N 2/2245
DE 102019104712 A1 * 8/2020 ........... B60N 2/2356
(Continued)

OTHER PUBLICATIONS

International Search Report in WIPO Patent Application No. PCT/JP2020/044358, dated Feb. 16, 2021, along with an English translation thereof.
(Continued)

*Primary Examiner* — Timothy J Brindley
(74) *Attorney, Agent, or Firm* — Greenblum & Bernstein, P.L.C.

(57) ABSTRACT

A vehicle seat reclining device includes a ratchet and a guide assembled to be rotatable, a plurality of pawls that are supported by a pair of guide walls provided on the guide, mesh with the ratchet, and are arranged in the relative rotation direction and restrict relative rotation between the ratchet and the guide, and a cam that moves the pawls outward. One of the pawls is a main pawl having a rattle preventing structure. The main pawl includes a bulging portion configured to abut against the pressing portion. Each of the pawls other than the main pawl do not have a bulging portion corresponding to the bulging portion of the main pawl.

4 Claims, 37 Drawing Sheets

(56) References Cited

U.S. PATENT DOCUMENTS

| | | | |
|---|---|---|---|
| 2014/0077562 A1* | 3/2014 | Higashi | B60N 2/2356 297/367 R |
| 2014/0125105 A1* | 5/2014 | Yamada | B60N 2/235 297/354.12 |
| 2014/0225409 A1 | 8/2014 | Nagura et al. | |
| 2015/0035339 A1 | 2/2015 | Endou et al. | |
| 2017/0334321 A1 | 11/2017 | Suzuki et al. | |
| 2018/0009340 A1 | 1/2018 | Nagura et al. | |
| 2018/0029506 A1 | 2/2018 | Maeda et al. | |
| 2019/0299821 A1 | 10/2019 | Maeda et al. | |
| 2021/0237624 A1 | 8/2021 | Teraguchi et al. | |

FOREIGN PATENT DOCUMENTS

| | | | |
|---|---|---|---|
| JP | 2004-147811 A | | 5/2004 |
| JP | 2010-207374 A | | 9/2010 |
| JP | 2012-176198 A | | 9/2012 |
| JP | 2014-058244 A | | 4/2014 |
| JP | 2014-058246 A | | 4/2014 |
| JP | 2014-217662 A | | 11/2014 |
| JP | 2015-29635 A | | 2/2015 |
| JP | 2015-227071 A | | 12/2015 |
| JP | 2016-215999 A | | 12/2016 |
| JP | 2017-210022 A | | 11/2017 |
| JP | 2019-041962 A | | 3/2019 |
| JP | 2019-147417 A | | 9/2019 |
| JP | 2019-196084 A | | 11/2019 |
| KR | 101417505 B1 | * | 7/2014 |
| KR | 101693177 B1 | * | 1/2017 |
| KR | 20200040106 A | * | 4/2020 |
| WO | WO-2012117772 A1 | * | 9/2012 ........... B60N 2/2356 |
| WO | WO2016/129423 A1 | | 8/2016 |

OTHER PUBLICATIONS

Written Opinion in WIPO Patent Application No. PCT/JP2020/044358, dated Feb. 16, 2021.

Chinese Office Action in Application No. CN 202080082271.X, dated Apr. 1, 2023 (with English Translation).

Japanese Office Action in Application No. JP 2019-215013, dated Apr. 4, 2023 (with English Translation).

Japanese Office Action in counterpart application No. JP 2019-215013, dated Aug. 29, 2023 (and English translation thereof).

Chinese Office Action in counterpart Chinese application No. 202080082271.X, dated Oct. 17, 2023 (and English translation.

* cited by examiner

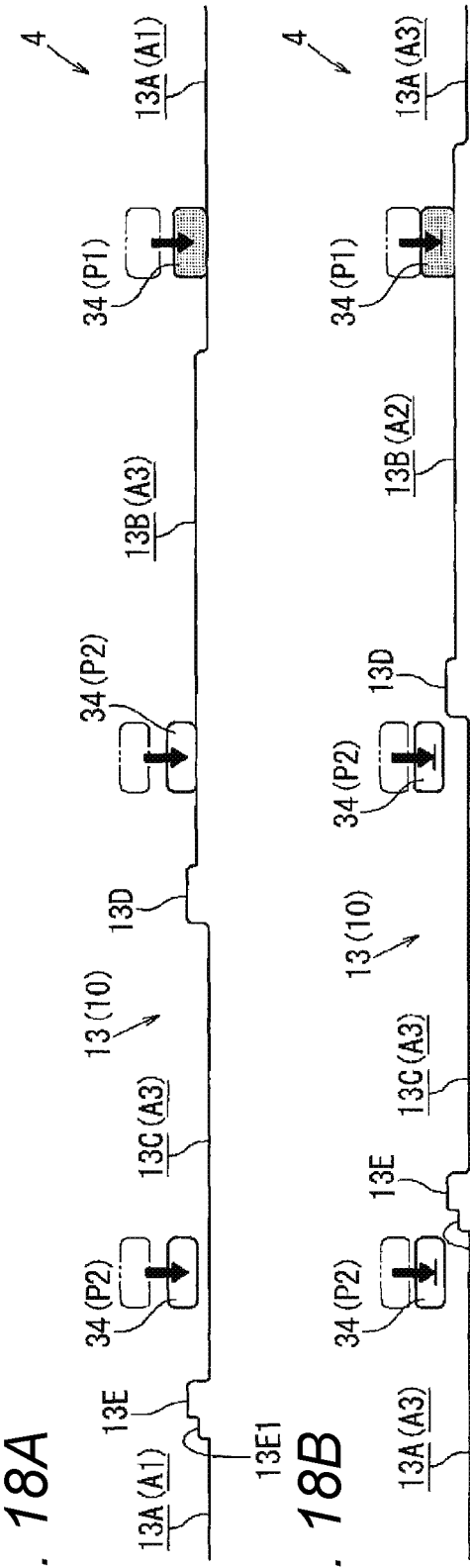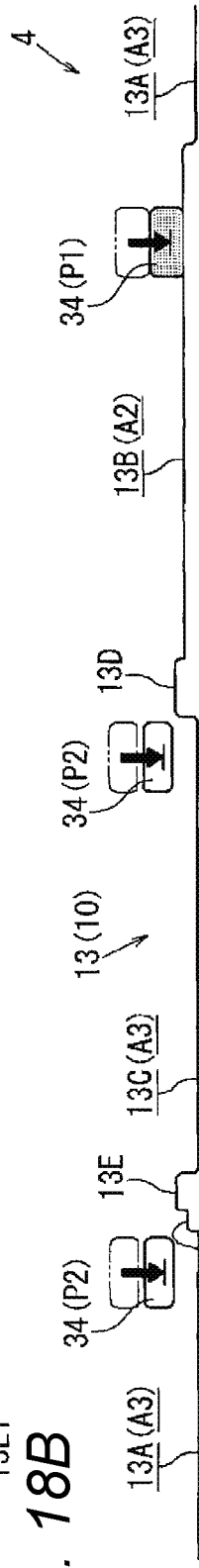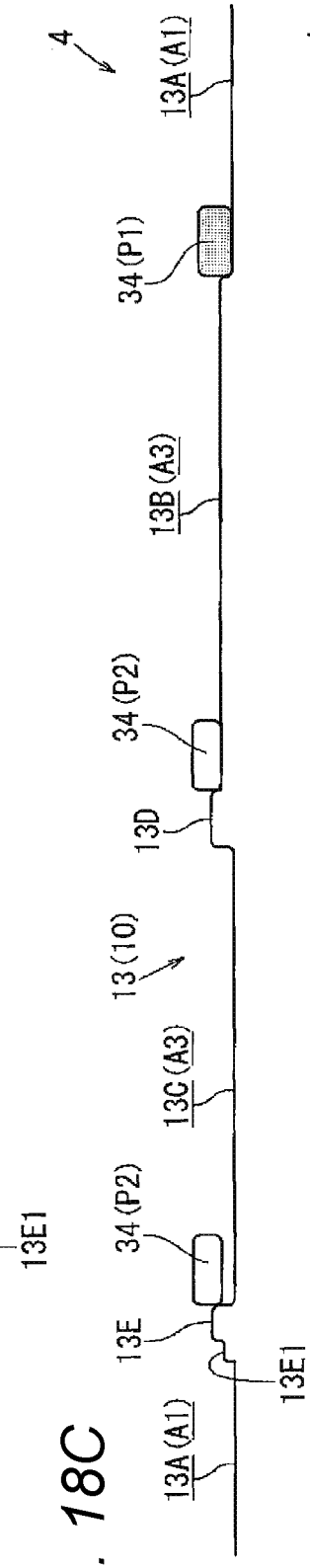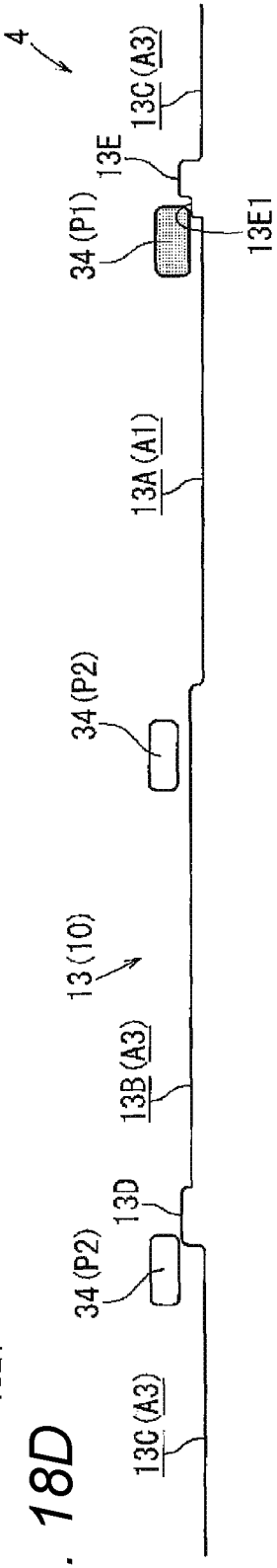

ized by a constant pitch angle (Patent Literature 1). The
VEHICLE SEAT RECLINING DEVICE

TECHNICAL FIELD

The present invention relates to a vehicle seat reclining device. Specifically, the present invention relates to a vehicle seat reclining device that adjusts an inclination angle of a seat back.

BACKGROUND ART

A known vehicle seat reclining device includes a stepped lock mechanism capable of adjusting a backrest angle of a seat back by a constant pitch angle (Patent Literature 1). The vehicle seat reclining device is a joint device that couples the seat back to a seal cushion such that the backrest angle is adjustable. Specifically, the vehicle seat reclining device includes a ratchet and a guide that are formed by substantially disk-shaped metal members assembled to be rotatable relative to each other, and a lock mechanism that locks relative rotation between the ratchet and the guide.

The lock mechanism is configured such that a plurality of pawls set on the guide are biased against inner circumferential teeth formed on an outer circumferential portion of the ratchet and thereby being pressed against and meshed with the inner circumferential teeth, thereby locking the relative rotation between the ratchet and the guide. Each of the pawls is supported by the guide from both sides in a rotation direction and is guided to be movable only inward and outward in a radial direction.

CITATION LIST

Patent Literature

Patent Literature 1: WO2016/129423

SUMMARY OF INVENTION

Technical Problem

In order to ensure sliding performance of each pawl, it is necessary to set a slight gap in the rotation direction between each pawl and each guide wall of the guide that supports the pawl from both sides in the rotation direction. However, when the gap is large, a posture of each pawl may be unstable (that is, so-called "rattling" occurs) due to inclination of each pawl between the guide walls of the pawls. One object of the present invention is to provide a vehicle seat reclining device capable of ensuring sliding performance of a pawl and preventing rattling at the same time.

Solution to Problem

[1] In a first aspect of the present invention, there is provided a vehicle seat reclining device.
The vehicle seat reclining device includes:
a ratchet and a guide assembled in an axial direction to be rotatable relative to each other;
a plurality of pawls that are supported from both sides in a rotation direction by a pair of guide walls provided on the guide, mesh with the ratchet by movement of being pushed outward in a radial direction, and are arranged in the rotation direction that restrict relative rotation between the ratchet and the guide; and
a cam that pushes and moves the plurality of pawls outward from an inner side in the radial direction, in which
one of the plurality of pawls
is a main pawl having a rattle preventing structure that reduces rattling in the rotation direction by bringing the pawl into contact with both of the pair of guide walls by being pushed and moved by the cam, and
at least one of the main pawl and the pressing portion of the cam that presses the main pawl from the inner side in the radial direction
includes bulging portions having a shape in which surfaces of the main pawl and the pressing portion that abut against the other side bulge toward the other side so that the main pawl is largely pushed outward in the radial direction more than another pawl.

According to the first aspect, the main pawl having a rattle preventing structure in the rotation direction can be meshed with the ratchet by the bulging portions before the another pawl. Therefore, even if a gap for ensuring sliding performance is provided between the pawl and the guide wall, the pawl can be meshed with the ratchet in a state where rattling is appropriately reduced.

[2] In a second aspect of the present invention according to the first aspect,
the main pawl
is pushed out such that outer teeth of the main pawl enter inner teeth of the ratchet by the bulging portions before the another pawl.

According to the second aspect, the main pawl can be more reliably meshed with the ratchet.

[3] In a third aspect of the present invention according to the first or second aspect,
the main pawl
has a structure in which the main pawl is inclined in the rotation direction between the pair of guide walls so that the main pawl contacts both of the pair of guide walls when the main pawl is pressed from the inner side in the radial direction as a rattle prevention structure.

According to the third aspect, even when the main pawl has a structure in which the rattling is hardly reduced other the another pawl meshes with the ratchet, the main pawl can be meshed with the ratchet in a state where the rattling is appropriately reduced.

[4] In a fourth aspect of the present invention according to any one of the first to third aspects,
the bulging portions
are provided on both the main pawl and the pressing portion.

According to the fourth aspect, sizes of the bulging portions formed on the main pawl and the pressing portion, respectively, can be reduced as compared with a configuration in which the bulging portion is formed on only one of the main pawl and the pressing portion. Accordingly, it is possible to prevent each basic structure from being largely broken, and it is possible to prevent problems such as a decrease in strength from occurring.

BRIEF DESCRIPTION OF DRAWINGS

FIGS. 18A to 18D are schematic views showing a positional relation between a ride-up protrusion of each pawl and a protruding portion of the ratchet in FIGS. 17A to 17D.

DESCRIPTION OF EMBODIMENTS

Figure 1:
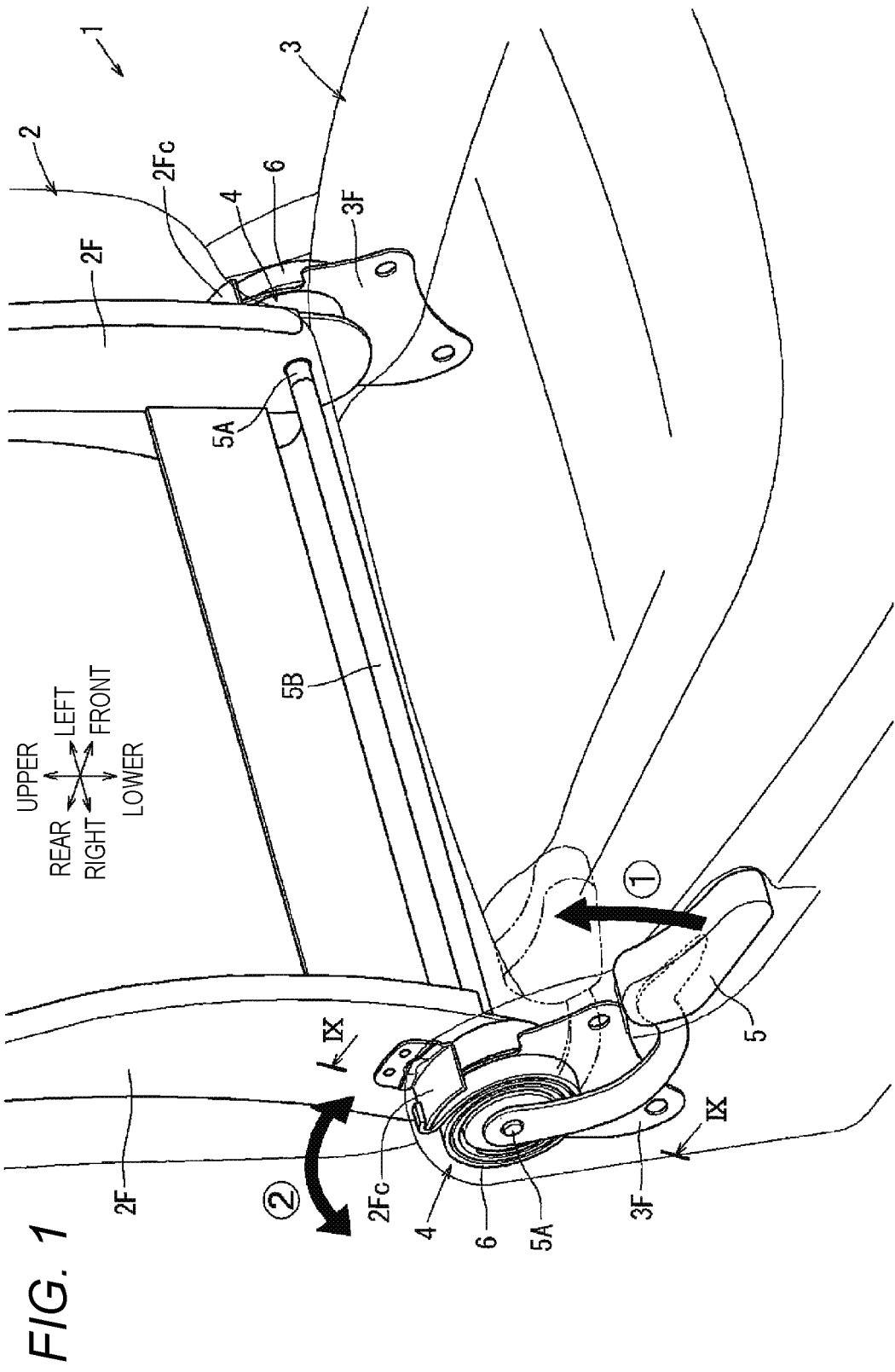
FIG. 1 is a perspective view showing a schematic configuration of a vehicle seat to which a vehicle seat reclining device according to a first embodiment is applied.

Embodiments of the present invention will be described below with reference to the drawings.

First Embodiment

Schematic Configuration of Seat Reclining Device 4 (Vehicle Seat Reclining Device)

First, the configuration of the seat reclining device 4 according to the first embodiment of the present invention will be described with reference to FIGS. 1 to 37. In the following description, directions such as front, rear, upper, lower, left, and right directions, indicate directions shown in the drawings. A term "seat width direction" refers to a left-right direction of a seat 1 to be described later.

As shown in FIG. 1, the seat reclining device 4 of the present embodiment is applied to the seat 1 forming a right seat of an automobile. The seat reclining device 4 is configured as a reclining adjustment mechanism that couples a seat back 2 forming a backrest portion of the seat 1 to a seat cushion 3 forming a seating portion so that an angle is adjustable. Specifically, a pair of left and right seat reclining devices 4 are provided between the seat back 2 and the seat cushion 3. The seat reclining devices 4 are configured to fix and release a backrest angle of the seat back 2 by being switched together between locked and unlocked states.

Figure 2:
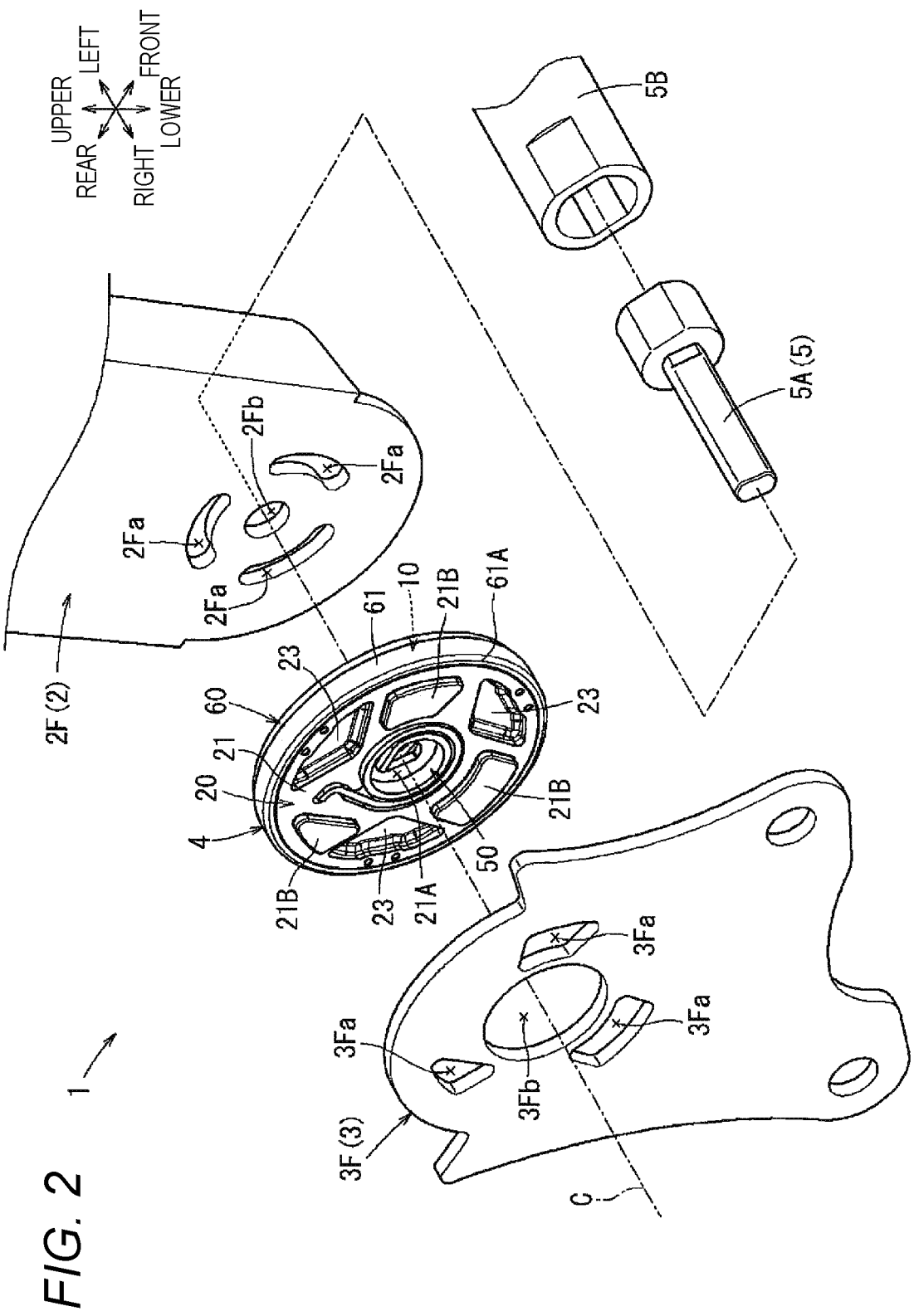
FIG. 2 is an exploded perspective view showing main parts of FIG. 1.
Figure 3:
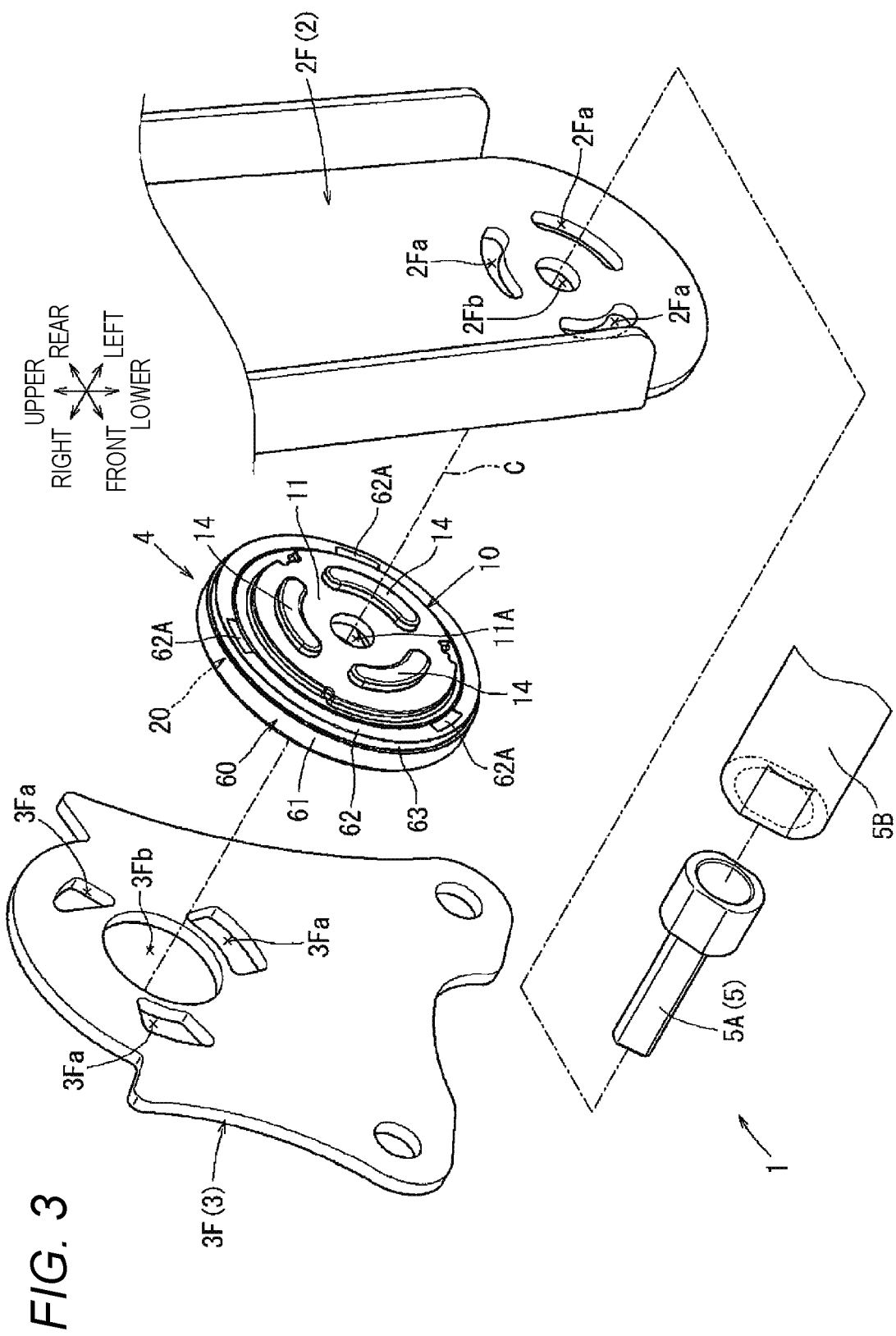
FIG. 3 is an exploded perspective view as viewed from a side opposite to that of FIG. 2.

Specifically, as shown in FIGS. 2 and 3, the seat reclining devices 4 are respectively interposed between lower end portions of side frames 2F forming left and right side frames of the seat back 2 and reclining plates 3F coupled to rear end portions of left and right side frames of the seat cushion 3 that are positioned on outer sides of the side frames 2F in the seat width direction. The seat reclining devices 4 are coupled to the lower end portions of the side frames 2F and the reclining plates 3F in a state of being rotatable relative to each other or prevented from rotating about the same axis.

As shown in FIG. 1, the seat reclining devices 4 are normally held in the locked state in which the backrest angle of the seat back 2 is fixed. The seat reclining devices 4 are released from the locked state together by an operation (circled number 1 of FIG. 1) of a user pulling up a reclining lever 5 provided on a side portion on a vehicle outer side (right side) of the seat cushion 3. Accordingly, the seat reclining devices 4 are switched to the unlocked state in which the backrest angle of the seat back 2 is adjustable in a seat front-rear direction. When an operation of the reclining lever 5 is returned, the seat reclining devices 4 are biased and returned to the locked state.

Return springs 6 that apply spring biasing forces in a direction in which the seat back 2 is tilted forward and rotated are respectively hooked between the left and right side frames 2F of the seat back 2 and the reclining plates 3F positioned on the outer sides of the side frames 2F. By rotational biasing forces of the return springs 6, a fixed state of the backrest angle by the seat reclining devices 4 is released, so that the seat back 2 is raised to a position where the seat back 2 abuts against a back of a seated occupant.

Figure 21:
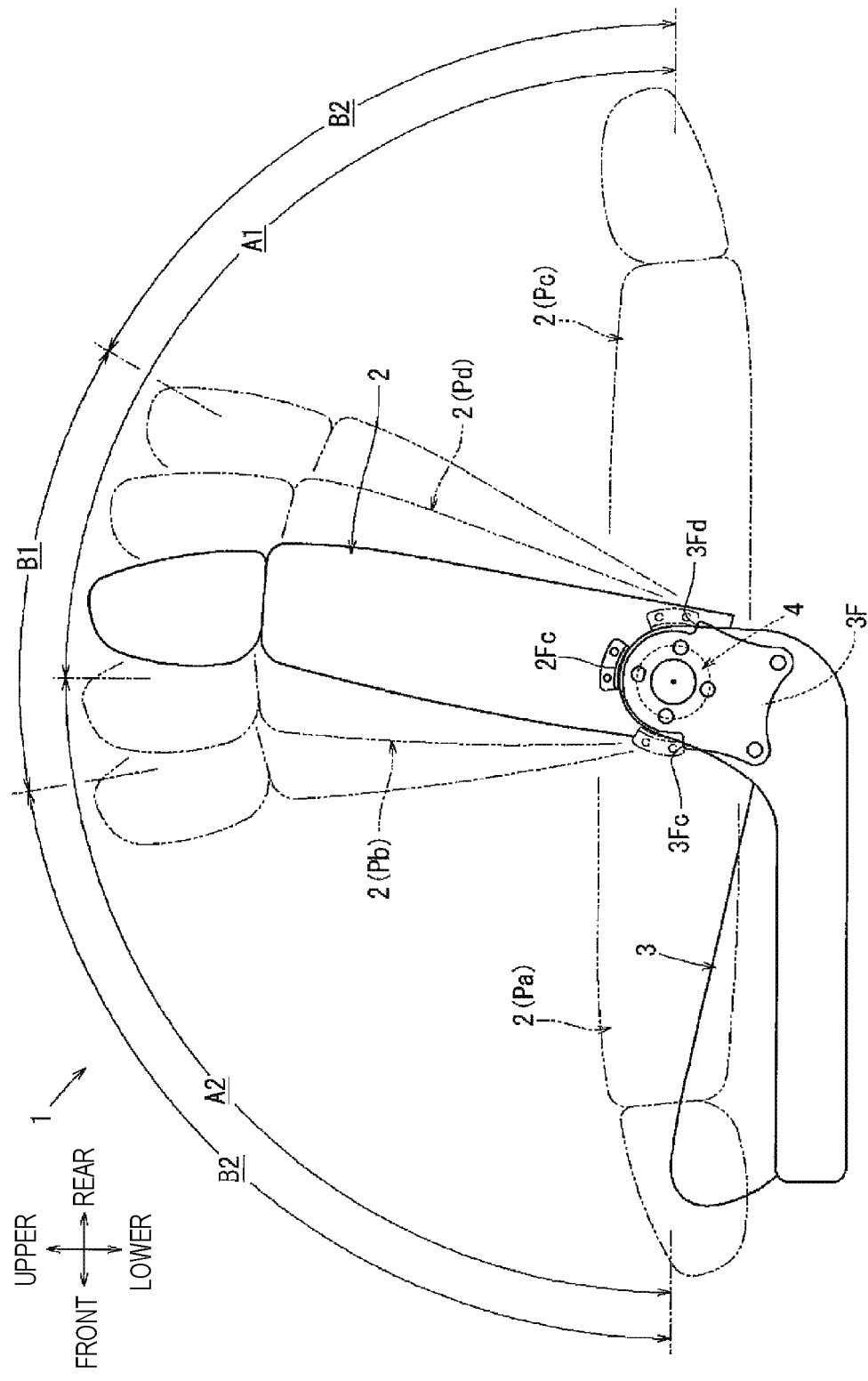
FIG. 21 is a side view showing an angle adjustment range of a seat back.

Then, the backrest angle of the seat back 2 is freely adjusted in the front-rear direction according to movement (circled number 2 in FIG. 1) in which the back of the seated occupant is tilted in the front-rear direction. Thus, the backrest angle of the seat back 2 can be easily adjusted by providing the return springs 6 that apply the biasing forces in a forward rotation direction to the seat back 2. Specifically, as shown in FIG. 21, the seat back 2 can be rotated in the seat front-rear direction in a rotation region of about 180 degrees between a forward tilt position Pa at Which the seat back 2 is folded on an upper surface of the seat cushion 3 and a rearward tilt position Pc at which the seat back 2 is tilted rearward substantially horizontally.

A structure for locking the seat back 2 to the forward tilt position Pa is a structure in which locking plates 2Fc, which are coupled to outer surface portions of the side frames 2F of the seat back 2, are abutted against front stoppers 3Fc protruding from front edge portions of the reclining plates 3F and locked to the front stoppers 3Fc. A structure for locking the seat back 2 to the rearward tilted position Pc is a structure in which the locking plates 2Fc, which are coupled to the outer surface portions of the side frames 2F of the seat back 2, are abutted against rear stoppers 3Fd protruding from rear edge portions of the reclining plates 3F and locked to the rear stoppers 3Fd.

Here, in the above-described rotation region of the seat back 2, a rotation region of about 90 degrees from an initial lock position Pb, in which the seat back 2 is at a backrest angle of standing substantially vertically, to the rearward tilted position Pc is set as a "lock region A1", in which the backrest angle of the seat back 2 is returned to the fixed state by releasing an operation of pulling up the reclining lever 5. A rotation region of about 90 degrees from a position in which the backrest angle of the seat back 2 is at the initial lock position Pb to the forward tilted position Pa is set as a "free region A2", in which the angle of the seat back 2 is not fixed but held in a released state (state in which the lock is disabled) even when the operation of pulling up the reclining lever 5 is released.

The lock region A1 and the free region A2 are configured with functions of the seat reclining device 4, which will be described later. By setting the free region A2, when the reclining lever 5 is operated and the seat back 2 is tilted forward to a position where the seat back 2 enters the free region A2 in a state in which no person is seated in the seat 1, the seat back 2 is naturally tilted to the forward tilt position Pa even when the operation of the reclining lever 5 is not continued.

Specifically, as shown in FIGS. 2 and 3, the seat reclining device 4 above includes a ratchet 10 (see FIG. 2) integrally coupled to the outer surface portion of the side frame 2F on each side of the seat back 2, and a guide 20 (see FIG. 3) integrally coupled to an inner surface portion of the reclining plate 3F on each side. The seat reclining device 4 fixes and releases the backrest angle of the seat back 2 by being switched such that relative rotation between the ratchet 10 and the guide 20 is locked and released.

<Configuration of Each Part of Seat Reclining Device 4>

Hereinafter, the configuration of each part of the pair of left and right seat reclining devices 4 will be described in detail. The seat reclining devices 4 have the same configurations that are bilaterally symmetrical to each other. Therefore, hereinafter, as an example, a configuration of the seat reclining device 4 disposed on the vehicle outer side (right side) shown in FIGS. 2 and 3 will be described in detail.

Figure 4:
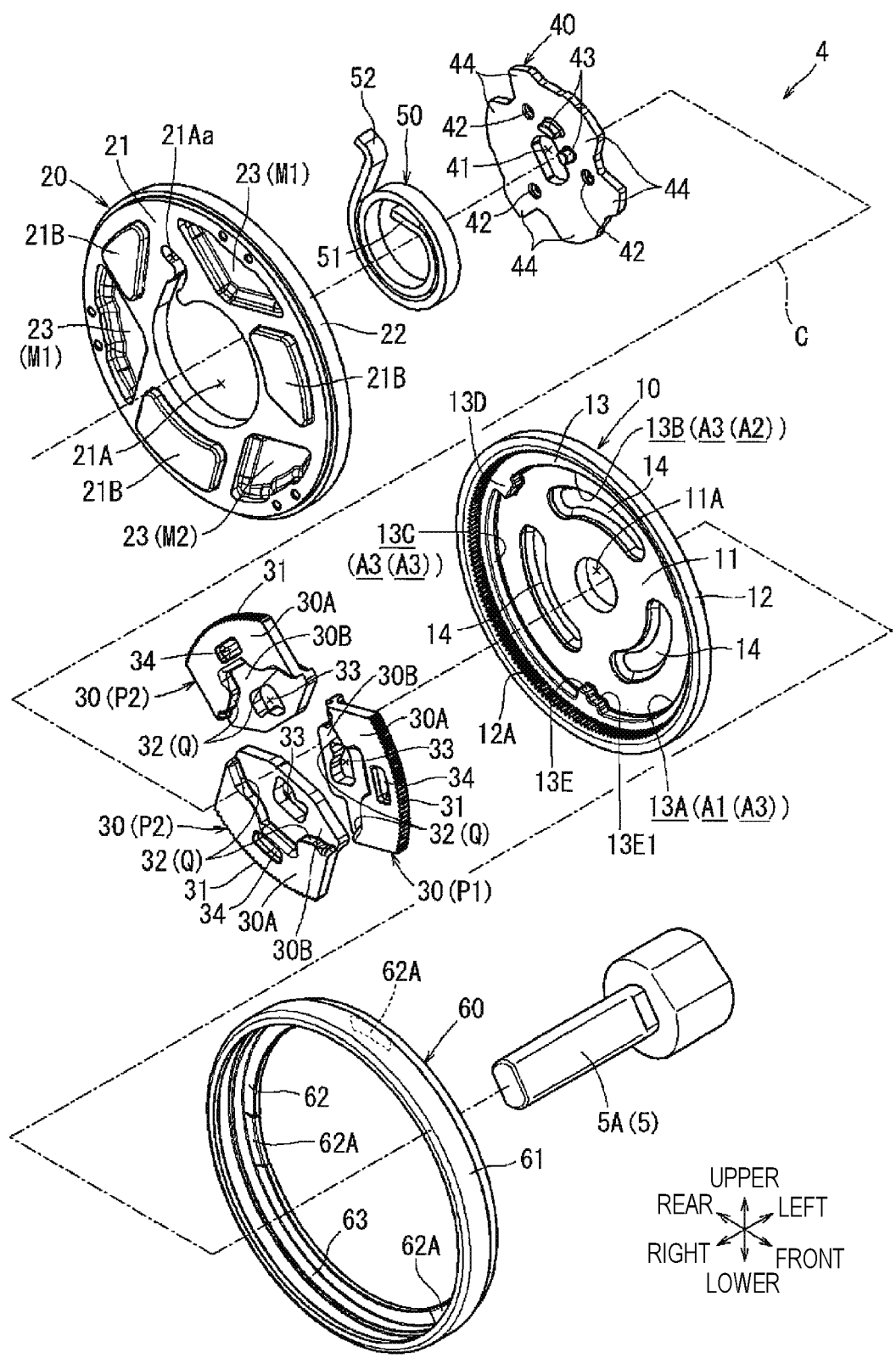
FIG. 4 is an exploded perspective view of the vehicle seat reclining device.
Figure 5:
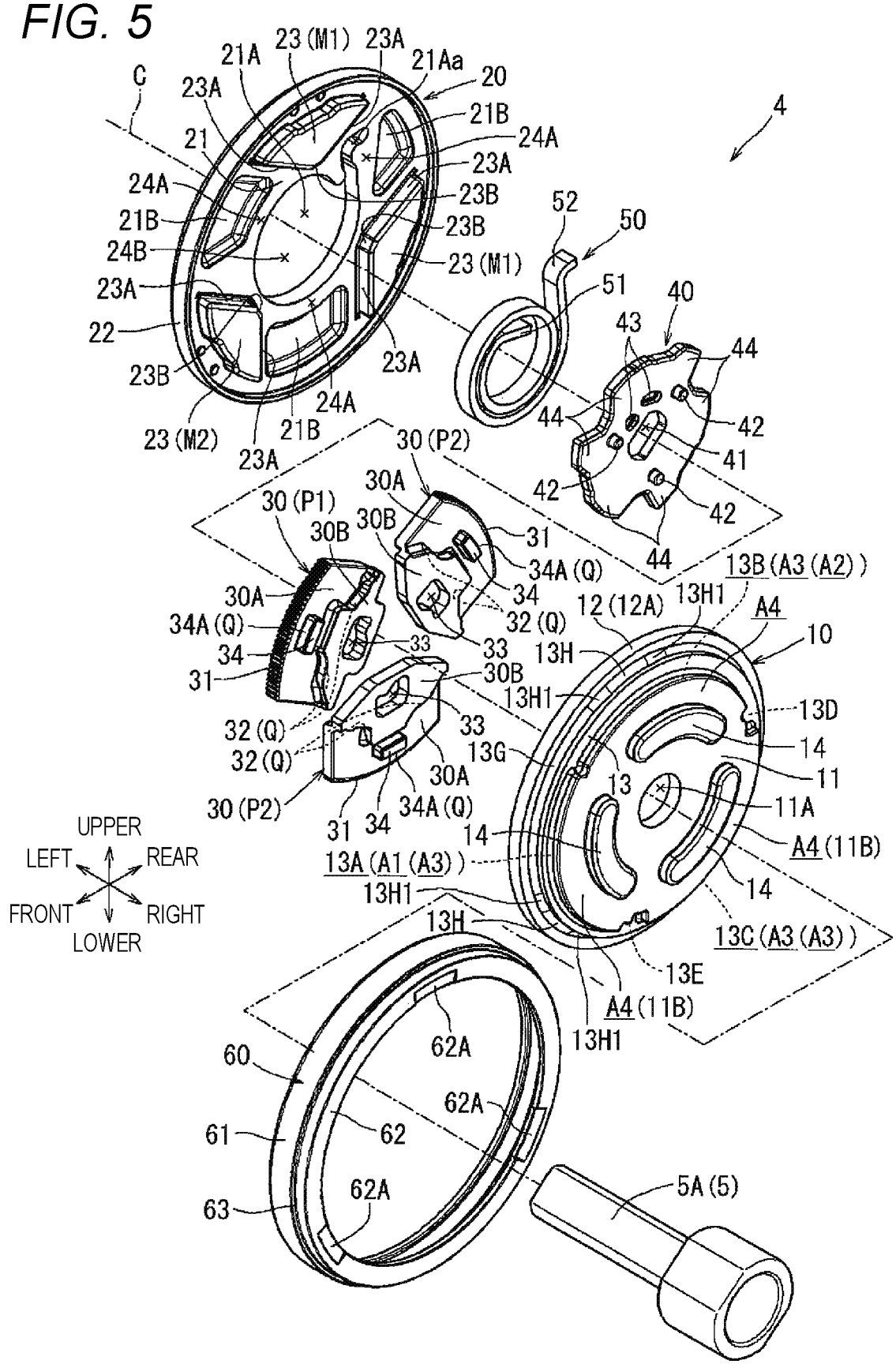
FIG. 5 is an exploded perspective view as viewed from a side opposite to that of FIG. 4.

As shown in FIGS. 4 and 5, the seat reclining device 4 includes the substantially disk-shaped ratchet 10 and guide 20 that are assembled to each other in an axial direction, three pawls 30 assembled between the ratchet 10 and the guide 20, and a rotation cam 40 that moves the pawls 30 inward and outward in a radial direction. The seat reclining device 4 further includes a lock spring 50 (spiral spring) that biases the rotation cam 40 in a lock rotation direction relative to the guide 20, and a substantially cylindrical outer circumferential ring 60 that is installed across outer circumferential portions of the ratchet 10 and the guide 20.

The outer circumferential ring 60 functions as a holding member that holds the ratchet 10 and the guide 20 in a state of being assembled to each other in the axial direction. Here, the rotation cam 40 corresponds to a "cam" of the present invention. Each of the ratchet 10, the guide 20, the three pawls 30, and the rotation cam 40 is hardened by quenching processing after press molding and has high structural strength.

<Ratchet 10>

As shown in FIG. 4, the ratchet 10 is processed into a shape by cutting a metal plate member into a substantially disk shape and extruding portions of the substantially disk-shaped metal plate member in a half-punched shape in a plate thickness direction (axial direction). Specifically, a stepped cylindrical portion protruding in two stages in a stepped cylindrical shape in the axial direction, which is an assembling direction of the ratchet 10 to the guide 20, is extruded in a half-punched shape and formed on an outer circumferential edge portion of a disk main body 11 of the ratchet 10.

A cylindrical part on an outer circumferential side of the stepped cylindrical portion is formed as a cylindrical portion 12 whose entire inner circumferential surface is formed with inner teeth 12A. A cylindrical part on an inner circumferential side of the stepped cylindrical portion is formed as an intermediate cylindrical portion 13 having a protruding length in the axial direction shorter than that of the cylindrical portion 12. The inner teeth 12A of the cylindrical portion 12 have such a tooth surface shape that outer teeth 31 formed on an outer circumferential surface portion of the pawl 30, which will be described later, can mesh with the inner teeth 12A from an inner side in the radial direction. Specifically, the inner teeth 12A have a shape in which tooth surfaces are arranged at equal intervals at a pitch of two degrees in the rotation direction.

At an inner circumferential surface portion of the intermediate cylindrical portion 13, three regions (first region 13A, second region 13B, third region 13C) in which an inner diameter dimension from a rotation center C of the ratchet 10 and a length in the rotation direction are individually set, and a first convex portion 13D and a second convex portion 13E that protrude inward in the radial direction from corresponding boundary portions between regions are formed.

Each of the first region 13A, the second region 13B, and the third region 13C is formed in an inner circumferential surface shape curving in an arc shape drawn around the rotation center C of the ratchet 10. Specifically, as shown in FIG. 10, the first region 13A and the third region 13C have an inner circumferential surface shape of the same diameter having the same inner diameter dimension slightly larger than that of the second region 13B.

Figure 10:
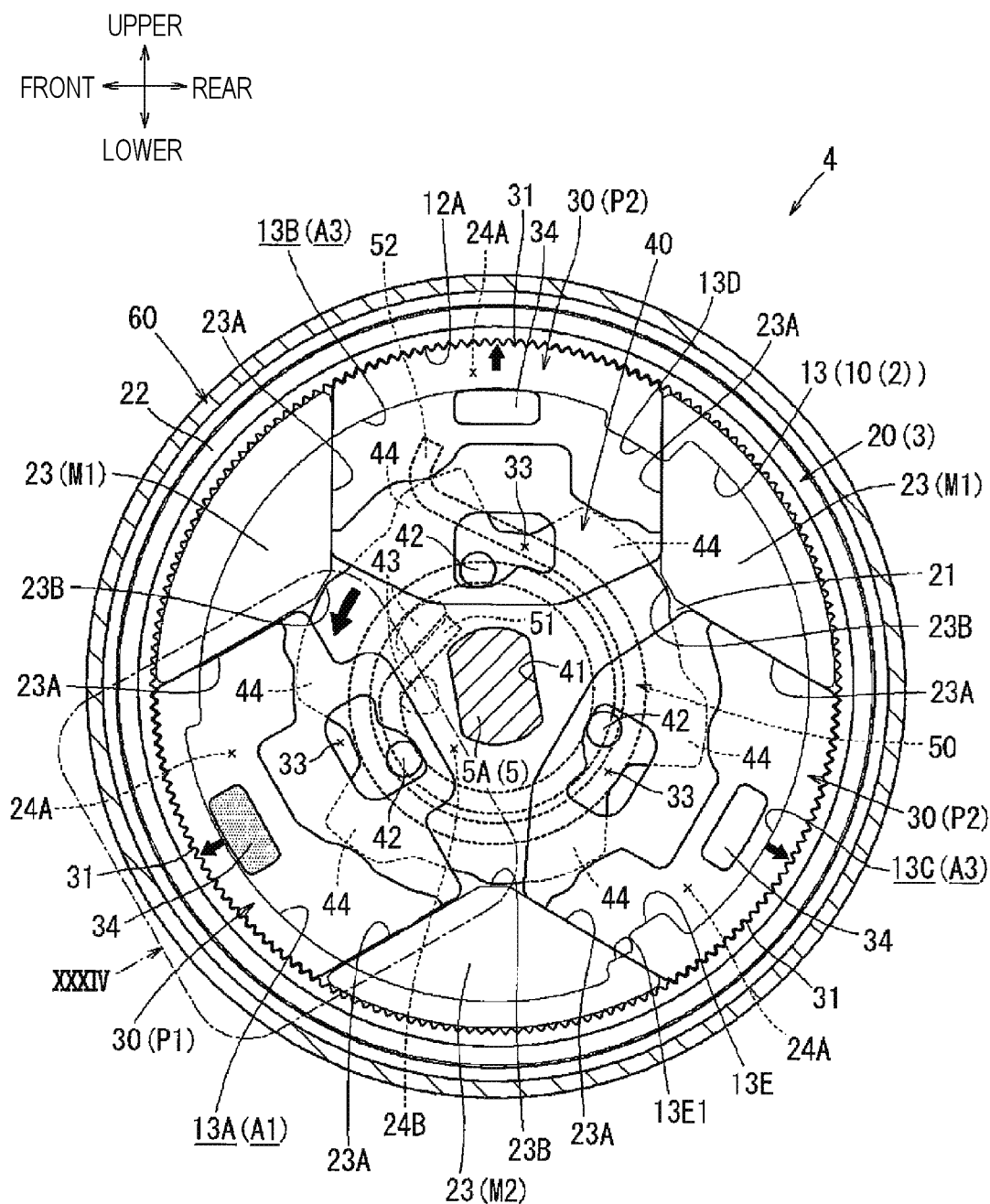
FIG. 10 is a cross-sectional view taken along a line X-X FIG. 8 and showing a locked state of the vehicle seat reclining device.
Figure 17A:
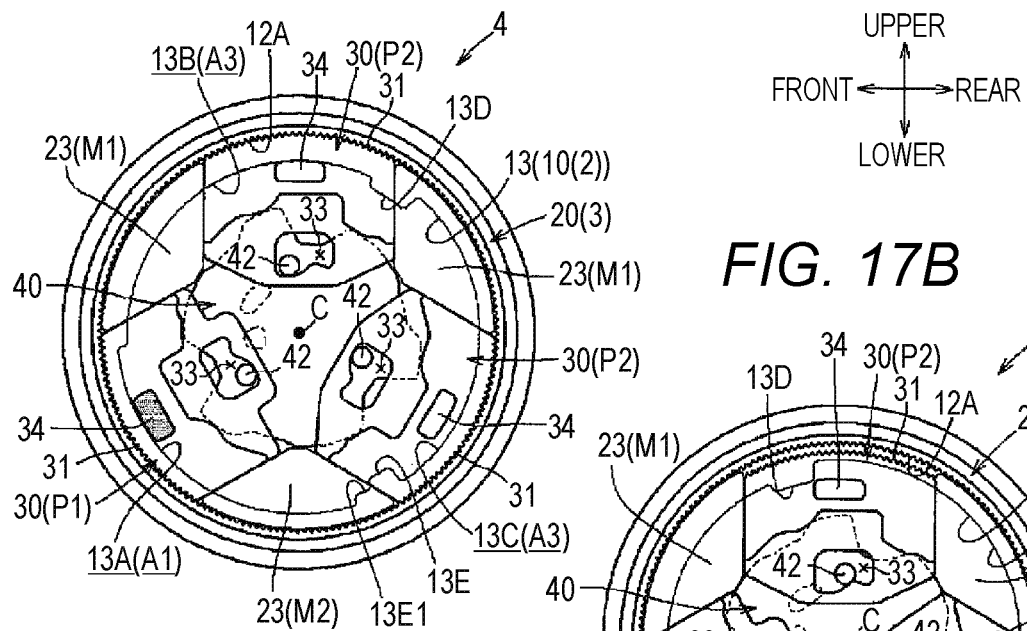
FIGS. 17A to 17D are cross-sectional views showing changes in the locking operation of each pawl caused by a change in a rotational position of the ratchet separately for cases A to D.

As shown in FIGS. 10, 17A, and 18A, when the ratchet 10 is at a rotation angle where the first region 13A overlaps with a main pawl P1 that is one of the three pawls 30 to be described later in the rotation direction, the first region 13A forms the lock region A1 in which the main pawl P1 is allowed to mesh with the inner teeth 12A. At this time, the second region 13B and the third region 13C overlap with remaining two sub pawls P2 in the rotation direction, and serve as relief regions A3 in which the sub pawls P2 are allowed to mesh with the inner teeth 12A. Here, the sub pawls P2 correspond to "another pawl" of the present invention.

Figure 12:
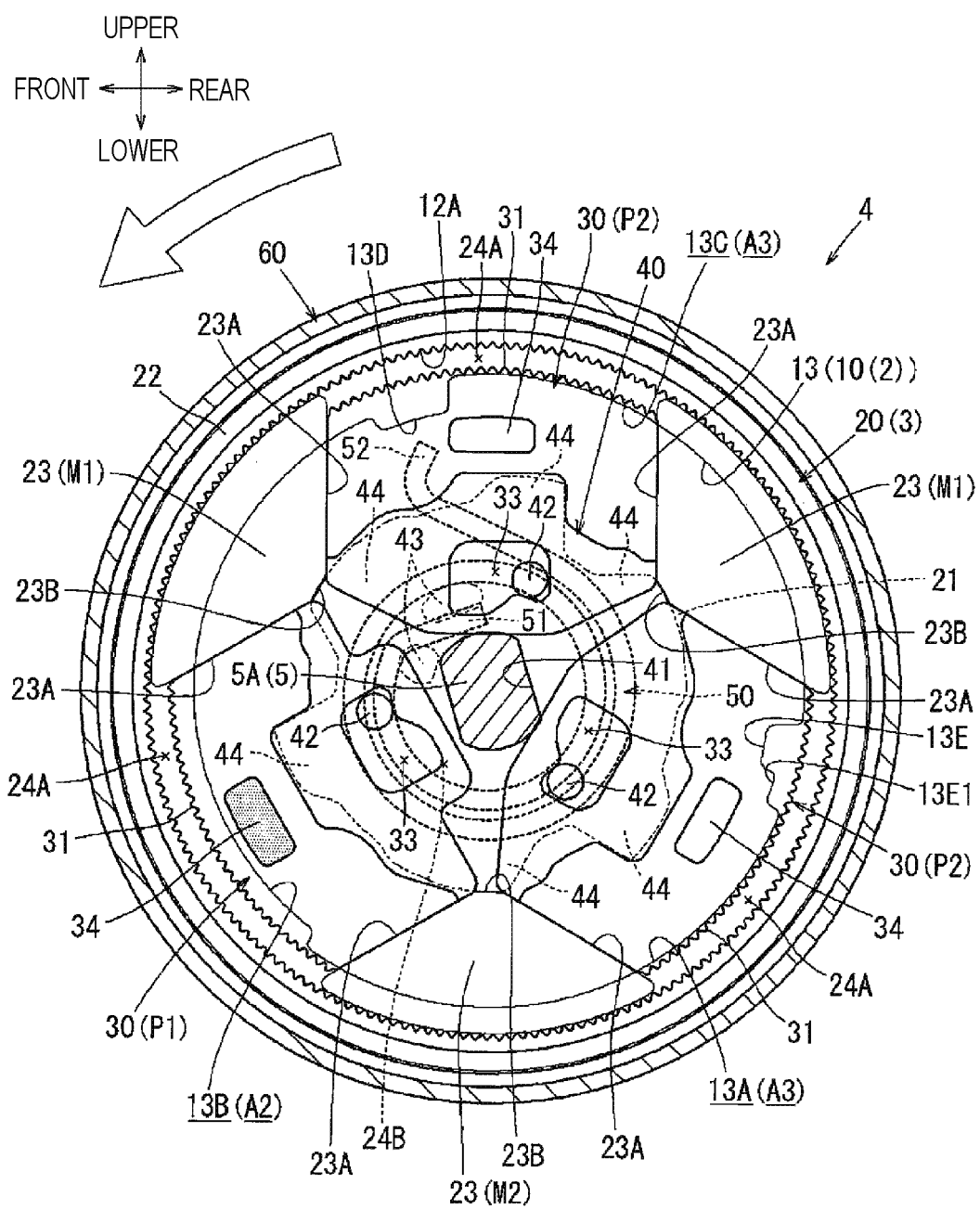
FIG. 12 is a cross-sectional view showing a state in which a ratchet is rotated from FIG. 11 to a free region.
Figure 13:
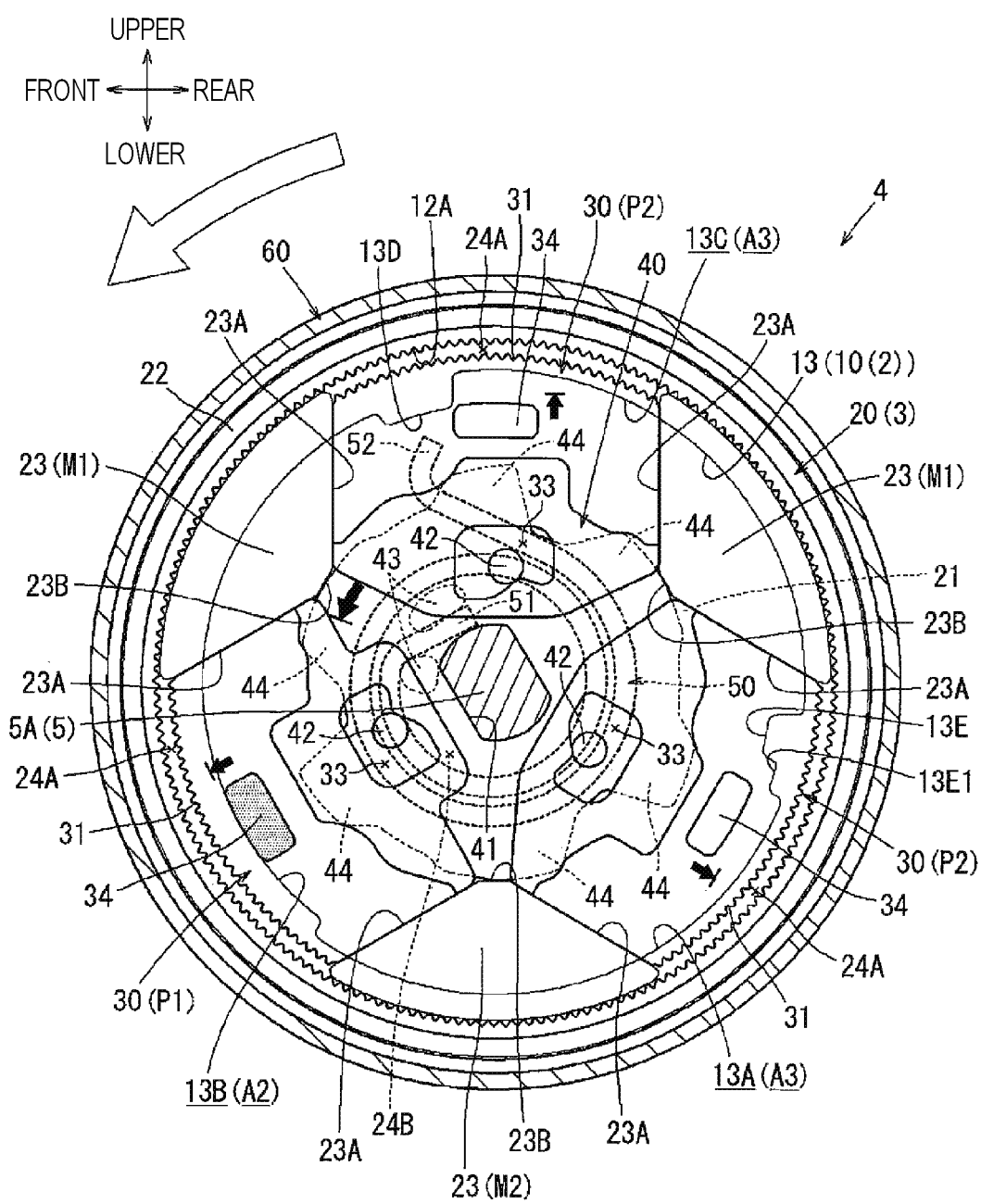
FIG. 13 is a cross-sectional view showing a state in which a locking operation of the vehicle seat reclining device is prevented from FIG. 12.
Figure 17B:
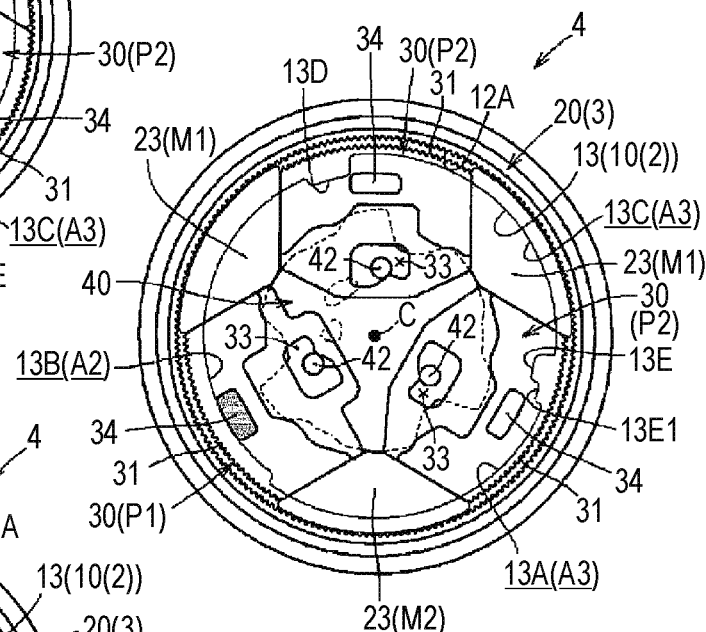

On the other hand, as shown in FIG. 12, when the ratchet 10 is at a rotation angle where the second region 13B overlaps with the main pawl P1 in the rotation direction, the second region 13B forms the free region A2 in which the main pawl P1 rides on an inner circumferential surface and meshing of the main pawl P1 with the inner teeth 12A is stopped, as shown in FIGS. 13, 17B, and 18B. At this time, the third region 13C and the first region 13A overlap with the remaining two sub pawls P2 in the rotation direction, and serve as the relief regions A3 in which movement of the sub pawls P2 is prevented.

That is, the intermediate cylindrical portion 13 of the ratchet 10 is configured to allow a locking operation of the main pawl P1 in the first region 13A as shown in FIG. 10, and stop the locking operation of the main pawl P1 in the second region 13B as shown in FIGS. 12 and 13. As shown in FIG. 10, when the locking operation of the main pawl P1 among the pawls 30 is allowed, the locking operation of the remaining two sub pawls P2 is also allowed. As shown in FIGS. 12 and 13, when the locking operation of the main pawl P1 among the pawls 30 is stopped, the locking operation of the remaining two sub pawls P2 is also stopped.

Thus, the intermediate cylindrical portion 13 of the ratchet 10 controls the lock allowance and block of the main pawl P1 by the first region 13A and the second region 13B. Then, when the first region 13A functions as the lock region A1 (see FIG. 10), the other two regions (second region 13B, third region 13C) function as the relief regions A3 in which the locking operation of the remaining two sub pawls P2 is allowed. When the second region 13B functions as the free region A2 (see FIG. 13), the other two regions (first region 13A, third region 13C) function as the relief regions A3 in which the movement of the remaining two sub pawls P2 is prevented.

Figure 17C:
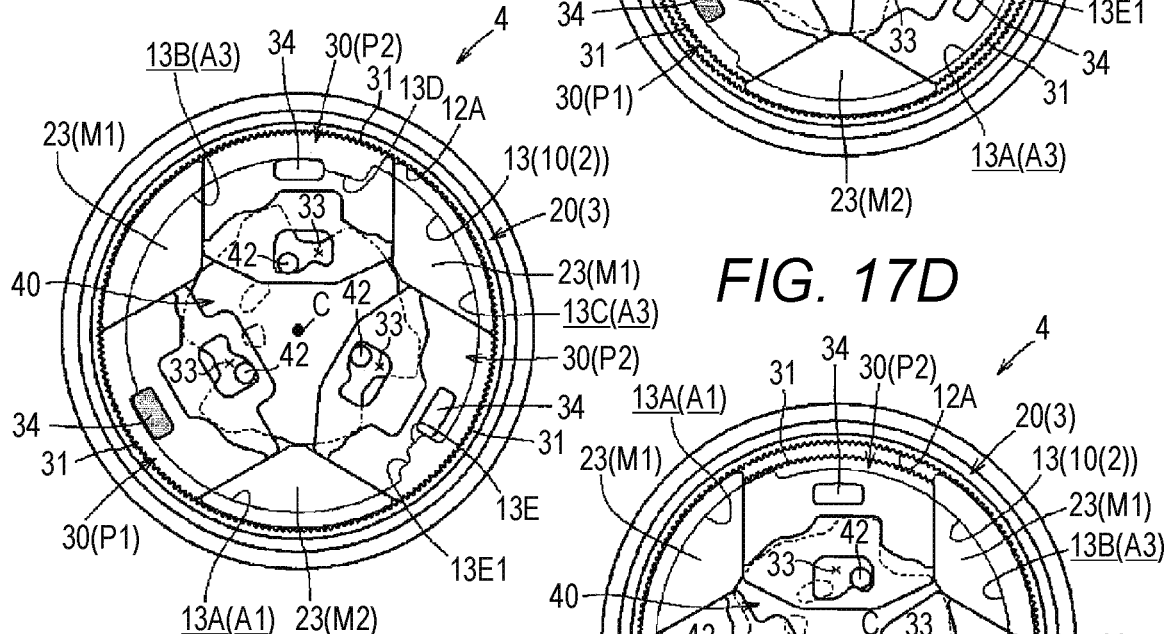

As shown in FIGS. 17C and 18C, when the main pawl P1 shifts from the lock region A1 (first region 13A) to the free region A2 (second region 13B) by the rotation of the ratchet 10, the main pawl P1 may be abutted against a step between the first region 13A and the second region 13B in the rotation direction in a state in which the main pawl P1 is halfway pushed outward in the radial direction. In this case, the first convex portion 13D and the second convex portion 13E are respectively formed at positions at which the sub pawls P2 are abutted against the first convex portion 13D and the second convex portion 13E in the rotation direction at the same time. By the abutment of the sub pawls P2 at the same time, a load that the main pawl P1 receives when being abutted against the step can also be distributed to the other two sub pawls P2.

Specifically, the first convex portion 13D and the second convex portion 13E are formed at positions where, when a ride-up protrusion 34 of the main pawl P1 abuts against the step between the first region 13A and the second region 13B in the rotation direction by the rotation of the ratchet 10, ride-up protrusions 34 of the remaining two sub pawls P2 can abut against the first convex portion 13D and the second convex portion 13E in the same rotation direction. Configurations of the ride-up protrusions 34 will be described in detail later.

Figure 14:
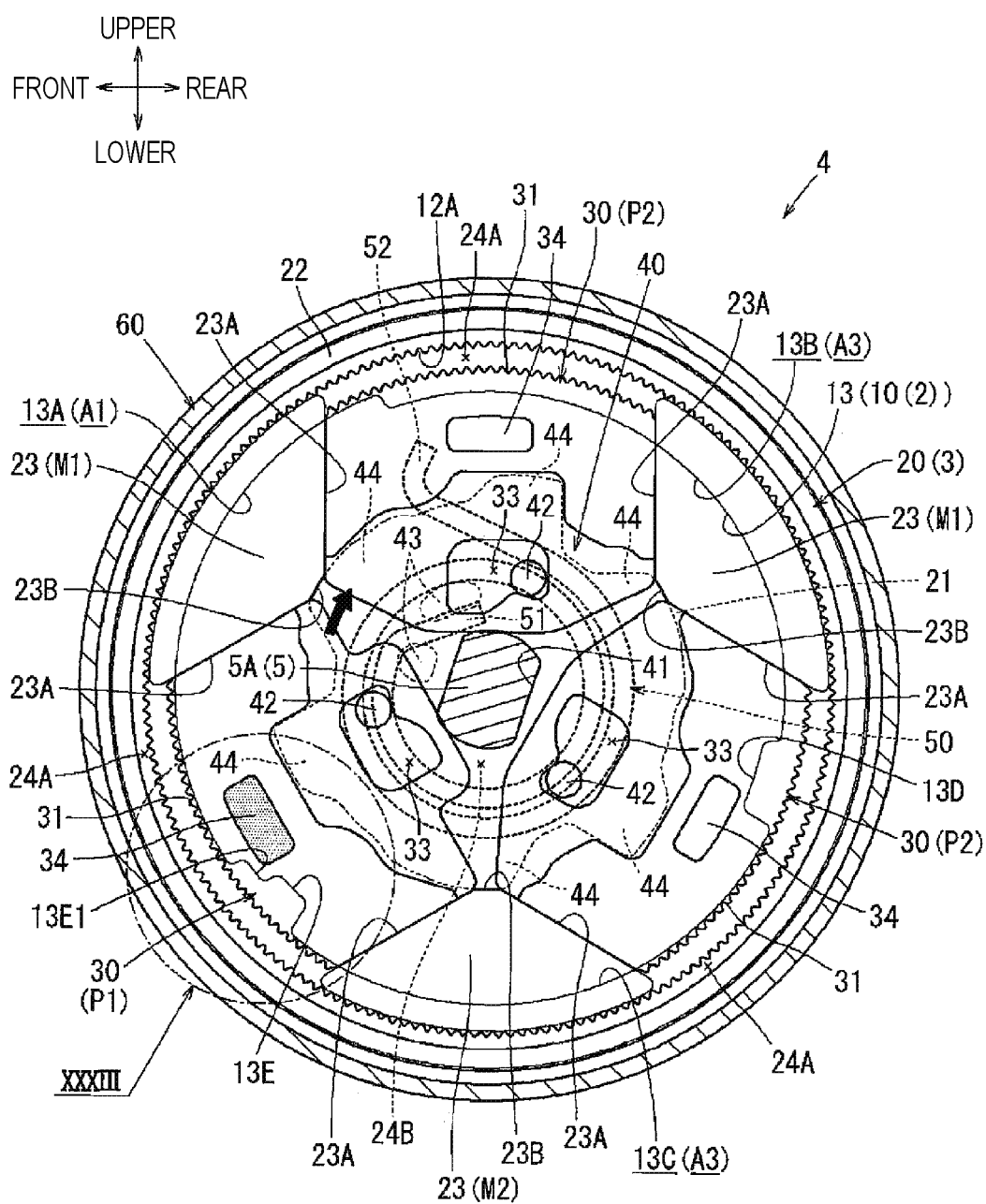
FIG. 14 is a cross-sectional view showing a state in which the ratchet is rotated to a start position of a lock region.
Figure 17D:
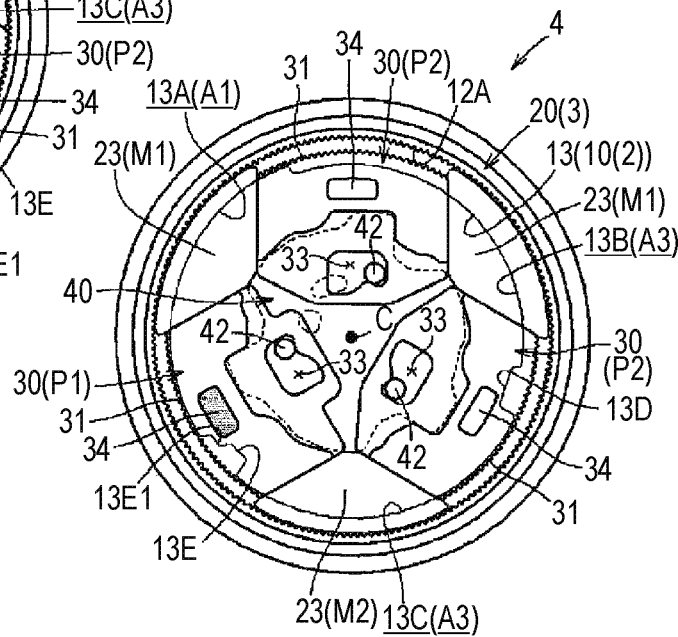
Figure 19:
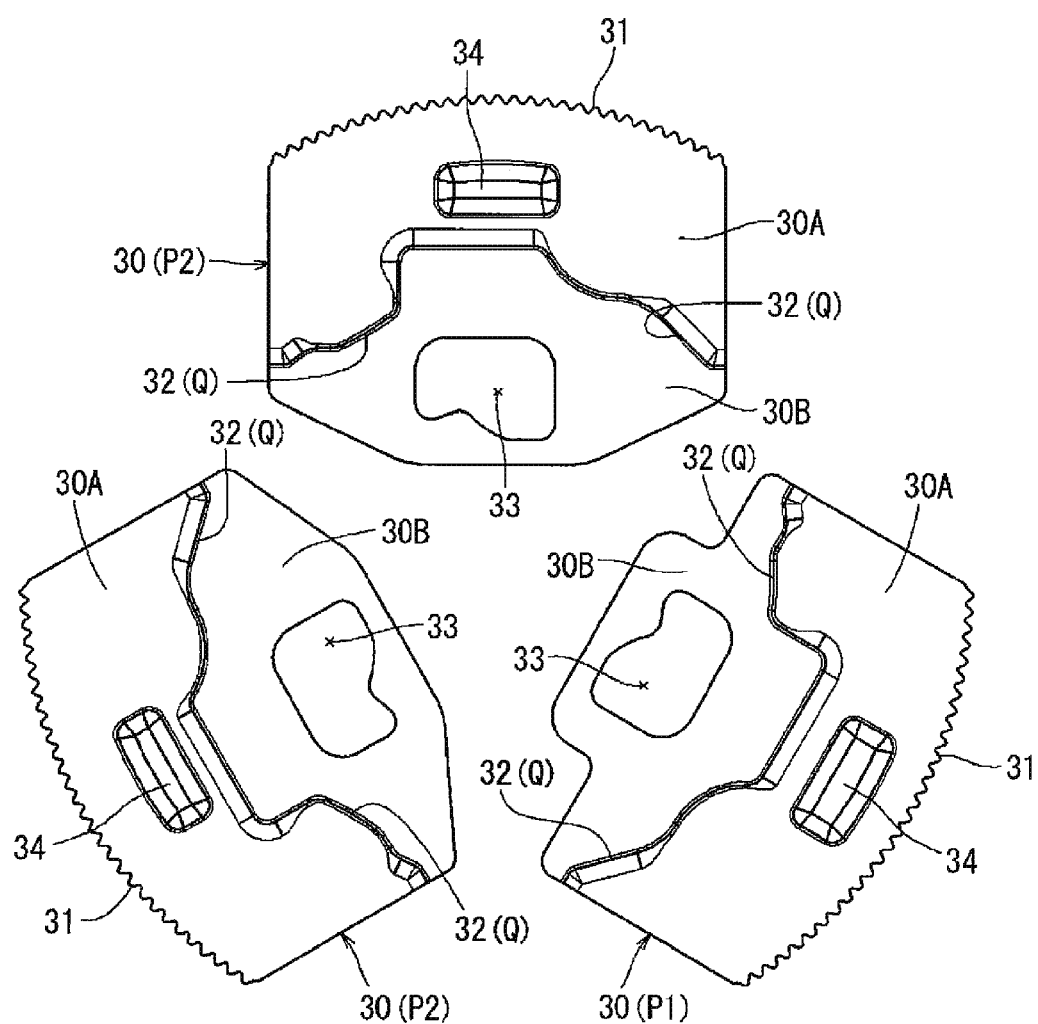
FIG. 19 is an outer side view of each pawl.
Figure 20:
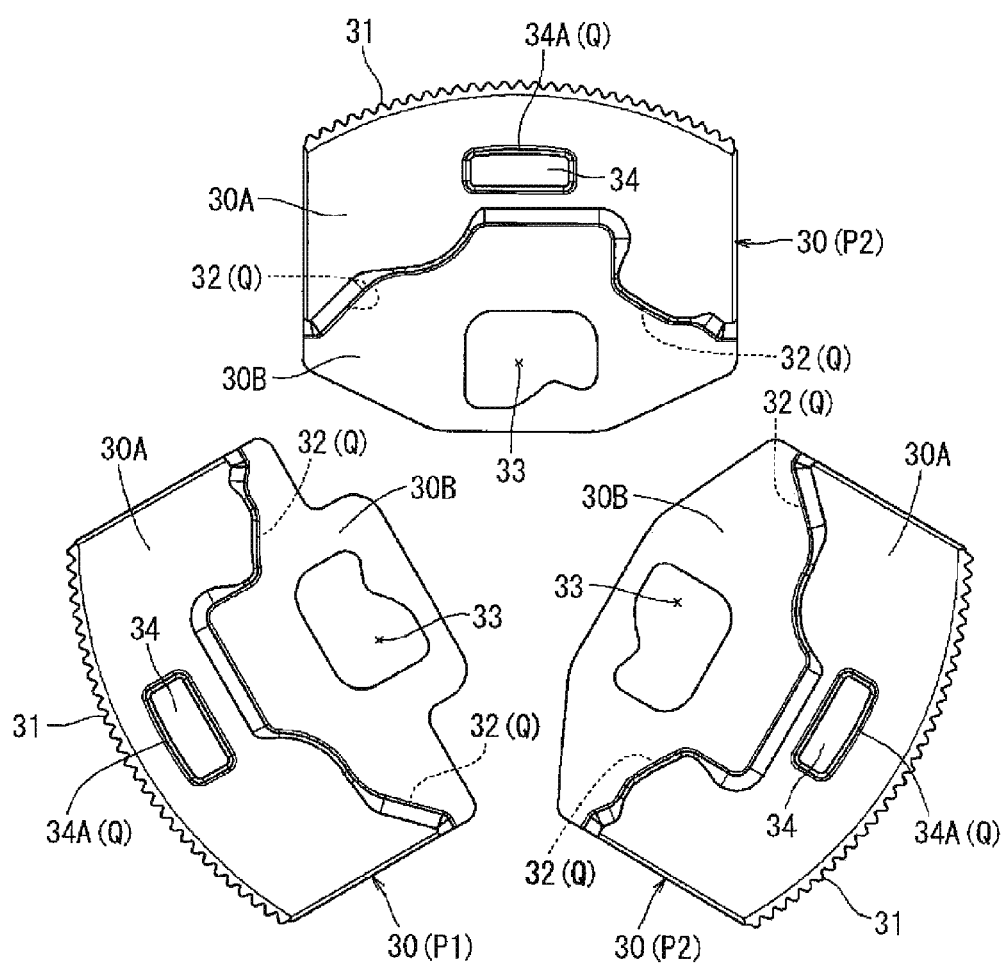
FIG. 20 is an inner side view of each pawl.

As shown in FIGS. 14, 17D, and 18D, the second convex portion 13E protrudes on a starting side in the rotation direction of the lock region A1 (first region 13A), that is, an end portion of the lock region A1 on a side opposite to a side adjacent to the free region A2 (second region 13B). The second convex portion 13E is formed at a position where the second convex portion 13E may overlap with the ride-up protrusion 34 of the main pawl P1 in the rotation direction as shown in FIGS. 14, 17D, and 18D when the seat back 2 is tilted to a starting end of the lock region A1, that is, the rearward tilted position Pc as shown in FIG. 21.

A reason is as follows. That is, as shown in FIG. 21, when the seat back 2 is tilted to the rearward tilted position Pc, the locking plate 2Fc abuts against the rear stopper 3Fd of the reclining plate 3F and is locked to the rear stopper 3Fd. At this time, when the ride-up protrusion 34 of the main pawl P1 shown in FIG. 14 abuts against the second convex portion 13F in the rotation direction before the locking plate 2Fc abuts against the rear stopper 3Fd of the reclining plate 3F when installing the seat reclining device 4 and peripheral components thereof, a large load is applied to the seat reclining device 4. Therefore, in order to prevent such a situation, the second convex portion 13E is formed with a relief concave portion 13E1 that prevents abutment of the ride-up protrusion 34 of the main pawl P1 against the second convex portion 13E in the rotation direction.

Figure 33:
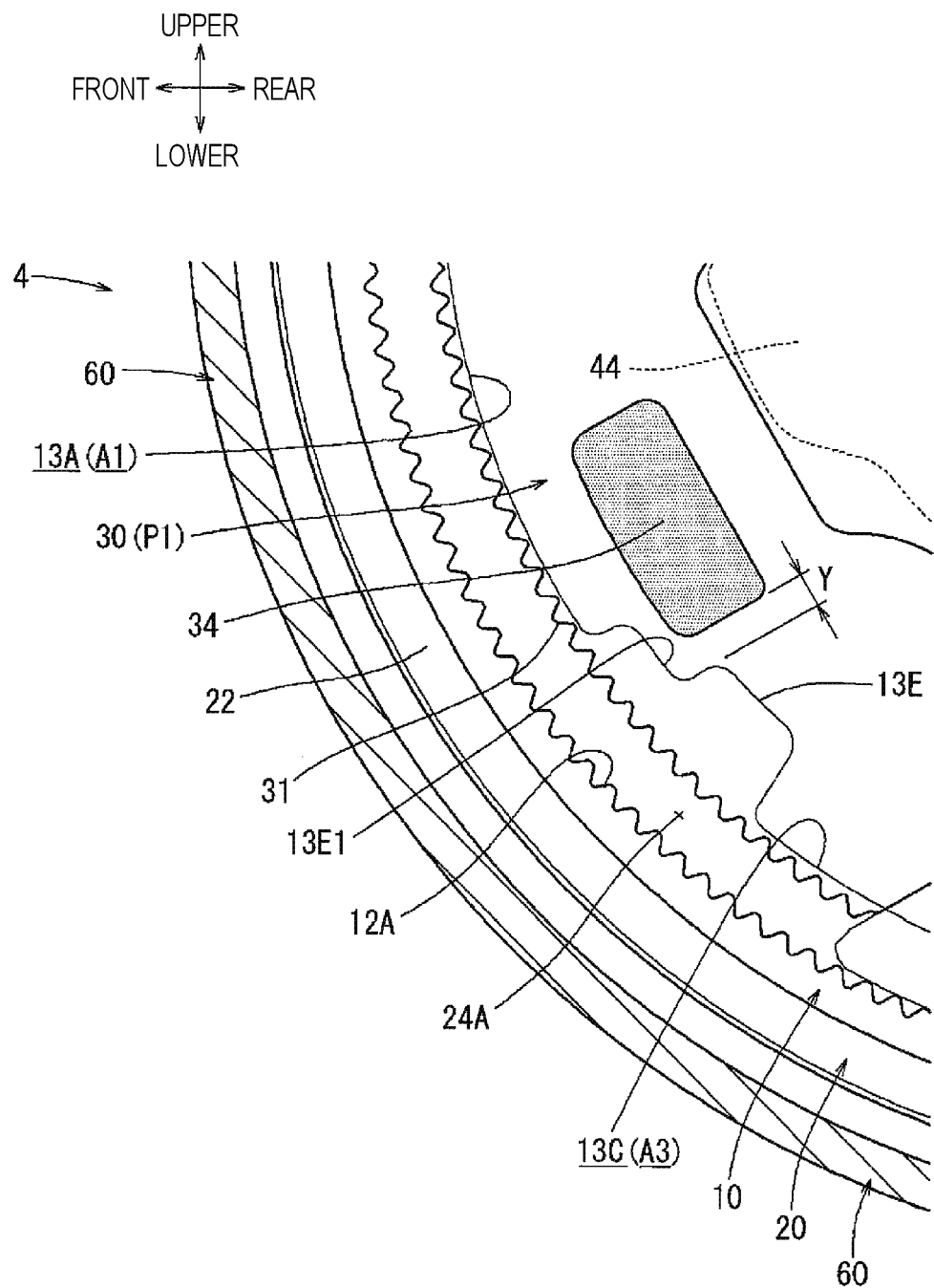
FIG. 33 is an enlarged view of a portion XXXIII in FIG. 14.

As shown in FIG. 33, the relief concave portion 13E1 is formed in a shape in which a corner portion of the second convex portion 13E on a shown clockwise direction side is thinned in a substantially rectangular shape. When the seat back 2 is tilted to the rearward tilted position Pc and the locking plate 2Fc is abutted against the rear stopper 3Fd of the reclining plate 3F and locked to the rear stopper 3Fd as shown in FIG. 21 with a dimensional variation by the above installing, even when the ride-up protrusion 34 of the main pawl P1 overlaps with the second convex portion 13E in the rotation direction as shown in FIG. 33, the relief concave portion 13E1 receives the ride-up protrusion 34 so that the ride-up protrusion 34 does not abut against the second convex portion 13E in the rotation direction. Specifically, the relief concave portion 13E1 receives the ride-up protrusion 34 in a state in which a gap Y in the rotation direction is formed between the relief concave portion 13E1 and a side surface of the ride-up protrusion 34 on a shown counter-clockwise direction side.

When the ride-up protrusion 34 of the main pawl P1 that enters an inside of the relief concave portion 13E1 is pushed outward in the radial direction, the ride-up protrusion 34 rides on an inner circumferential surface of the relief concave portion 13E1, and the main pawl P1 is prevented from meshing with the inner teeth 12A of the ratchet 10. Accordingly, the main pawl P1 is prevented from being locked at a position where the ride-up protrusion 34 of the main pawl P1 enters the relief concave portion 13E1 (rotation position beyond the lock region A1).

As shown in FIGS. 4 and 5, a through hole 11A penetrating in a round hole shape is formed at a central portion (position at the rotation center C) of the disk main body 11 of the ratchet 10. An operation pin 5A, which is inserted into and installed on a central portion (position at the rotation center C) of the rotation cam 40 which will be described later, is inserted into the through hole 11A in a freely rotatable state from an outer side in the axial direction.

As shown in FIG. 3, the ratchet 10 is set such that an outer surface of the disk main body 11 is in surface contact with an outer surface of the side frame 2F of the seat back 2, and the ratchet 10 is integrally coupled to the side frame 2F of the seat back 2 by welding contact portions between the ratchet 10 and the side frame 2F. Specifically, the ratchet 10 is set in a state in which three dowels 14 protruding on the outer surface of the disk main body 11 of the ratchet 10 are fitted into three corresponding fitting holes 2Fa formed in the side frame 2F of the seat back 2, and the outer surface of the disk main body 11 is in surface contact with the outer surface of the side frame 2F.

Then, the ratchet 10 is coupled to the side frame 2F by laser-welding peripheral regions (coupling regions A4) of fitted portions to the side frame 2F. As shown in FIG. 5, the dowels 14 are formed one by one in regions in the rotation direction where the first region 13A, the second region 13B, and the third region 13C of the intermediate cylindrical portion 13 are positioned. Each of the dowels 14 curves in an arc shape around the rotation center C of the ratchet 10.

Figure 7:
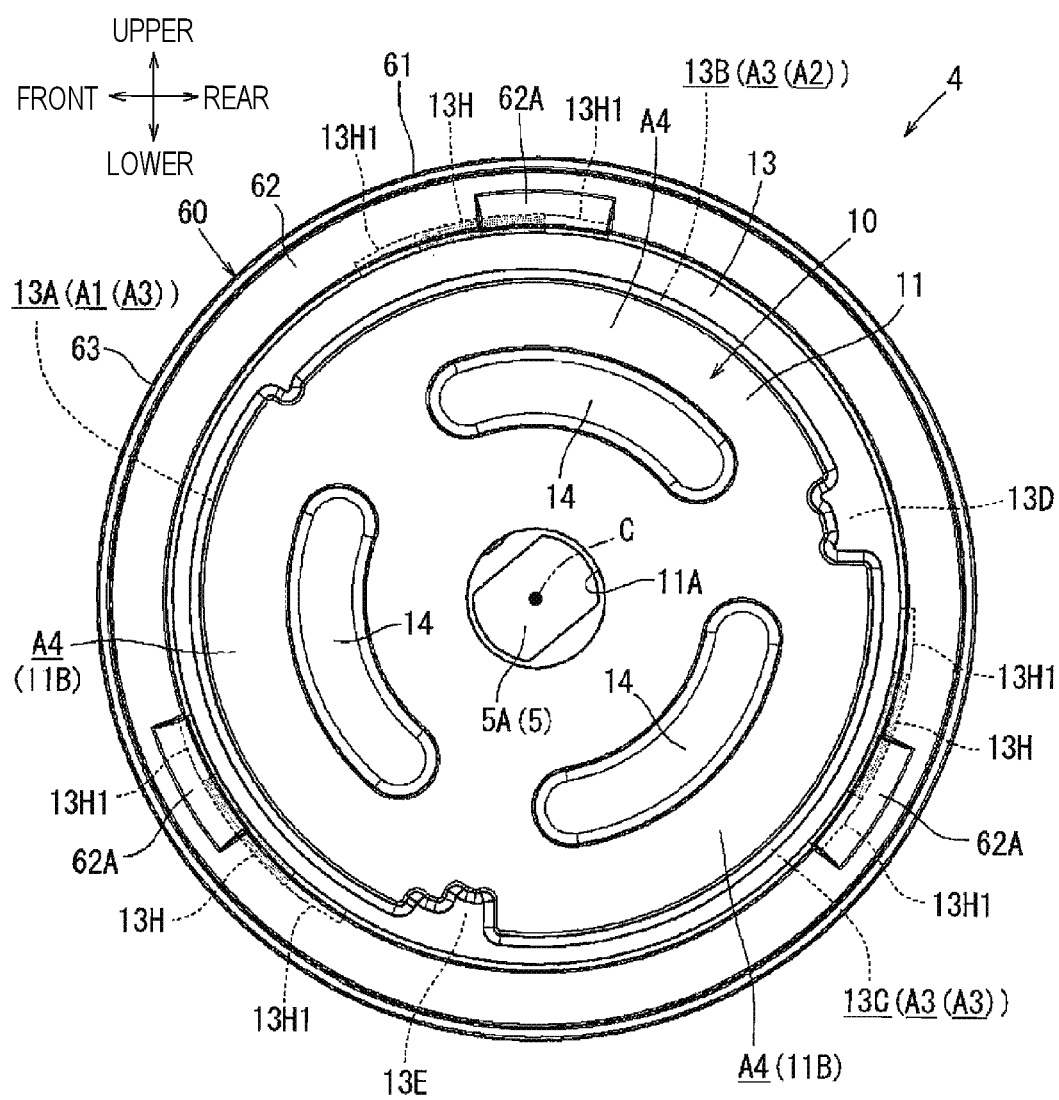
FIG. 7 is an inner side view of the vehicle seat reclining device.
Figure 8:
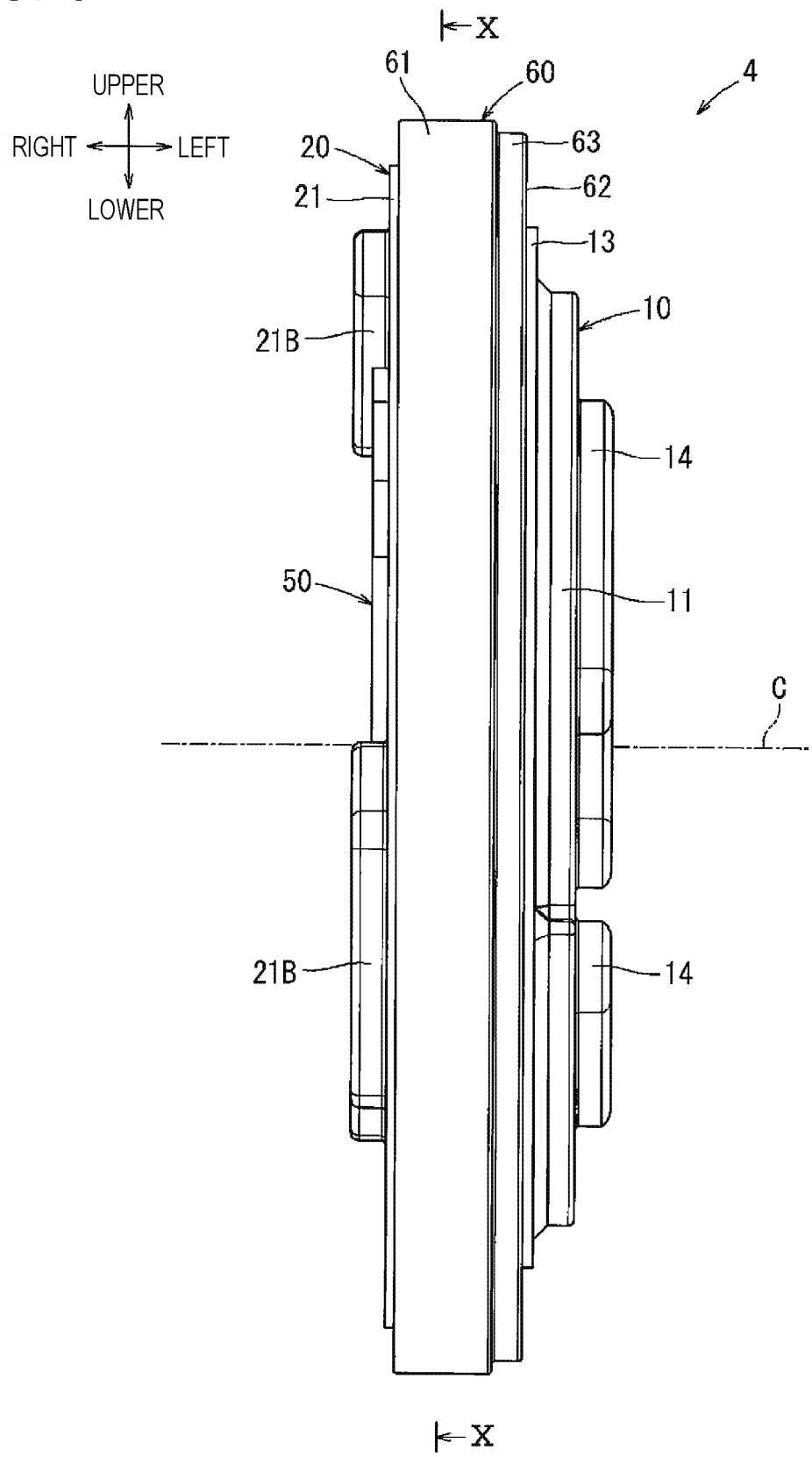
FIG. 8 is a front side view of the vehicle seat reclining device.

Regions outward in the radial direction of the dowels 14 on the outer surface of the disk main body 11 of the ratchet 10 are defined as the coupling regions A4 in which the outer surface of the disk main body 11 is abutted against the side frame 2F in a surface contact state and laser-welded to the side frame 2F. As shown in FIG. 7, the coupling regions A4 are configured such that, with a concave-convex shape of the intermediate cylindrical portion 13 formed on outer circumferential edge portions of the coupling regions A4, the coupling regions 4A at positions where the first region 13A and the third region 13C are positioned have an expanded surface portion 11B whose dimension in the radial direction is expanded relative to the coupling region A4 at a position where the second region 13B is positioned.

That is, as described above, the first region 13A and the third region 13C formed on the intermediate cylindrical portion 13 have a shape expanded outward in the radial direction relative to the second region 13B. Accordingly, the coupling regions 4A at the positions where the first region 13A and the third region 13C are formed are configured to expand in dimension in the radial direction relative to the coupling region A4 at the position where the second region 13B is formed. According to the above configuration, the outer surface of the disk main body 11 of the ratchet 10 is firmly welded to the side frame 2F in a state in which the two coupling regions A4 each having the expanded surface portion 11B, which are at the positions where the first region 13A and the third region 13C are formed, are abutted against the side frame 2F more widely outward in the radial direction.

The welding of the ratchet 10 to the side frame 2F is performed such that welding beads are placed to enclose each dowel 14 in a C shape across both side regions in the rotation direction from an outer side in the radial direction. As shown in FIG. 3, a round hole-shaped penetrating hole 2Fb penetrating the side frame 2F is formed in the side frame 2F at a position where the penetrating hole 2Fb faces the through hole 11A, which is formed in a central portion (position at the rotation center C) of the ratchet 10, in the axial direction. The operation pin 5A inserted through the through hole 11A of the ratchet 10 is inserted through the penetrating hole 2Fb in the axial direction.

<Guide 20>

As shown in FIG. 5, the guide 20 is processed into a shape by cutting a metal plate member into a substantially disk shape having an outer diameter slightly larger than that of the ratchet 10 and extruding portions of the substantially disk-shaped metal plate member in a half-punched shape in the plate thickness direction (axial direction). Specifically, a cylindrical portion 22 protruding in a cylindrical shape in the axial direction, which is an assembling direction of the guide 20 to the ratchet 10, is extruded in a half-punched shape on an outer circumferential edge portion of a disk main body 21 of the guide 20.

Figure 9:
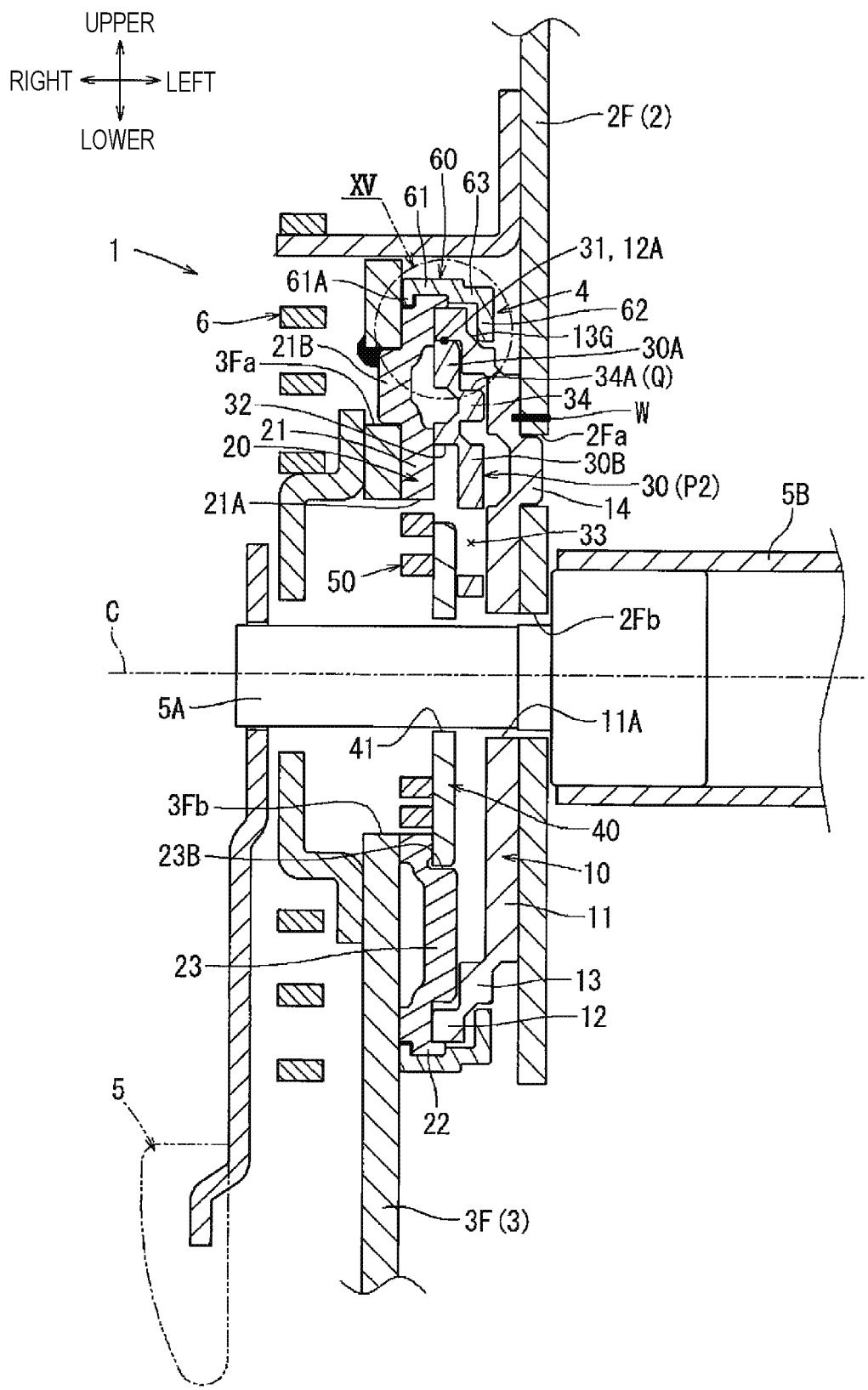
FIG. 9 is a cross-sectional view taken along a line IX-IX in FIG. 1.

The cylindrical portion 22 has an inner diameter dimension slightly larger than an outer diameter dimension of the cylindrical portion 12 of the ratchet 10. Specifically, the cylindrical portion 22 has a thickness in the radial direction smaller than a plate thickness of the outer circumferential ring 60 to be described later (see FIG. 15). More specifically, the cylindrical portion 22 has such a small thickness in the radial direction that an outer circumferential surface of the cylindrical portion 22 is positioned inward in the radial direction relative to an outer circumferential surface of a stepped portion 63 of the outer circumferential ring 60 to be described later. As shown in FIG. 9, the guide 20 is set such that the cylindrical portion 12 of the ratchet 10 is loosely fitted into the cylindrical portion 22 in the axial direction.

Accordingly, the guide 20 is assembled in a state in which the cylindrical portions 22, 12 are loosely fitted to each other inward and outward in the radial direction between the guide 20 and the ratchet 10 and are supported from an inner side and an outer side to be rotatable relative to each other. The outer circumferential ring 60 to be described later is installed in a manner of crossing the cylindrical portion 22 of the guide 20 and the cylindrical portion 12 of the ratchet 10 from an outer circumferential side, so that the guide 20 is assembled to the ratchet 10 via the outer circumferential ring 60 in a state in which the guide 20 is prevented from coming off in the axial direction (see FIGS. 2 and 3, and 6 to 9).

As shown in FIG. 5, on an inner surface of the disk main body 21 of the guide 20, guide walls 23 protruding in a substantially fan shape in the axial direction, which is the assembling direction to the ratchet 10, are extruded in a half-punched shape at three positions in the rotation direction and formed. The guide walls 23 have a shape in which outer circumferential surfaces of the guide walls 23 outward in the radial direction are curved so as to draw an arc on the same circumference drawn around the rotation center C of the guide 20. The guide walls 23 are loosely fitted into the cylindrical portion 12 of the ratchet 10 assembled into the cylindrical portion 22 of the guide 20.

With formation of the guide walls 23, concave pawl accommodating grooves 24A are formed in regions between the guide walls 23 in the rotation direction on the inner surface of the disk main body 21 of the guide 20. In the pawl accommodating grooves 24A, the three pawls 30, which will be described later, can be set to slide only inward and outward in the radial direction. In addition, a cam accommodating groove 24B in which the rotation cam 40 to be described later can be set to be axially rotatable is formed in a central region on the inner surface of the disk main body 21 surrounded by the guide walls 23.

Figure 11:
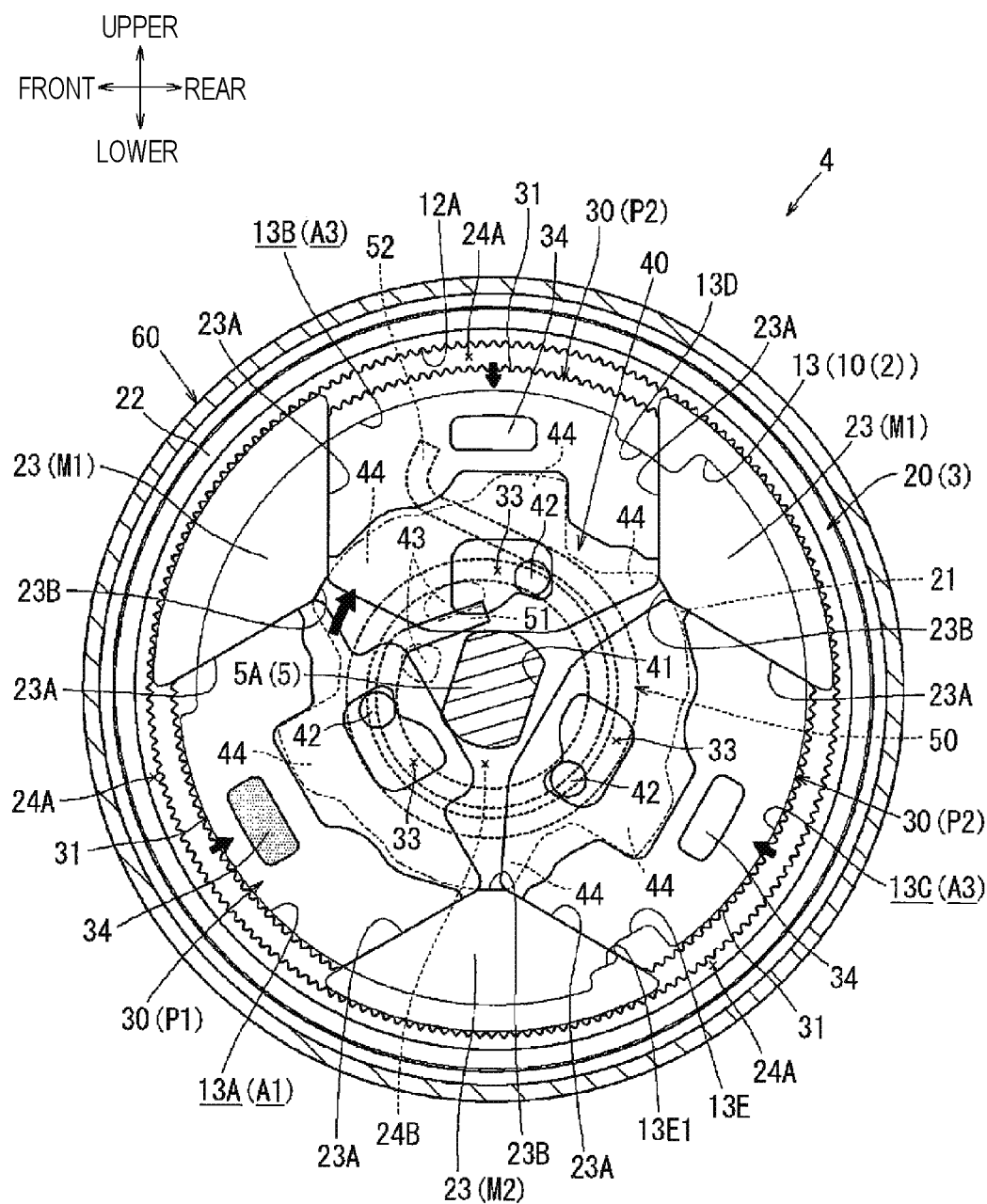
FIG. 11 is a cross-sectional view corresponding to FIG. 10 and showing an unlocked state of the vehicle seat reclining device.

As shown in FIGS. 10 and 11, the guide walls 23 support the corresponding pawls 30, which are set in the pawl accommodating grooves 24A, from both sides in the rotation direction by regulating surfaces 23A which are two side surfaces in the rotation direction that face the corresponding pawl accommodating groove 24A. Accordingly, the guide walls 23 guide the corresponding pawl 30 from both sides in the rotation direction such that the pawl 30 slides only inward and outward in the radial direction.

In addition, the guide walls 23 support the rotation cam 40, which is set in the cam accommodating groove 24B, from the outer side in the radial direction by support surfaces 23B which are inner circumferential surfaces of the guide walls 23 in the radial direction that face the cam accommodating groove 24B. Accordingly, the guide walls 23 guide the rotation cam 40 from the outer side in the radial direction so that the rotation cam 40 is rotatable in a substantially central (rotation center C) position on the disk main body 21 of the guide 20.

In addition, a substantially round hole-shaped through hole 21A, in which a lock spring 50 to be described later is set, penetrates in the axial direction through a central portion (position at the rotation center C) of the disk main body 21 of the guide 20. The through hole 21A is formed with a hook hole 21Aa in which a hole shape is elongated outward in the radial direction. An outer end portion 52 of the lock spring 50 set in the through hole 21A is fitted into the hook hole 21Aa in the axial direction and is integrated with the hook hole 21Aa in the rotation direction.

As shown in FIG. 2, the guide 20 is set such that an outer surface of the disk main body 21 of the guide 20 is in surface contact with an inner surface of the reclining plate 3F, and the guide 20 is integrally coupled to the reclining plate 3F by welding contact portions between the guide 20 and the reclining plate 3F. Specifically, the guide 20 is set in a state in which three dowels 21B protruding on the outer surface of the disk main body 21 of the guide 20 are fitted into three corresponding fitting holes 3Fa formed in the reclining plate 3F, and the outer surface of the disk main body 21 is in surface contact with the inner surface of the reclining plate 3F.

Then, the guide 20 is coupled to the reclining plate 3F by laser-welding peripheral regions of fitted portions to the reclining plate 3F. As shown in FIG. 4, the dowels 21B are extruded in a floating island shape in the axial direction one by one in regions on a back side of the pawl accommodating grooves 24A (see FIG. 5) on the outer surface of the disk main body 21. As shown in FIG. 2, in the reclining plate 3F, a round hole-shaped penetrating hole 3Fb penetrates the reclining plate 3F in a position where the penetrating hole 3Fb faces the through hole 21A, which is formed in the central portion (position at the rotation center C) of the guide 20, in the axial direction. The operation pin 5A inserted through the through hole 21A of the guide 20 is inserted through the penetrating hole 3Fb in the axial direction.

<Pawl 30>

As shown in FIGS. 4 and 5, each of the three pawls 30 is processed into a shape by cutting a metal plate member into a substantially rectangular shape and extruding portions of the substantially rectangular-shaped metal plate member in a half-punched shape in the plate thickness direction (axial direction). Specifically, the pawl 30 has a shape in which an offset surface portion 30B forming a substantially inner half region of the pawl 30 in the radial direction is extruded in a half-punched shape by a substantial plate thickness in the axial direction that is the assembling direction to the ratchet 10 relative to a main body surface portion 30A forming a substantially outer half region of the pawl 30 in the radial direction.

The three pawls 30 have substantially the same shape, and one of the three pawls 30 serves as the main pawl P1 having a function different from those of the other two sub pawls P2. A specific configuration thereof will be described in detail below Hereinafter, specific configurations of each part common to the pawls 30 will be described first.

As shown in FIGS. 10 and 11, the pawls 30 are set in a state of being accommodated one by one in the pawl accommodating grooves 24A formed on the inner surface of the disk main body 21 of the guide 20. According to the above setting, each of the pawls 30 is surface-supported from both sides in the rotation direction by the regulating surfaces 23A of the guide walls 23 facing the pawl accommodating groove 24A from both sides in the rotation direction. Accordingly, the pawls 30 are supported to be movable only inward and outward in the radial direction along the regulating surfaces 23A.

Specifically, as shown in FIG. 9, when the pawls 30 are set in the pawl accommodating grooves 24A (see FIG. 5), main body surface portions 30A of the pawls 30 are abutted against the inner surface of the disk main body 21 of the guide 20. Accordingly, the inner teeth 12A of the cylindrical portion 12 of the ratchet 10 set in the cylindrical portion 22 of the guide 20 face the pawls 30 in the radial direction at positions on outer sides in the radial direction of the main body surface portions 30A. In addition, the offset surface portions 30B of the pawls 30 are separated in the axial direction from the inner surface of the disk main body 21 of the guide 20, and overlap with the intermediate cylindrical portion 13 of the ratchet 10 in the axial direction.

As shown in FIG. 4, the outer teeth 31 whose tooth surfaces face outward in the radial direction are formed on an outer circumferential surface of the main body surface portion 30A of each pawl 30 on the outer side in the radial direction so as to be arranged continuously over an entire region in the rotation direction. The outer circumferential surface of the pawl 30 on which the outer teeth 31 are formed has a convex curving surface shape along an inner circumferential surface shape of the cylindrical portion 12 on which the inner teeth 12A of the ratchet 10 are formed.

Figure 34:
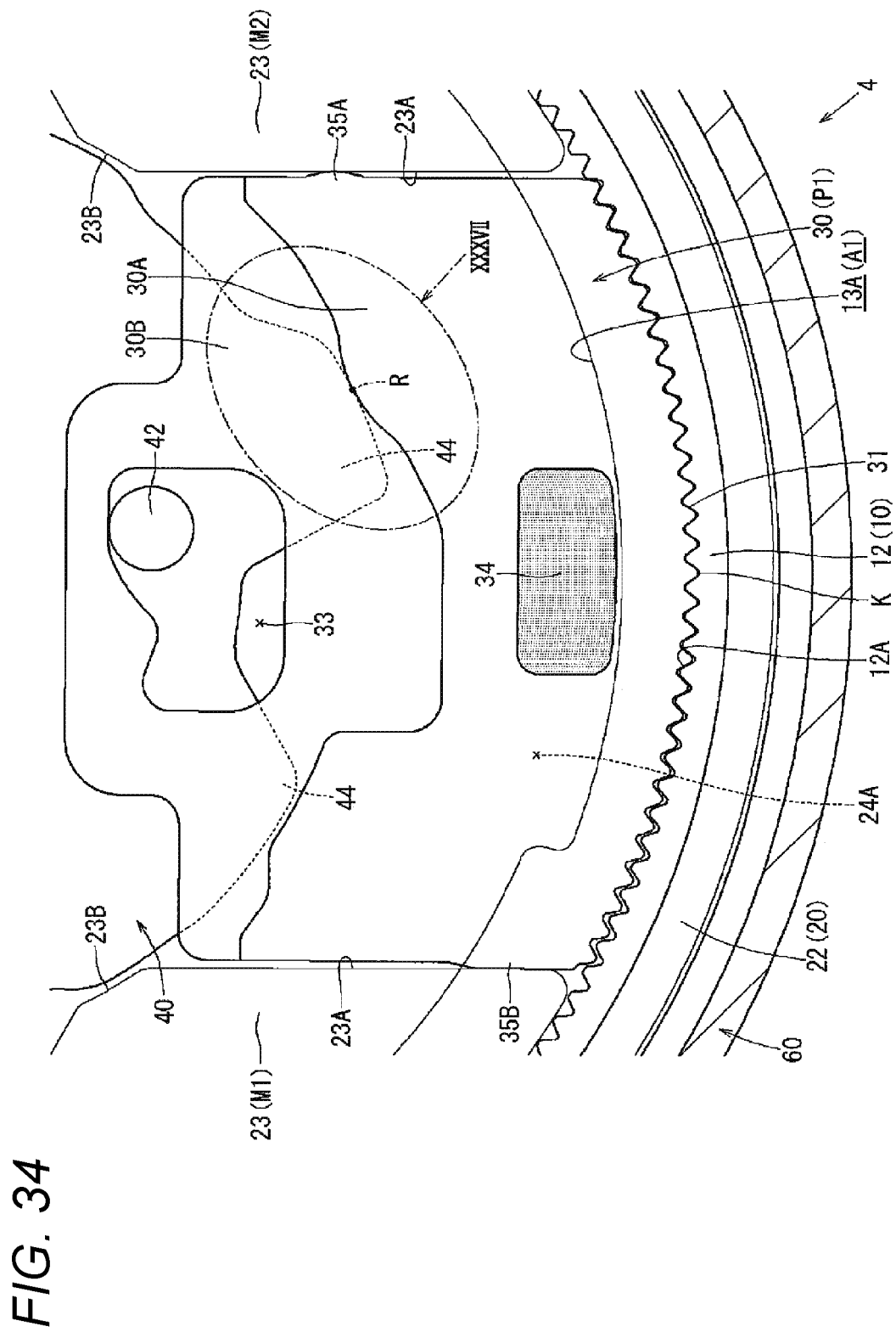
FIG. 34 is an enlarged view of a portion XXXIV in FIG. 10, which is an enlarged view of a meshing state of a specific pawl with respect to the ratchet.

Similarly to the inner teeth 12A of the ratchet 10 that mesh with the outer teeth 31 of each pawl 30, the outer teeth 31 have a shape in which tooth surfaces are arranged at equal intervals at a pitch of two degrees in the rotation direction. According to the above configuration, as shown in FIG. 10, the outer teeth 31 of each pawl 30 are pressed into the inner teeth 12A of the ratchet 10 from the inner side in the radial direction, so that all the outer teeth 31 mesh with the inner teeth 12A. However, strictly speaking, as shown in FIG. 34, the outer teeth 31 of each pawl 30 are configured such that the outer teeth 31 are meshed with the inner teeth 12A of the ratchet 10 with a central tooth surface of the outer teeth 31 in the rotation direction enters the inner teeth 12A most deeply, and a tooth height decrease from a center in the rotation direction toward both end sides in the rotation direction such that insertion of the outer teeth 31 into the inner teeth 12A gradually becomes shallower.

Accordingly, during meshing of the outer teeth 31 of each pawl 30 with the inner teeth 12A of the ratchet 10, even when the pawl 30 is pressed straight outward in the radial direction, all the tooth surfaces of the outer teeth 31 do not grip the tooth surfaces of the inner teeth 12A, and the outer teeth 31 can be appropriately meshed with the inner teeth 12A. That is, the central tooth surface of the outer teeth 31 of each pawl 30 faces straight an advancing direction of meshing movement.

However, other tooth surfaces of the outer teeth 31 arranged from the central tooth surface toward both end sides in the rotation direction face obliquely in the rotation direction relative to the central tooth surface. Therefore, when each pawl 30 is pushed outward in the radial direction, the central tooth surface moves straightly toward a corresponding tooth surface of the inner teeth 12A of the ratchet 10, while the other teeth enter at an oblique angle toward the corresponding tooth surface of the inner teeth 12A.

However, as described above, since the tooth surfaces of the outer teeth 31 have a shape in which the tooth height gradually decreases from the central tooth surface toward the tooth surfaces on the both end sides in the rotation direction, even when the tooth surfaces other than the central tooth surface enter the tooth surfaces of the inner teeth 12A at an oblique angle, the tooth surfaces of the outer teeth 31 can enter the tooth surfaces of the inner teeth 12A (meshing state) without abutting against the tooth surfaces of the inner teeth 12A. Since a tooth surface shape of the outer teeth 31 is the same as that disclosed in JP-A-2015-29635 and the like, detailed description thereof is omitted.

As shown in FIG. 9, the rotation cam 40 to be described later, which is set at the central portion of the guide 20, faces the main body surface portions 30A of the pawls 30 in the radial direction in a region on inner circumferential sides of the main body surface portions 30A. According to the above setting, the pawls 30 are provided in a state in which the main body surface portions 30A face the rotation cam 40 in the radial direction and the offset surface portions 30B face the rotation cam 40 in the axial direction.

As shown in FIG. 5, a pressed surface portion 32 is formed on an inner circumferential surface portion of the main body surface portion 30A of each pawl 30. The pressed surface portion 32 faces the rotation cam 40 in the radial direction and is pressed outward from the inner side in the radial direction with rotation of the rotation cam 40. Pull-in holes 33 penetrate, in the axial direction, an intermediate portion of the offset surface portions 30B of each pawl 30. The pull-in holes 33 are operated such that pull-in pins 42 formed at corresponding positions of the rotation cam 40 are inserted into the pull-in holes 33 and are pulled inward in the radial direction with the rotation of the rotation cam 40. The ride-up protrusion 34 protruding in the same direction as an extruding direction of the offset surface portion 30B is formed at an intermediate portion of the main body surface portion 30A of each pawl 30.

As shown in FIG. 10, when the rotation cam 40 is rotated in a shown counterclockwise direction by a spring biasing force of the lock spring 50 hooked between the rotation cam 40 and the guide 20, the pressed surface portions 32 of the pawls 30 are pressed outward from the inner side in the radial direction by corresponding pressing portions 44 formed on an outer circumferential surface portion of the rotation cam 40. Accordingly, the outer teeth 31 of the pawls 30 are pressed against the inner teeth 12A of the ratchet 10 and meshed with the inner teeth 12A, and the pawls 30 are held in this state (locked state).

Accordingly, the pawls 30 are integrally coupled to the ratchet 10 in the rotation direction, and the relative rotation between the ratchet 10 and the guide 20 is locked via the pawls 30. In addition, through the meshing caused by pressing of the pawls 30 in the radial direction, the ratchet 10 and the guide 20 are locked in a state in which rattling in the radial direction is prevented. Preventing the rattling thus is also generally referred to as "rattling prevention".

As shown in FIG. 11, when the rotation cam 40 is rotated in a shown clockwise direction against the spring biasing force of the lock spring 50 by an operation on the reclining lever 5, the pull-in holes 33 of the pawls 30 are pulled inward in the radial direction by the corresponding pull-in pins 42 of the rotation cam 40. Accordingly, the outer teeth 31 of the pawls 30 are released from the meshing state with the inner teeth 12A of the ratchet 10, and the pawls 30 are held in this state (unlocked state). Accordingly, the locked state of rotation between the ratchet 10 and the guide 20 is released.

As shown in FIG. 9, the ride-up protrusion 34 of each pawl 30 is extruded into a half-punched shape to the substantially same position in the axial direction (right direction in the figure) as the offset surface portion 30B of each pawl 30, and is set in a state in which an outer circumferential surface portion 34A of the ride-up protrusion 34 faces the inner circumferential surface of the intermediate cylindrical portion 13 of the ratchet 10 in the radial direction. As shown in FIGS. 10, 17A and 18A, when a rotation position of the ratchet 10 relative to the guide 20 is in the lock region A1, even when the pawls 30 are pushed outward in the radial direction by the rotation cam 40, the ride-up protrusion 34 of each pawl 30 is not pressed against an inner circumferential surface of the intermediate cylindrical portion 13 of the ratchet 10, which does not hinder movement of each pawl 30 meshing with the inner teeth 12A of the ratchet 10.

However, as shown in FIGS. 13, 17B and 18B, when the rotation position of the ratchet 10 relative to the guide 20 is shifted to the free region A2, the pawls 30 are pressed outward in the radial direction by the rotation cam 40, and thus the ride-up protrusion 34 of each pawl 30 is pressed against the inner circumferential surface of the intermediate cylindrical portion 13 of the ratchet 10, so as to stop the movement of each pawl 30 meshing with the inner teeth 12A of the ratchet 10 in the middle. Hereinafter, the above configurations will be described in detail.

The ride-up protrusions 34 of the pawls 30 are configured to be different in dimension in the radial direction from a central portion (position at the rotation center C) of the guide 20 to the outer circumferential surface portion 34A, that is, different in forming positions in the radial direction, between the main pawl P1 and the other two sub pawls P2. Specifically, the ride-up protrusion 34 of the main pawl P1 is formed at a position where the ride-up protrusion 34 of the main pawl P1 protrudes outward in the radial direction than the ride-up protrusions 34 of the other two sub pawls P2.

As shown in FIGS. 10, 17A, and 18A, when the ride-up protrusion 34 of the main pawl P1 overlaps with the first region 13A (lock region A1) of the intermediate cylindrical portion 13 of the ratchet 10 in the rotation direction, the ride-up protrusion 34 of the main pawl P1 is not pushed out to a position where the ride-up protrusion 34 rides on the first region 13A even when being pushed outward in the radial direction by the rotation cam 40, and thus does not hinder movement of the main pawl P1 meshing with the inner teeth 12A of the ratchet 10.

At this time, the ride-up protrusions 34 of the other two sub pawls P2 are also not pushed out to positions at which the ride-up protrusions 34 respectively ride on the second region 13B and the third region 13C even when being pushed outward in the radial direction by the rotation cam 40, and thus do not hinder movement of the sub pawls P2 meshing with the inner teeth 12A of the ratchet 10. That is, the ride-up protrusions 34 of the sub pawls P2 are formed at positions inward in the radial direction relative to the ride-up protrusion 34 of the main pawl P1. Therefore, even when the two sub pawls P2 overlap with the second region 13B (relief region A3) and the third region 13C (relief region A3) that protrude inward in the radial direction relative to the first region 13A in the rotation direction, the two sub pawls P2 are not pushed to positions at which the two sub pawls P2 respectively ride on the second region 13B and the third region 13C when the being pushed outward in the radial direction by the rotation cam 40.

As shown in FIGS. 13, 17B, and 18B, when the ride-up protrusion 34 of the main pawl P1 overlaps with the second region 13B (free region A2) of the intermediate cylindrical portion 13 of the ratchet 10 in the rotation direction, the ride-up protrusion 34 of the main pawl P1 rides on the second region 13B when being pushed outward in the radial direction by the rotation cam 40, and thus stops movement of the main pawl P1 meshing with the inner teeth 12A of the ratchet 10 in the middle.

At this time, even when the ride-up protrusions 34 of the other two sub pawls P2 overlaps with the corresponding third region 13C (relief region A3) and the first region 13A (relief region A3) in the rotation direction, the ride-up protrusions 34 of the other two sub pawls P2 are not pushed to positions at which the ride-up protrusions 34 ride on the third region 13C (relief region A3) and the first region 13A (relief region A3) when being pushed outward in the radial direction by the rotation cam 40, and thus do not stop movement of the sub pawls P2 outward in the radial direction. Even with such a configuration, when the movement of the main pawl P1 is stopped in the middle, the rotation of the rotation cam 40 is stopped in the middle, so that the sub pawls P2 are not further pushed outward in the radial direction, and the sub pawls P2 are held together with the main pawl P1 in the unlocked state in which meshing movement to the inner teeth 12A of the ratchet 10 is stopped in the middle.

As shown in FIGS. 4, 5, 19, and 20, each pawl 30 is formed such that the ride-up protrusion 34 and the offset surface portion 30B are extruded from the main body surface portion 30A into a half-punched shape in the same axial direction. When the offset surface portion 30B of each pawl 30 is shaped, an accuracy control surface Q that controls accuracy of a shaping surface is not set on an outer circumferential surface portion of the offset surface portion 30B of each pawl 30, but on the inner circumferential surface portion (pressed surface portion 32) of the main body surface portion 30A. Accordingly, each pawl 30 has a configuration in which the pressed surface portion 32 is formed with high accuracy.

When the ride-up protrusion 34 of each pawl 30 is shaped, the accuracy control surface Q that controls accuracy of the shaping surface is set on the outer circumferential surface portion 34A whose surface faces outward in the radial direction. Accordingly, each pawl 30 has a configuration in which the outer circumferential surface portion 34A is formed with high accuracy. Thus, by shaping each pawl 30 such that the offset surface portion 30B and the ride-up protrusion 34 are extruded into a half-punched shape from the main body surface portion 30A so as to be arranged and spaced apart from each other in the radial direction, the accuracy control surfaces Q are set on front and back sides as described above and accuracy of shaping surfaces can be obtained.

The pressed surface portion 32 of each pawl 30 has a configuration in which regions deviated from a formation position of the ride-up protrusion 34 of the pawl 30 on both sides in the rotation direction are pressed from the inner side in the radial direction by the corresponding pressing portion 44 of the rotation cam 40 shown in FIG. 4. Therefore, the pressed surface portion 32 of each pawl 30 is configured such that accuracy control surfaces Q are set in regions on both sides that do not overlap with the ride-up protrusion 34 in the rotation direction, and the accuracy control surface Q is not set in a region that overlaps with the ride-up protrusion 34 in the rotation direction. According to such a configuration, even when the offset surface portion 30B and the ride-up protrusion 34 of each pawl 30 overlap with each other in the rotation direction, the accuracy control surfaces Q can be appropriately set and each shaping surface can be shaped with high accuracy.

<Rotation Cam 40>

As shown in FIG. 5, the rotation cam 40 is processed into a shape by cutting a metal plate member into a substantially disk shape and extruding portions of the substantially disk-shaped metal plate member in a half-punched shape in the plate thickness direction (axial direction). The rotation cam 40 is set in a state of being accommodated in the cam accommodating groove 24B formed on the inner surface of the disk main body 21 of the guide 20. As shown in FIG. 9, the rotation cam 40 has a shape in which a plate thickness thereof is substantially equal to that of each pawl 30.

The rotation cam 40 is set to be sandwiched in the axial direction between the inner surface of the disk main body 21 of the guide 20 and the offset surface portions 30B extruded in a half-punched shape in the axial direction of the pawls 30. Accordingly, the rotation cam 40 is covered from the outer side in the radial direction by the pressed surface portions 32 that are inner circumferential surface portions of the main body surface portions 30A of the pawls 30.

As shown in FIG. 5, the through hole 41 is formed in the central portion (position at the rotation center C) of the rotation cam 40. The operation pin 5A is inserted into the through hole 41 from an inner side in the axial direction and is integrally coupled with the rotation cam 40 in the rotation direction. The operation pin 5A is inserted through the through hole 41 of the rotation cam 40 from the inner side to the outer side in the axial direction, and is integrally connected with the reclining lever 5 as shown in FIG. 1 at a tip end thereof. According to the above assembly, the operation pin 5A integrally rotates the rotation cam 40 in accordance with an operation of pulling up the reclining lever 5.

The operation pin 5A is integrally coupled to the operation pin 5A inserted into the seat reclining device 4 on the other side in FIG. 1 via a connecting rod 5B. Accordingly, the two operation pins 5A are rotated together by the operation of pulling up the reclining lever 5, and rotation cams 40 of the two seat reclining devices 4 are rotated together.

Figure 6:
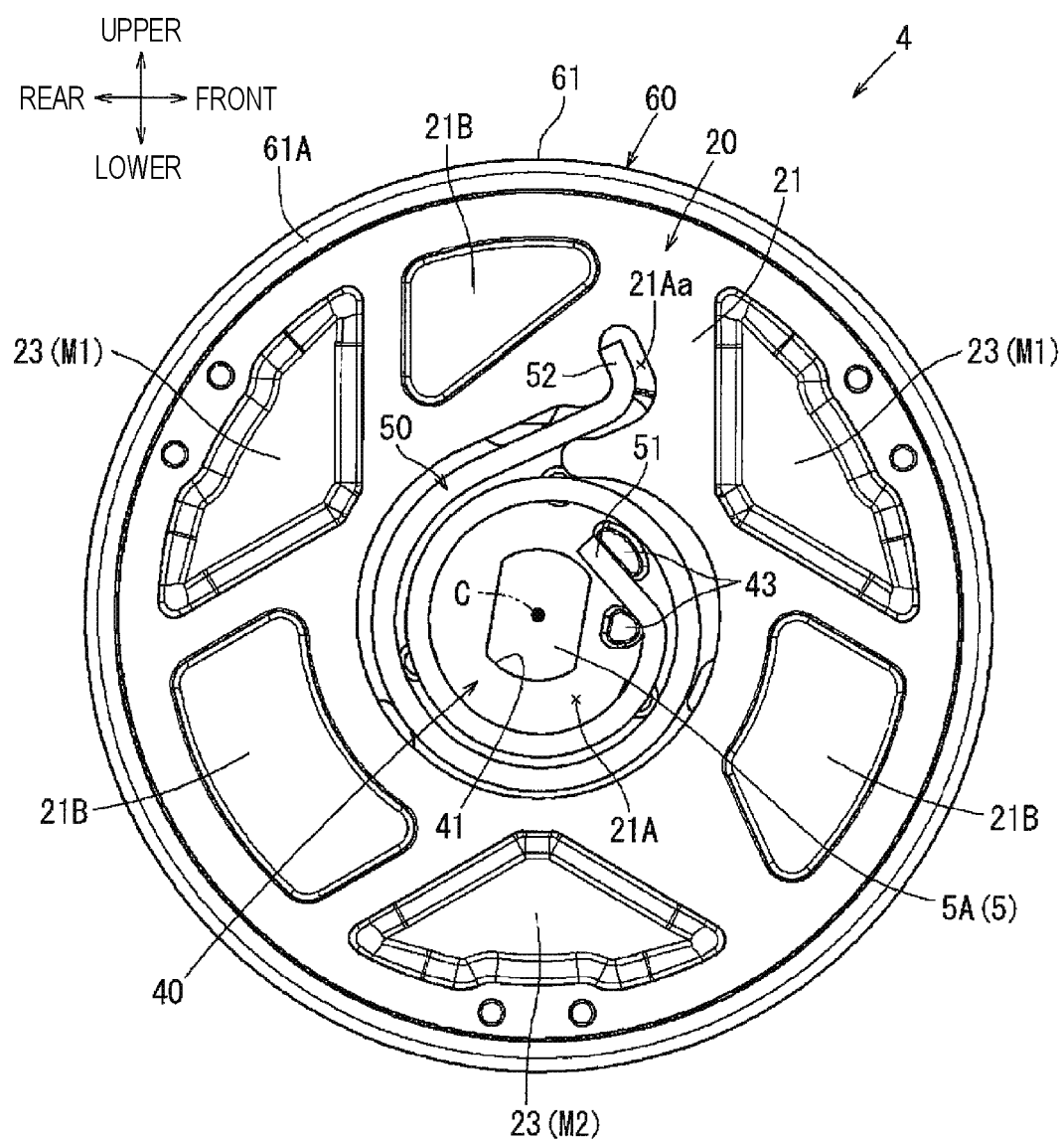
FIG. 6 is an outer side view of the vehicle seat reclining device.

As shown in FIG. 5, the rotation cam 40 is formed in a substantially disk shape that is slightly larger than the through hole 21A formed in the central portion (position at the rotation center C) of the guide 20. On an outer surface of the rotation cam 40 that faces inside of the through hole 21A of the guide 20, two hook pins 43 protrude in the axial direction toward the inside of the through hole 21A. As shown in FIGS. 2 and 6, an inner end portion 51 of the lock spring 50 is hooked and fixed to the hook pins 43 in a form of being sandwiched therebetween. As shown in FIG. 10, the rotation cam 40 includes the pull-in pins 42 on an inner surface of the rotation cam 40 that faces the offset surface portions 30B of the pawls 30. The pull-in pins 42 protrude in the axial direction and enter the pull-in holes 33 of the pawls 30.

The rotation cam 40 is assembled to the guide 20 in a state of being elastically supported by the guide 20 via the lock spring 50. Specifically, the assembling is performed in a following procedure. First, the rotation cam 40 is set in the cam accommodating groove 24B of the guide 20. Next, the lock spring 50 is set in the through hole 21A of the guide 20, the inner end portion 51 of the lock spring 50 is hooked between the hook pins 43 of the rotation cam 40, and the outer end portion 52 of the lock spring 50 is hooked in the hook hole 21Aa extending from the through hole 21A of the guide 20. As described above, the rotation cam 40 is assembled to the guide 20 in a state of being elastically supported by the guide 20 via the lock spring 50.

The rotation cam 40 is rotationally biased in the counterclockwise direction as shown in FIG. 10 with respect to the guide 20 by the spring biasing force of the lock spring 50 hooked between the rotation cam 40 and the guide 20. By rotation caused by the biasing, the rotation cam 40 constantly presses the pressed surface portions 32 (see FIG. 9) of the pawls 30 from the inner side in the radial direction by the pressing portions 44 protruding from a plurality of positions on the outer circumferential surface portion of the rotation cam 40, and the pawls 30 are meshed with the inner teeth 12A of the ratchet 10.

As shown in FIG. 11, when the reclining lever 5 in FIG. 1 is pulled up, the rotation cam 40 is rotated in the shown clockwise direction via the operation pin 5A. Accordingly, the rotation cam 40 pulls the pawls 30 inward in the radial direction by the pull-in pins 42 inserted into the pull-in holes 33 of the pawls 30, so as to release the pawls 30 from the meshing state of being meshed with the inner teeth 12A of the ratchet 10. Specifically, with the rotation of the rotation cam 40 in the shown clockwise direction, the pull-in pins 42 are pressed against inclined surfaces erected on corresponding inner circumferential edge sides of the pull-in holes 33, and the pawls 30 are pulled inward in the radial direction.

As shown in FIG. 10, the rotation cam 40 is configured such that, in the state (locked state) in which the pawls 30 are pushed from the inner side in the radial direction and meshed with the inner teeth 12A of the ratchet 10, the inner end portion 51 of the lock spring 50 hooked on the hook pins 43 is disposed in a rotation region between two guide walls M1 on an upper left side and an upper right side in the figure among the three guide walls 23 formed on the guide 20.

In this state, the rotation cam 40 receives, by the spring biasing force received from the inner end portion 51 of the lock spring 50, not only a rotational biasing force in the shown counterclockwise direction relative to the guide 20 but also a biasing force in an eccentric direction in which the rotation cam 40 is pushed outward in the radial direction. However, since the three pawls 30 mesh with the inner teeth 12A of the ratchet 10, the rotation cam 40 is supported by the pawls 30 and is held in a state centered on the central portion (position at the rotation center C) of the guide 20.

Figure 16:
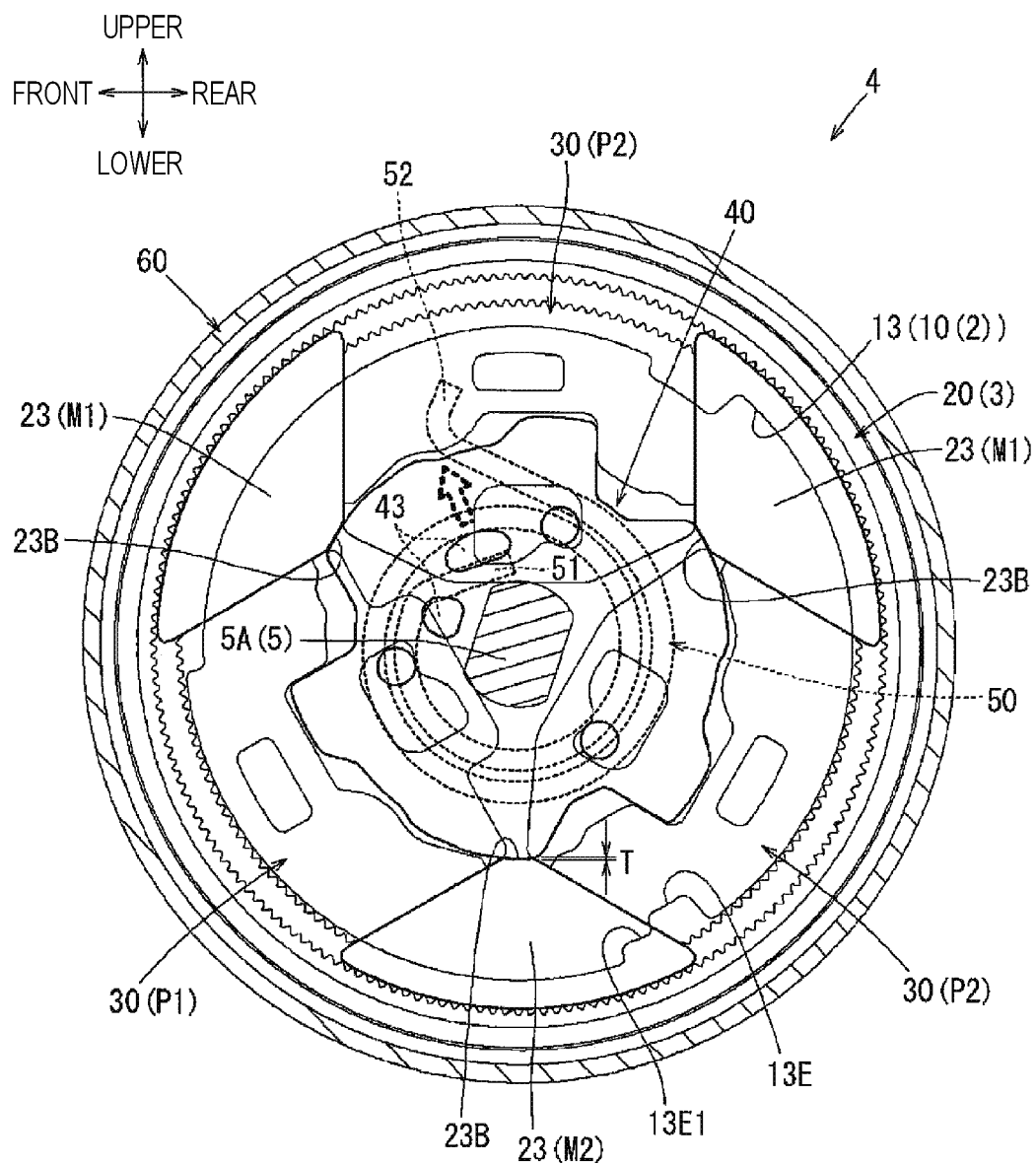
FIG. 16 is a cross-sectional view showing a state in which a rotation cam is pressed against a guide wall by biasing.

As shown in FIG. 11, the rotation cam 40 is operated to rotate in the shown clockwise direction and the pawls 30 are released from the meshing state of being meshed with the inner teeth 12A of the ratchet 10. Thus, the rotation earn 40 is rotated in the clockwise direction in the figure by the biasing force in the eccentric direction received from the inner end portion 51 of the lock spring 50, resulting in being pressed against the support surfaces 23B on inner circumferential sides of the two guide walls M1 as shown in FIG. 16 and sliding on the support surfaces 23B of the two guide walls M1. At this time, unlike the two guide walls M1, the remaining guide wall M2 (guide wall M2 on a lower side in the figure) does not contact an outer circumferential surface of the rotation cam 40, and a slight gap T in the radial direction is generated between the guide wall M2 and the outer circumferential surface of the rotation cam 40.

According to such a configuration, the rotation cam 40 can be appropriately supported by the two guide walls M1 against which the rotation cam 40 is pressed by the spring biasing force of the lock spring 50 so as not to move in an axial deviation direction (eccentric direction). In addition, it is possible to appropriately prevent a movement in which the rotation cam 40 is axially deviated (eccentric) in a certain direction of the other guide wall M2 with the two guide walls M1 as a fulcrum. Therefore, the rotation cam 40 can be smoothly slid and rotated in a release direction without being eccentric.

<Outer Circumferential Ring 60>

As shown in FIGS. 4 and 5, the outer circumferential ring 60 is formed in a substantially cylindrical shape having a hollow disk-shaped base (flange portion 62) by punching a thin metal plate into a ring shape and drawing an outer circumferential edge portion of the punched metal plate to protrude in a cylindrical shape in the axial direction. Specifically, the outer circumferential ring 60 includes the flange portion 62 having a hollow disk shape and having a surface facing straight in the axial direction, and a coupling portion 61 protruding from an outer circumferential edge portion of the flange portion 62 in a substantially cylindrical shape in the axial direction.

Specifically, the outer circumferential edge portion of the outer circumferential ring 60 has a shape of being extruded to protrude into a stepped cylindrical shape with two stages in the axial direction. Accordingly, a cylindrical part on an outer circumferential side of a stepped cylinder is formed as the substantially cylindrical coupling portion 61, and a cylindrical part on an inner circumferential side is formed as a stepped portion 63 having a shorter protruding length in the axial direction than the coupling portion 61.

The outer circumferential ring 60 is installed across outer circumferential portions of the ratchet 10 and the guide 20 as follows, and is assembled in a state of preventing the ratchet 10 and the guide 20 from coming off in the axial direction. First, the three pawls 30, the rotation cam 40, and the lock spring 50 are set on the guide 20. Next, the ratchet 10 is assembled to the guide 20, and the ratchet 10 and the guide 20 are set inside a cylinder of the outer circumferential ring 60 (inside the coupling portion 61).

Figure 15:
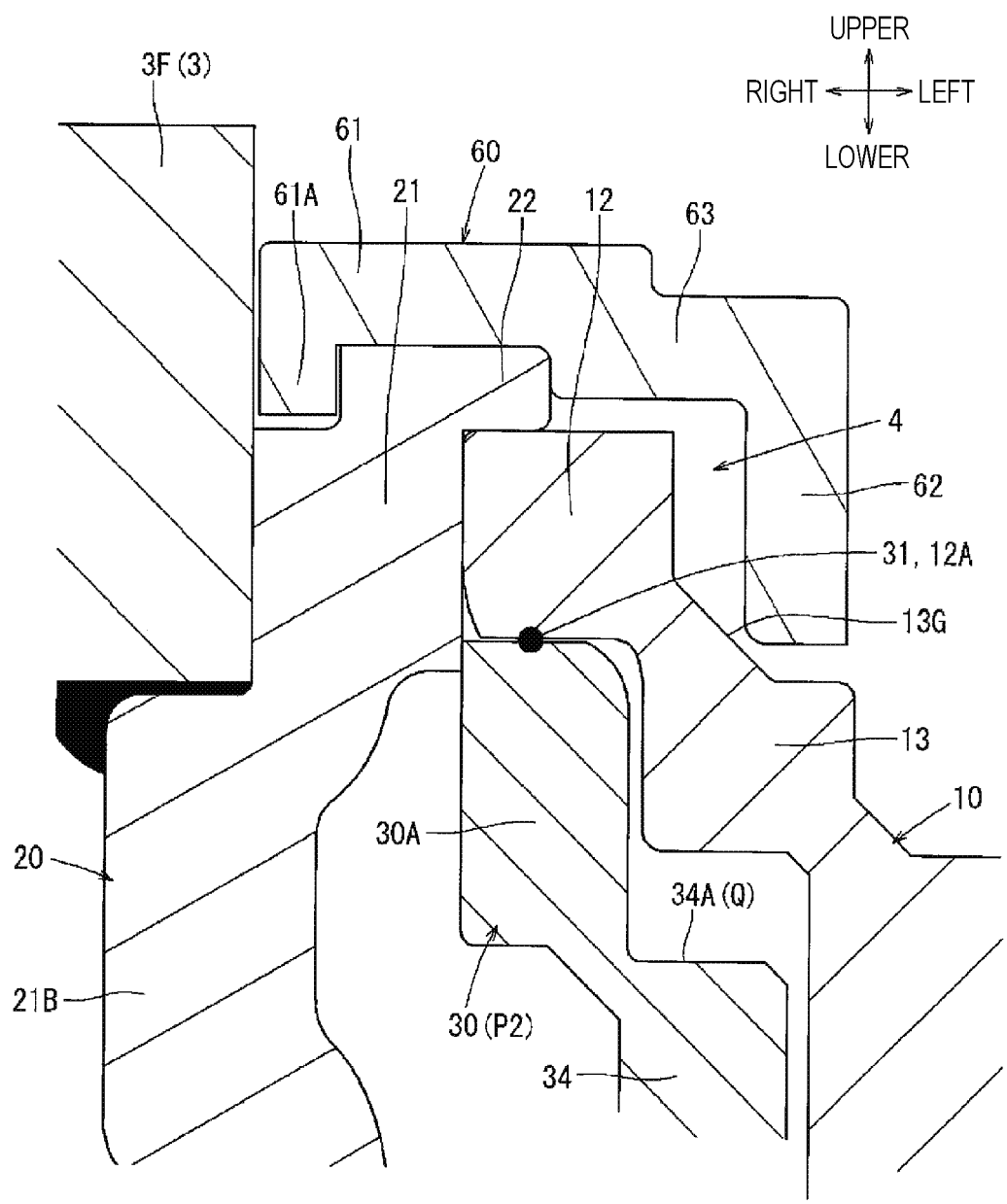
FIG. 15 is an enlarged view of a part XV in FIG. 9.

Then, as shown in FIG. 15, a protruding tip portion (crimped portion 61A) of the coupling portion 61 is crimped onto an outer surface of the cylindrical portion 22 of the guide 20. As described above, the coupling portion 61 of the outer circumferential ring 60 is integrally coupled to the cylindrical portion 22 of the guide 20, and the flange portion 62 is abutted against the ratchet 10 from the outer side in the axial direction. Accordingly, the outer circumferential ring 60 is installed across the outer circumferential portions of the ratchet 10 and the guide 20, and is assembled to prevent the ratchet 10 and the guide 20 from coming off in the axial direction.

The assembling will be described more specifically, and the outer circumferential ring 60 is set in a state in which the cylindrical portion 22 of the guide 20 is abutted in the axial direction against the stepped portion 63 by sequentially assembling the ratchet 10 and the guide 20 into the cylinder (the coupling portion 61). Then, the cylindrical portion 12 of the ratchet 10 is abutted against the flange portion 62 from the inner side in the axial direction. Then, according to the above setting, the cylindrical portion 22 of the guide 20 is fitted completely in the axial direction into the cylindrical coupling portion 61 of the outer circumferential ring 60.

After the above setting, the tip portion (crimped portion 61A) of the coupling portion 61 of the outer circumferential ring 60, which extends outward in the axial direction from the cylindrical portion 22 of the guide 20 is bent inward in the radial direction and crimped onto the outer surface of the cylindrical portion 22 of the guide 20 such that the cylindrical portion 22 is sandwiched in the axial direction between the crimped portion 61A and the stepped portion 63. Accordingly, the outer circumferential ring 60 is integrally coupled to the guide 20, and the ratchet 10 is abutted against the flange portion 62 from the outer side in the axial direction and held by the flange portion 62, and is thus not detached in the axial direction.

Specifically, the flange portion 62 of the outer circumferential ring 60 is set such that a tip end portion of the flange portion 62 protruding inward in the radial direction is attached to an inclined surface 13G formed on an outer surface portion of the ratchet 10 in the axial direction at a position where the intermediate cylindrical portion 12 and the cylindrical portion 13 are continuous. The inclined surface 13G has a shape facing obliquely outward in the radial direction. Therefore, by attaching the tip end portion of the flange portion 62 of the outer circumferential ring 60 to the inclined surface 13G, the ratchet 10 is prevented from rattling outward in the axial direction or outward in the radial direction.

Here, as shown in FIGS. 5 and 7, oblique abutting portions 62A crimped to protrude obliquely inward in the axial direction are formed on the flange portion 62 of the outer circumferential ring 60 at three positions in the rotation direction of the flange portion 62. When the oblique abutting portions 62A overlap in the rotation direction with protruding inclined surfaces 13H that are formed on the inclined surface 13G of the ratchet 10 at three positions in the rotation direction and that have surfaces obliquely directed outward in the axial direction and outward in the radial direction, the oblique abutting portions 62A ride on the corresponding protruding inclined surfaces 13H. With the ride-on, the oblique abutting portions 62A are held in a state in which the ratchet 10 is more appropriately prevented from rattling outward in the axial direction and outward in the radial direction.

Each of the oblique abutting portions 62A of the flange portion 62 is formed by partially bending the flange portion 62 obliquely inward in the axial direction with a joint with the stepped portion 63 as a base point. According to a shape of a mold against which the ratchet 10 is abutted during half-punching, each protruding inclined surface 13H formed on the inclined surface 13G of the ratchet 10 protrudes substantially parallel to the inclined surface 13G.

The protruding inclined surfaces 13H are disposed at equal intervals on the inclined surface 13G at three positions in the rotation direction. Each of the protruding inclined surfaces 13H has a length of about 20 degrees in the rotation direction. On both side portions of each protruding inclined surface 13H in the rotation direction, guide inclined surfaces 13H1 that are padded to obliquely smooth a step between the protruding inclined surface 13H and the inclined surface 13G are formed. The oblique abutting portions 62A formed on the flange portion 62 of the outer circumferential ring 60 are also disposed at equal intervals on the flange portion 62 at three positions in the rotation direction. Each of the oblique abutting portions 62A also has a length of about 20 degrees in the rotation direction.

Figure 22:
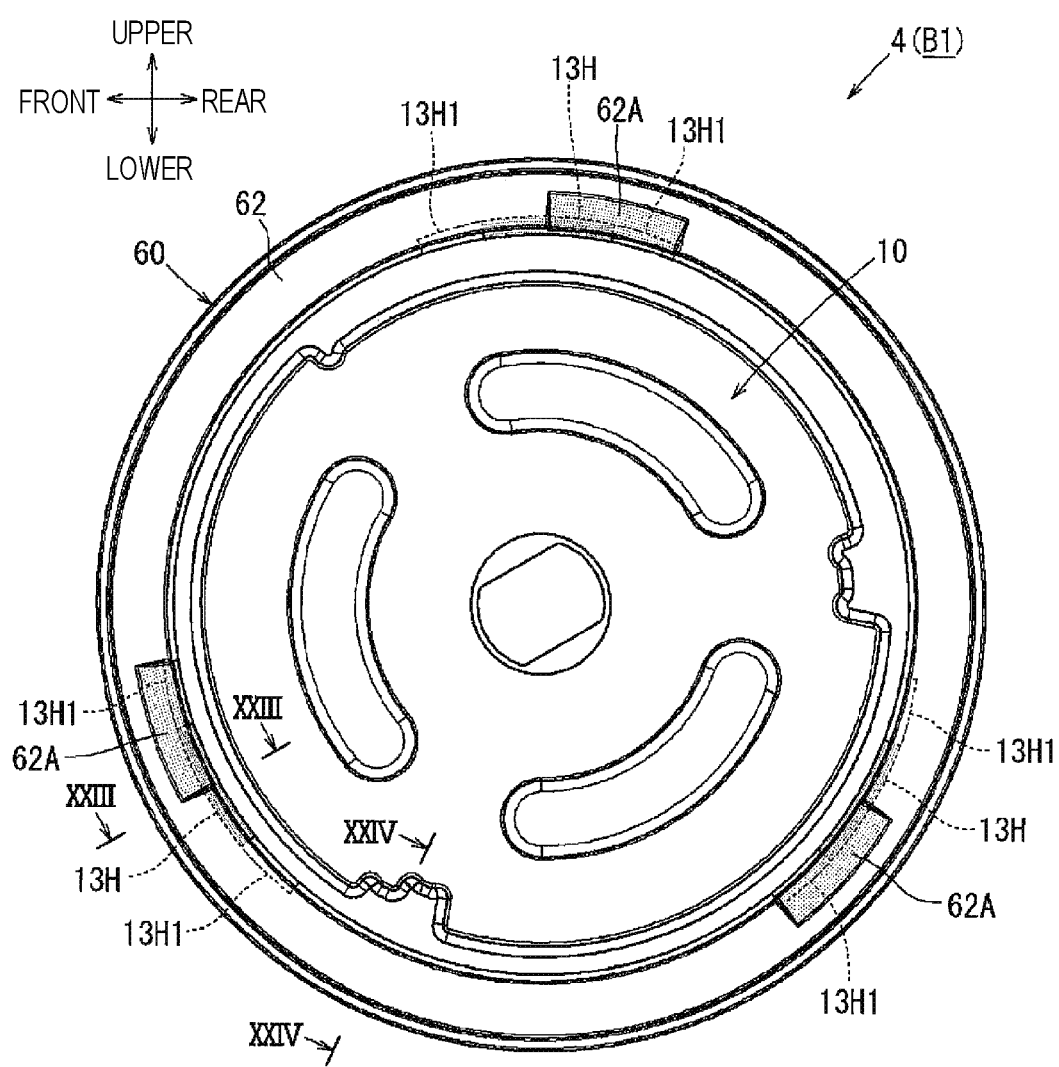
FIG. 22 is an inner side view showing a state of the vehicle seat reclining device in FIG. 21.
Figure 23:
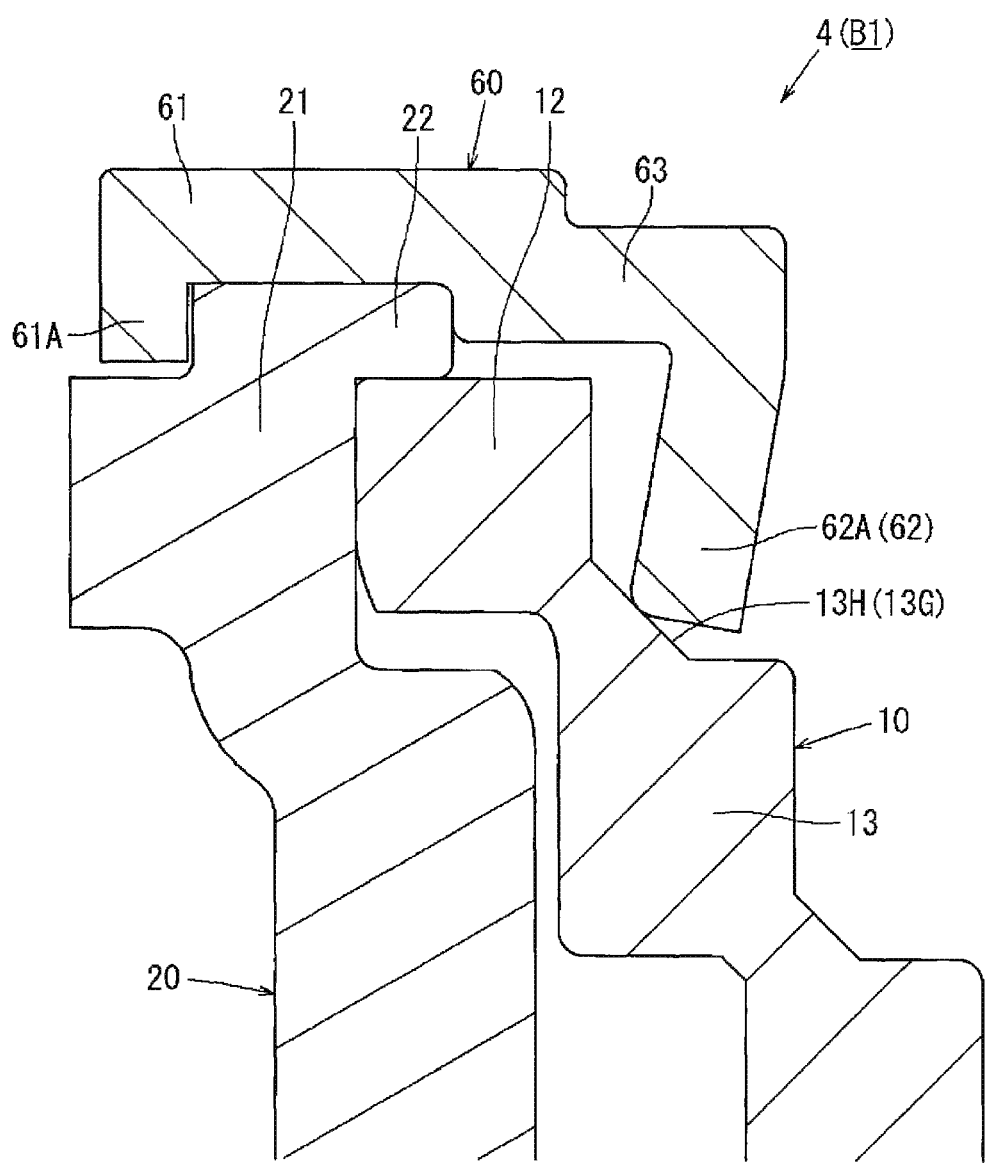
FIG. 23 is a cross-sectional view taken along a line XXIII-XXIII in FIG. 22.

The outer circumferential ring 60 is configured such that, when the backrest angle of the seat back 2 is in an angular region (abutting region B1) between the initial lock position Pb in a posture that the seat back 2 stands up straightly and a torso angle Pd (about 20 degrees) as shown in FIG. 21, the oblique abutting portions 62A of the flange portion 62 ride on and are abutted against the corresponding protruding inclined surfaces 13H formed on the inclined surface 13G of the ratchet 10 as shown in FIGS. 22 and 23.

Figure 24:
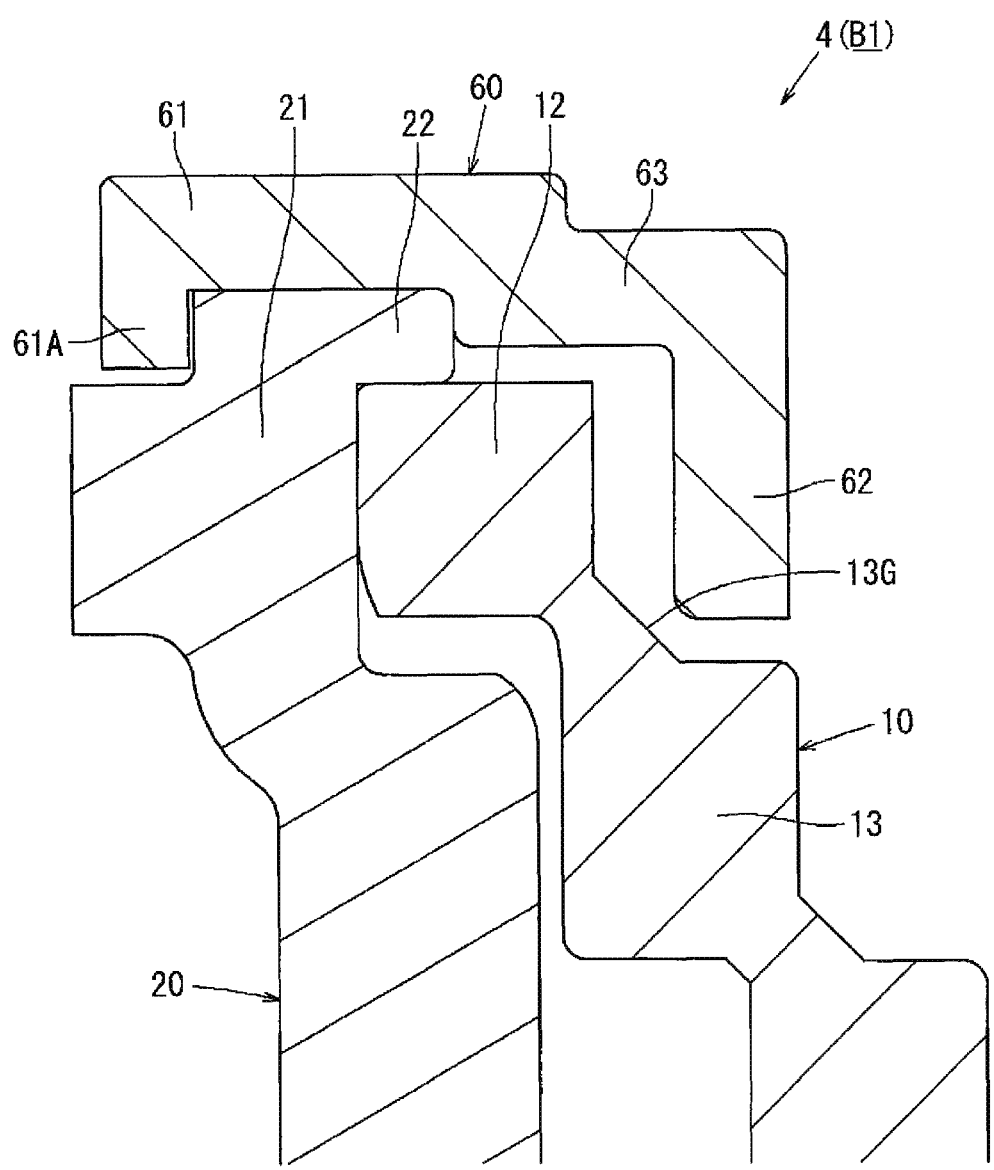
FIG. 24 is a cross-sectional view taken along a line XXIV-XXIV in FIG. 22.

Accordingly, the outer circumferential ring 60 is held in a state in which the ratchet 10 is appropriately prevented from rattling in the axial direction and the radial direction by the oblique abutting portions 62A. At this time, as shown in FIG. 24, a general surface of the flange portion 62 of the outer circumferential ring 60 is in a non-abutting state of being separated from a general surface of the inclined surface 13G of the ratchet 10 without abutting. As shown in FIG. 21, the abutting region B1 is set in an angular region of about 40 degrees between an angular position at which the backrest angle of the seat back 2 is inclined forward from the initial lock position Pb (upright position) by about 10 degrees, and an angular position at which the backrest angle of the seal back 2 is inclined rearward from the torso angle Pd by about 10 degrees.

In the abutting region B1, as shown in FIG. 22, since an effect of preventing rattling of the ratchet 10 by the outer circumferential ring 60 is relatively strong, an effect of a sliding friction resistance force associated with the abutment between the ratchet 10 and the outer circumferential ring 60 tends to exert a prevention force on rotational movement of the ratchet 10 with respect to the guide 20. However, when the seat back 2 is in the angular region in which the seat back 2 stands up, the biasing force of the return spring 6 (see FIG. 1) that biases the seat back 2 in the forward rotation direction is relatively strong. Therefore, even if an effect of the rattling prevention is strong, the seat back 2 can be smoothly rotationally moved.

Figure 25:
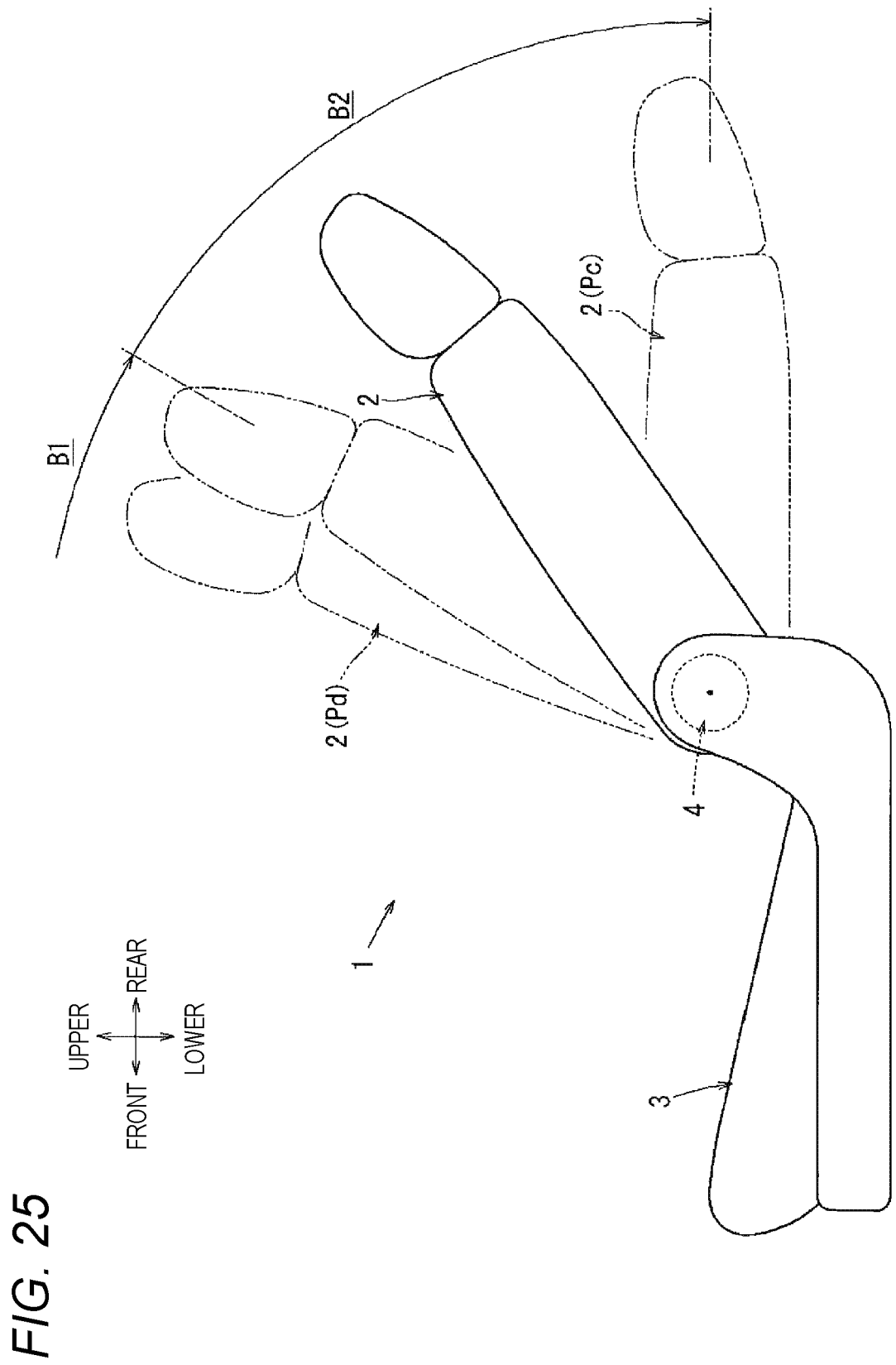
FIG. 25 is a side view showing a state in which the seat back is tilted rearward from a torso angle.
Figure 26:
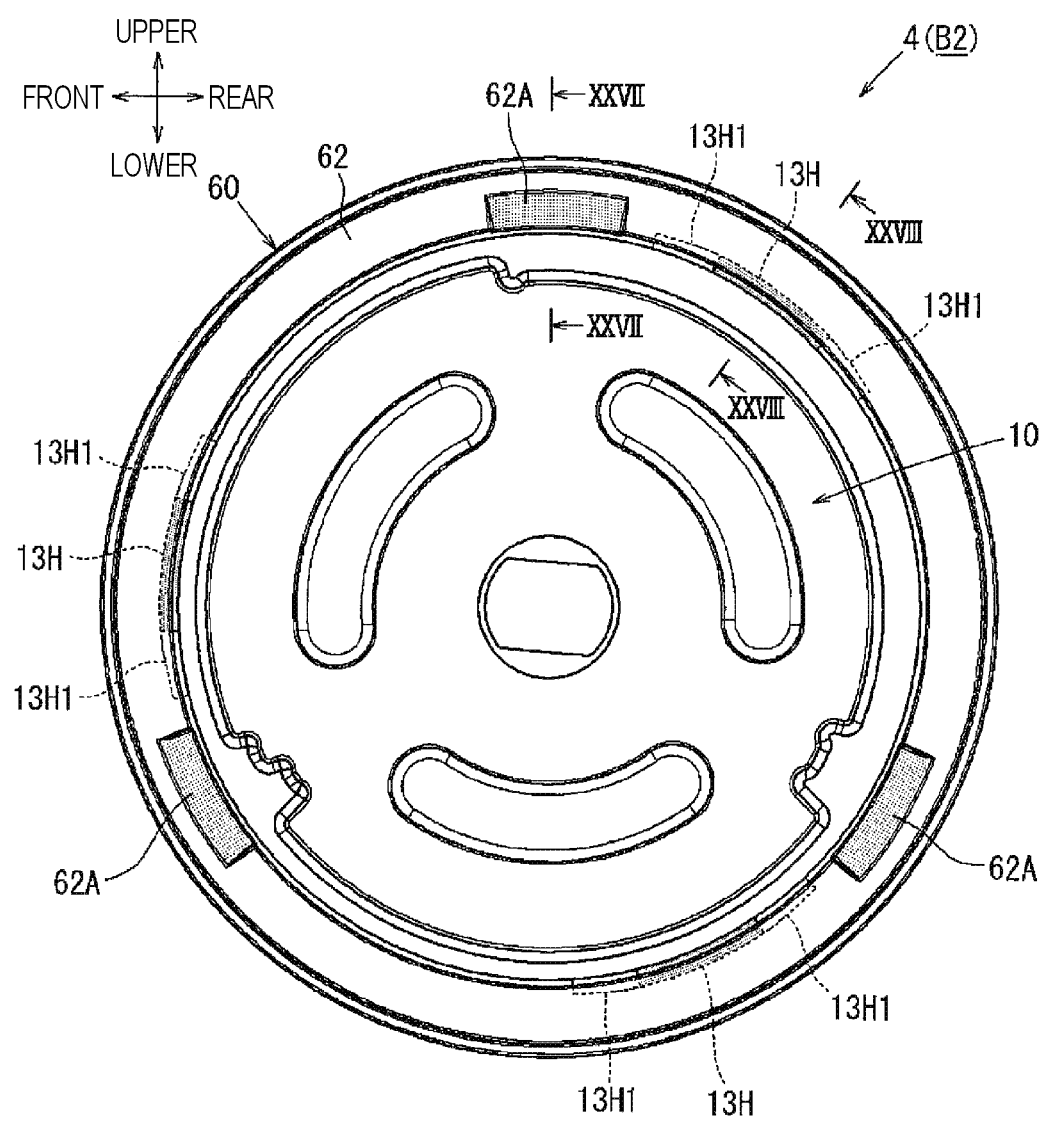
FIG. 26 is an inner side view showing a state of the vehicle seat reclining device in FIG. 25.
Figure 27:
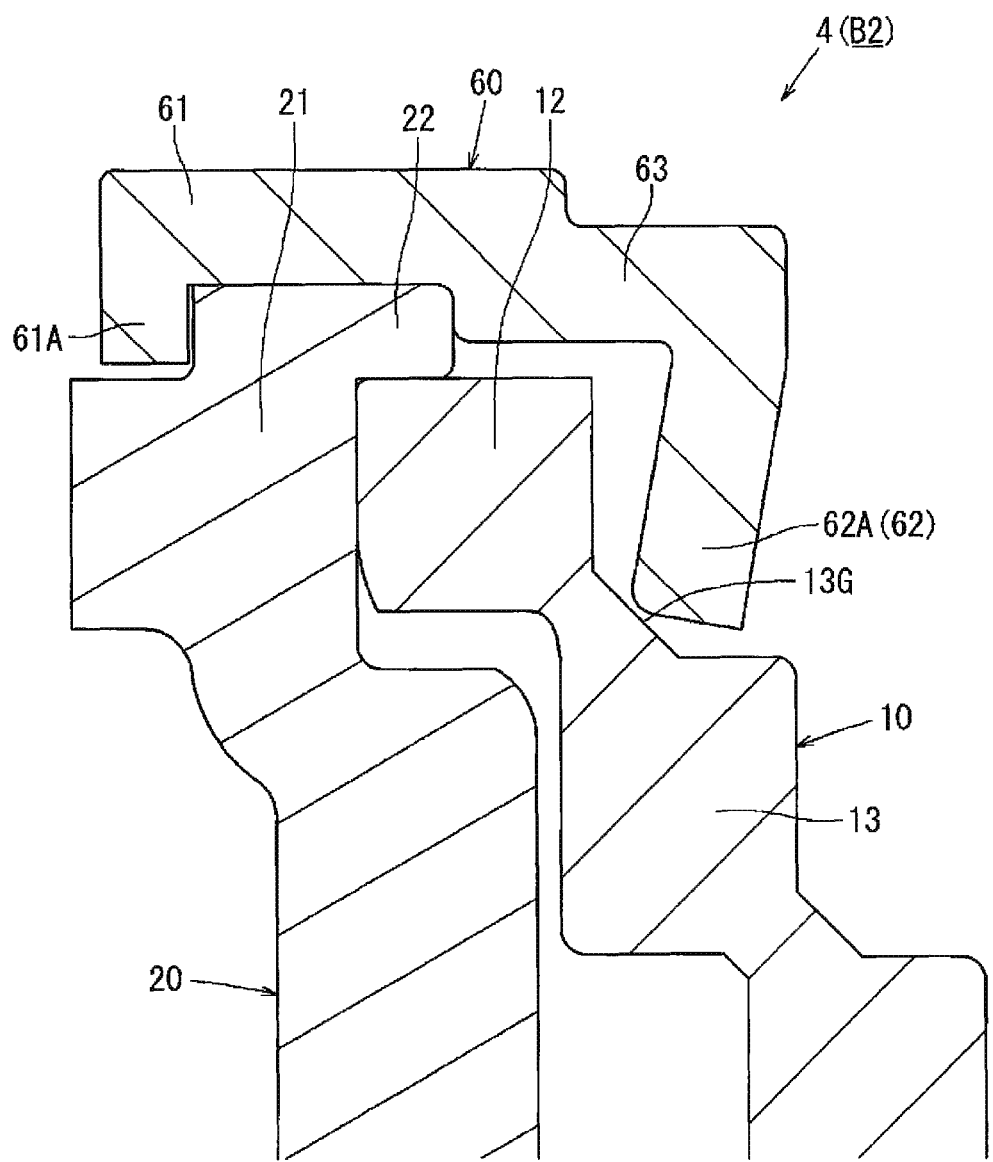
FIG. 27 is a cross-sectional view taken along a line XXVII-XXVII in FIG. 26.
Figure 28:
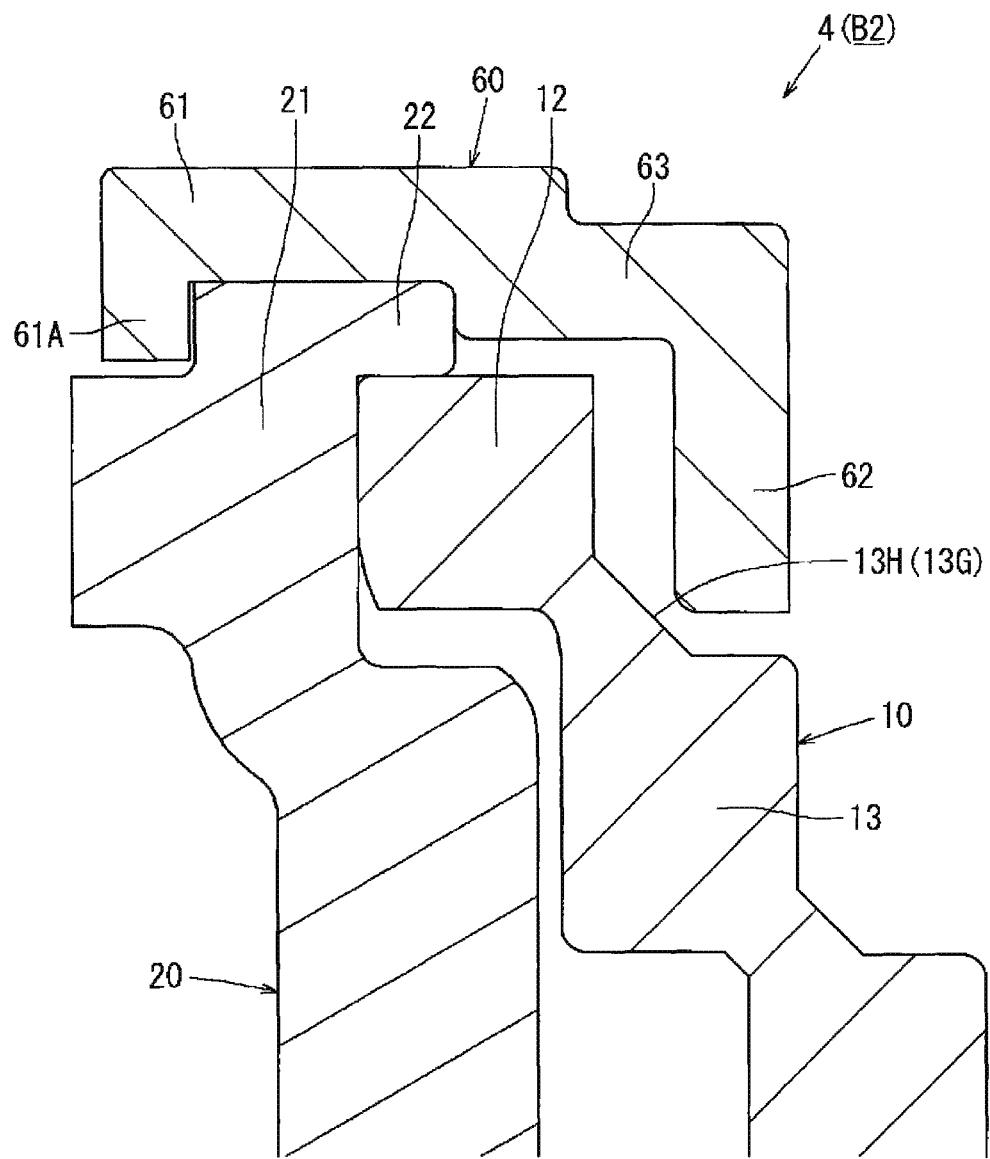
FIG. 28 is a cross-sectional view taken along a line XXVIII-XXVIII in FIG. 26.

The outer circumferential ring 60 is configured such that, as shown in FIG. 25, when the backrest angle of the seat back 2 is shifted to an angular region deviated rearward from the abutting region B1 shown in FIG. 21, as shown in FIGS. 26 to 28, the protruding inclined surfaces 13H formed on the inclined surface 13G of the ratchet 10 are deviated in the rotation direction from the corresponding oblique abutting portion 62A of the flange portion 62. Accordingly, the outer circumferential ring 60 is in a non-abutting state (non-abutting region B2) in which the inclined surface 13G of the ratchet 10 faces each oblique abutting portion 62A of the flange portion 62 with a slight gap.

In the non-abutting state, an effect of preventing rattling of the ratchet 10 by the outer circumferential ring 60 is weak, but the ratchet 10 can be smoothly and rotationally moved with respect to the guide 20 by the effect. Therefore, when the seat back 2 is in the angular region in which the seat back 2 is rearward tilted, although an effect of the biasing force of the return spring 6 (see FIG. 1) that biases the seat back 2 in the forward rotation direction is relatively weak, the seat back 2 can be smoothly erected forward.

Figure 29:
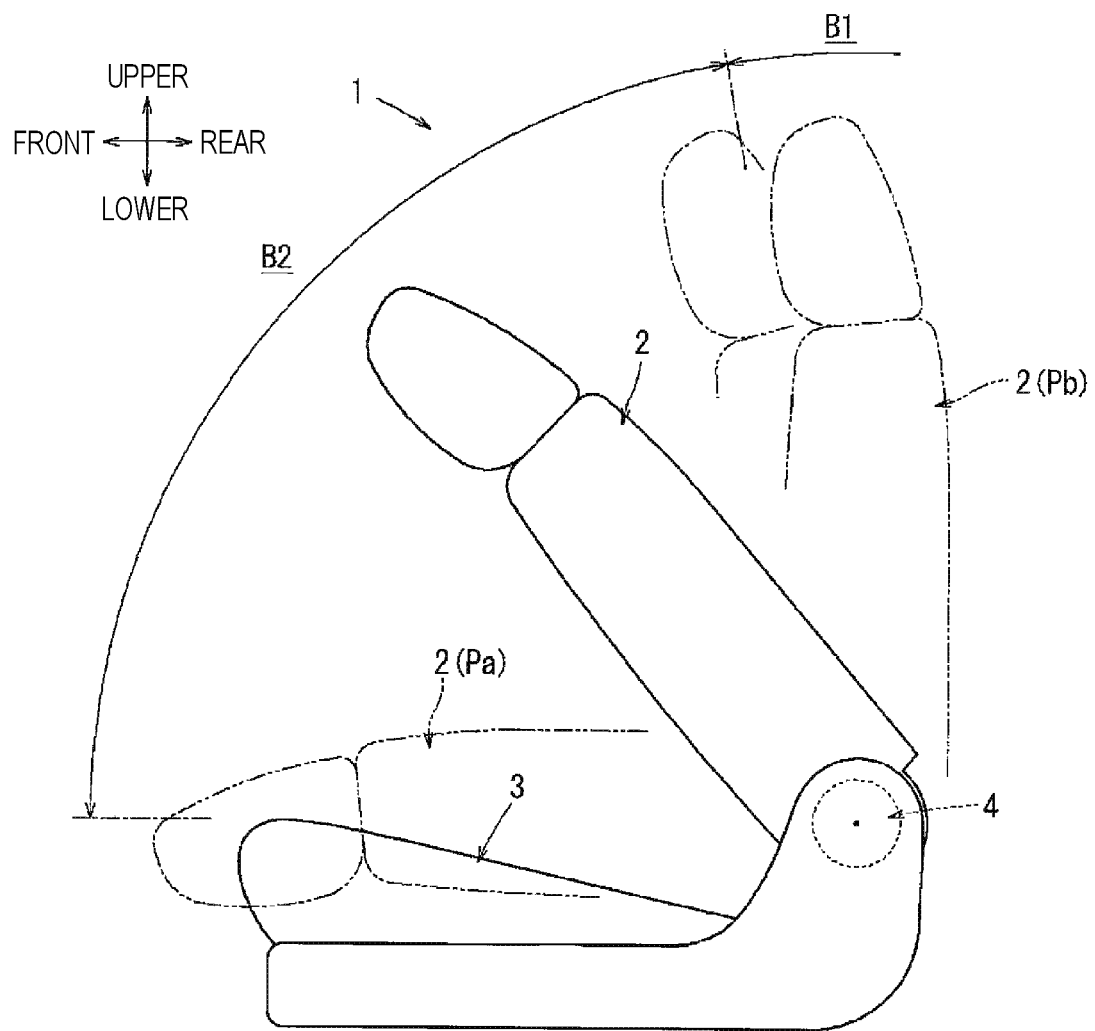
FIG. 29 is a side view showing a state in which the seat back is tilted forward from the torso angle.
Figure 30:
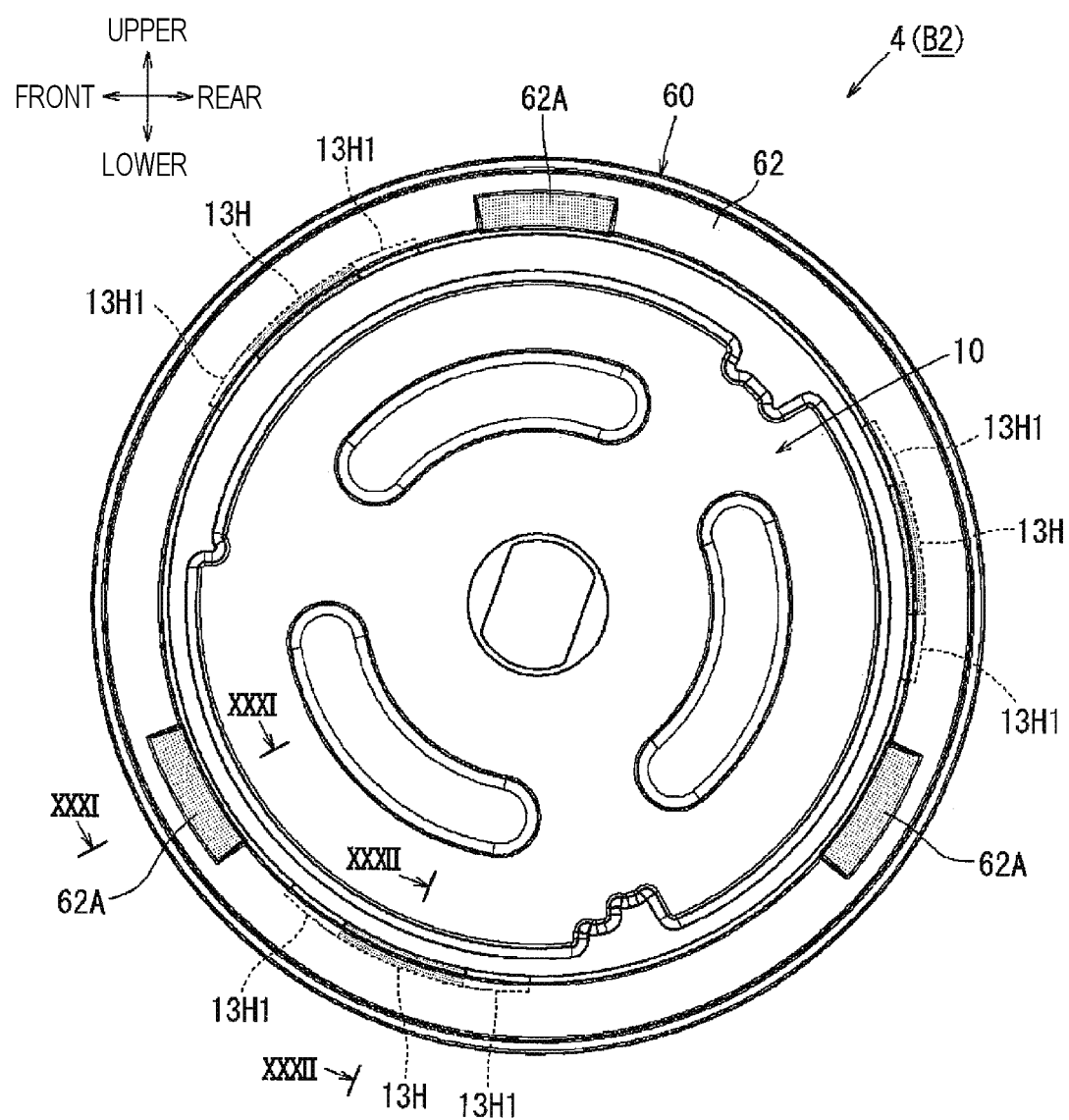
FIG. 30 is an inner side view showing a state of the vehicle seat reclining device in FIG. 29.
Figure 31:
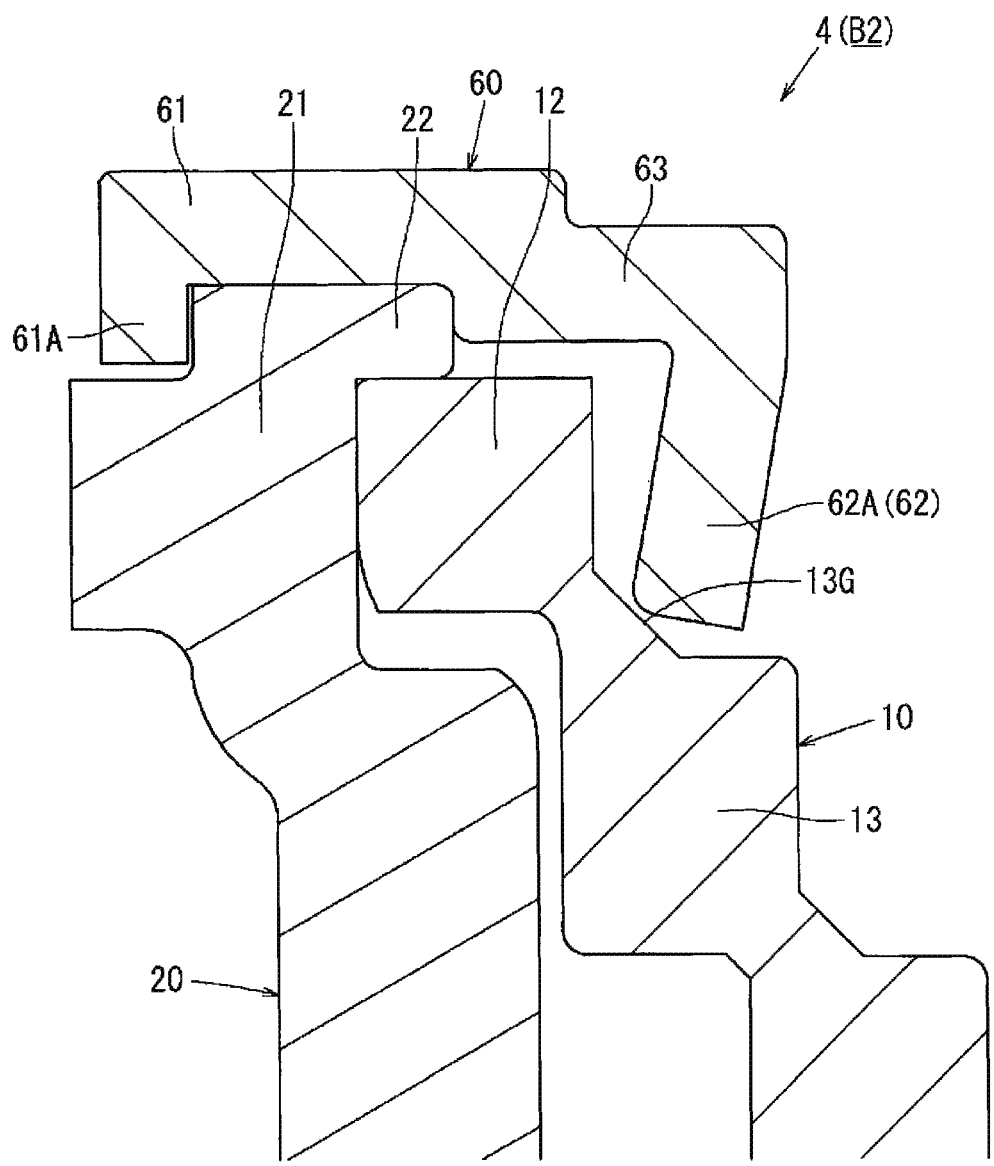
FIG. 31 is a cross-sectional view taken along a line XXXI-XXXI in FIG. 30.
Figure 32:
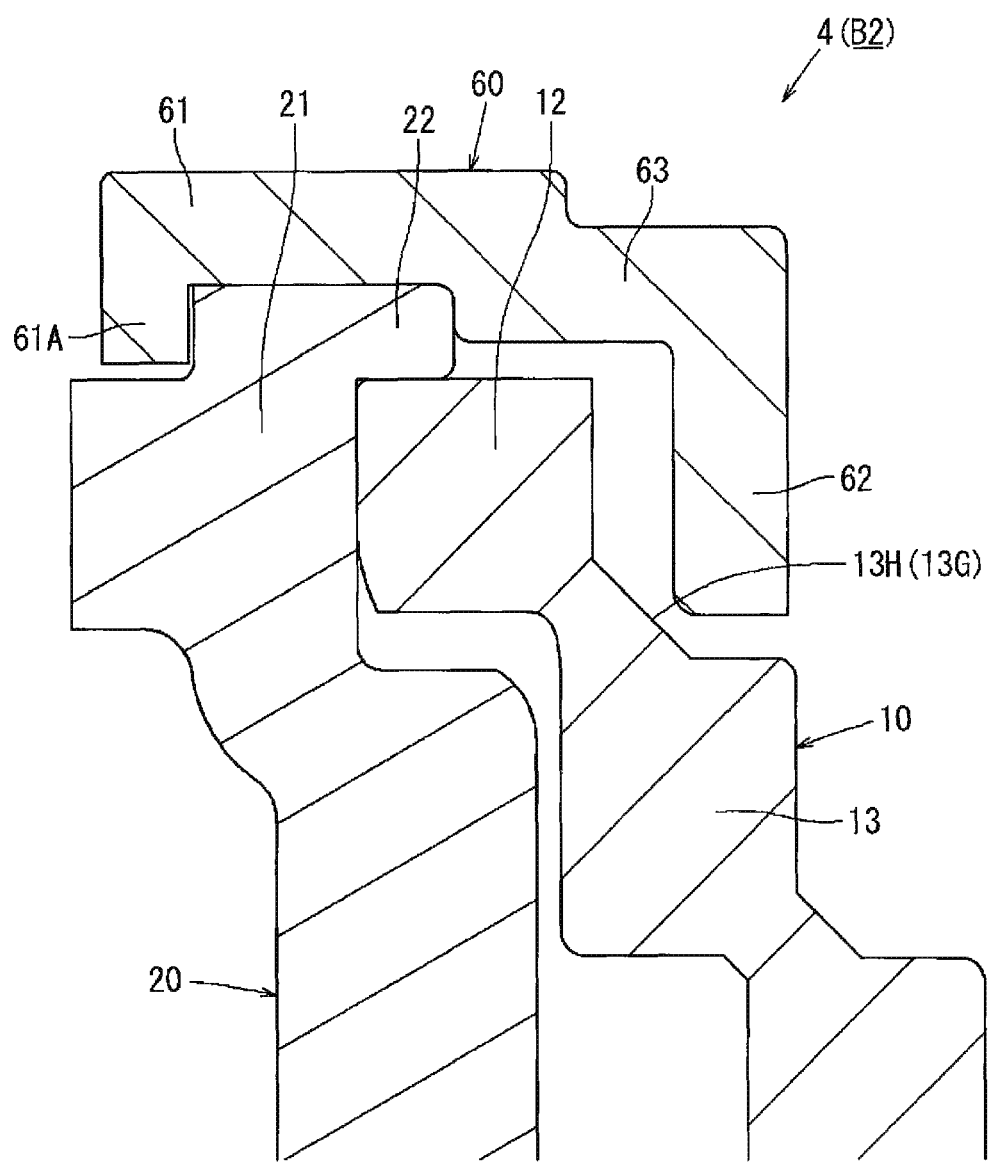
FIG. 32 is a cross-sectional view taken along a line XXXII-XXXII in FIG. 30.

The outer circumferential ring 60 is configured such that, as shown in FIG. 29, when the backrest angle of the seat back 2 is shifted to an angular region deviated forward from the abutting region B1 shown in FIG. 21, as shown in FIGS. 30 to 32, the protruding inclined surfaces 13H formed on the inclined surface 13G of the ratchet 10 are deviated in the rotation direction from the corresponding oblique abutting portion 62A of the flange portion 62. Accordingly, the outer circumferential ring 60 is in a non-abutting state (non-abutting region B2) in which the inclined surface 13G of the ratchet 10 faces each oblique abutting portion 62A of the flange portion 62 with a slight gap.

In the non-abutting state, an effect of preventing rattling of the ratchet 10 by the outer circumferential ring 60 is weak, but the ratchet 10 can be smoothly and rotationally moved with respect to the guide 20 by the effect. Therefore, when the seat back 2 is in the angular region in which the seat back 2 is forward tilted, although a force for erecting the seat back 2 rearward is large, the seat back 2 can be relatively smoothly erected rearward.

<Rattle Prevention Structure of Main Pawl P1>

The main pawl P1 has a rattle prevention structure in which, as shown in FIG. 34, when the main pawl P1 is pressed by the rotation cam 40 and meshed with the inner teeth 12A of the ratchet 10, the main pawl P1 is slightly inclined so as to be pulled between the guide walls 23 on both sides to prevent the rattling in the rotation direction. Hereinafter, the rattle prevention structure of the main pawl P1 will be described in detail.

On the main pawl P1, a first protrusion 35A protruding toward the facing guide wall 23 is formed on a side portion of the main body surface portion 30A of the main pawl P1 on the shown counterclockwise direction side. A second protrusion 35B protruding toward the facing guide wall 23 is also formed on a side portion of the main body surface portion 30A of the main pawl P1 on the shown clockwise direction side.

The first protrusion 35A is formed at a position closer to an inner side than a center in the radial direction on the side portion of the main body surface portion 30A of the main pawl P1 on the shown counterclockwise direction side. The first protrusion 35A protrudes in the shown counterclockwise direction in a convex curving surface shape in a cross section over an entire region of the main pawl P1 in the plate thickness direction. The second protrusion 35B is formed at an outer end portion position in the radial direction on the side portion of the main body surface portion 30A of the main pawl P1 on the shown clockwise direction side. The second protrusion 35B protrudes in the shown clockwise direction in a trapezoidal shape in the cross section over the entire region of the main pawl P1 in the plate thickness direction.

Figure 35:
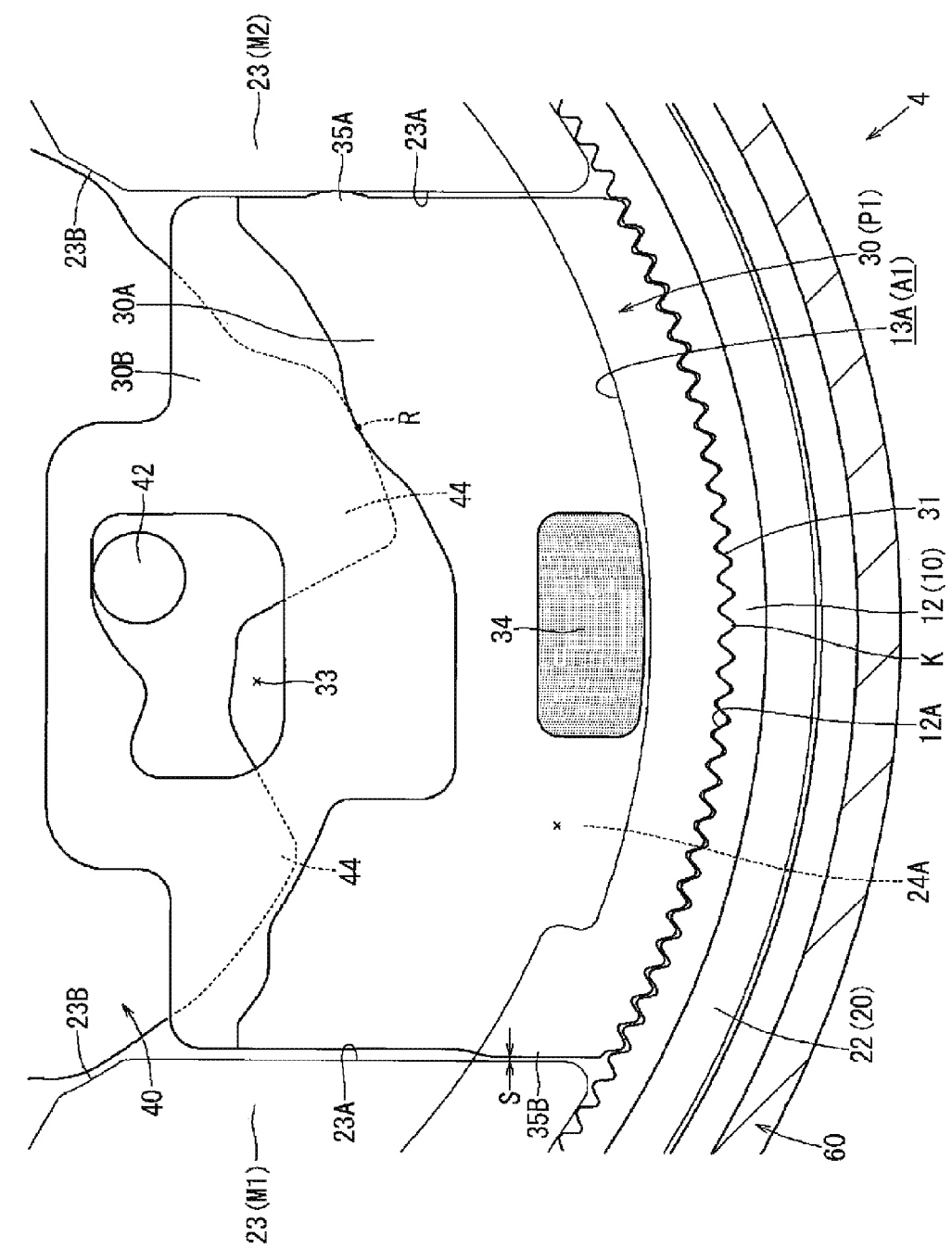
FIG. 35 is a cross-sectional view corresponding to FIG. 34 and showing a meshing state in which a first protrusion is abutted against the guide wall.

As shown in FIG. 35, the main pawl P1 has a configuration in which a gap S in the rotation direction is set between the main pawl P1 and the guide walls 23 on both sides of the main pawl P1 in order to ensure sliding performance inward and outward in the radial direction of the main pawl P1. However, by setting the gap S, when the main pawl P1 is pushed outward in the radial direction by the rotation cam 40 as described above in FIG. 10, the rattling may occur in which the main pawl P1 is inclined in the rotation direction between both the guide walls 23.

Specifically, as shown in FIG. 35, the main pawl P1 is configured to be pressed outward from the inner side in the radial direction by the rotation cam 40 at a pressing point R that is eccentric in the shown counterclockwise direction from a central position in the rotation direction. Therefore, the main pawl P1 is configured to be pushed out to a position at which the main pawl P1 is meshed with the inner teeth 12A of the ratchet 10 by a pressing force while the main pole P1 itself rotates in the shown clockwise direction between both the guide walls 23 with the pressing point R as a fulcrum. Alternatively, the main pawl P1 is configured such that, after the central tooth surface is meshed with the inner teeth 12A of ratchet 10, the main pawl P1 is rotatable itself in the shown clockwise direction with a meshing point K of the central tooth surface that is meshed most deeply with the inner teeth 12A as a fulcrum.

When the main pawl P1 rotates as described above, the main pawl P1 is inclined so as to be pulled between both the guide walls 23, and the main pawl P1 can be brought to a state in which the rattling in the rotation direction is reduced. However, when the inclination is large, the main pawl P1 may be moved such that a tooth surface on one end side, centering on the central tooth surface of the outer teeth 31 that is meshed most deeply with the inner teeth 12A of ratchet 10, reduces in a meshing depth with the inner teeth 12A. Therefore, in order to prevent occurrence of such a problem, the main pawl P1 has a configuration in which, when the main pawl P1 is inclined between both the guide walls 23, the first protrusion 35A and the second protrusion 35B are respectively abutted against the guide walls 23 on both sides, so that the main pawl P1 is not greatly inclined, and the rattling in the rotation direction can be reduced.

Specifically, as shown in FIG. 35, when the maim pawl P1 is pressed outward from the inner side in the radial direction by the rotation cam 40, the main pawl P1 is rotated in the shown clockwise direction. However, by the main pawl P1 rotating, the first protrusion 35A is abutted with the facing guide wall 23, and thus the rotation of the main pawl P1 in the same direction is stopped at an early stage. Then, when the main pawl P1 is meshed with the inner teeth 12A of the ratchet 10 from that state, a rotational force in the shown clockwise direction around the meshing point K between the central tooth surface of the outer teeth 31 and the inner tooth 12A is applied to the main pawl P1 by a force applied from the pressing point R.

Figure 36:
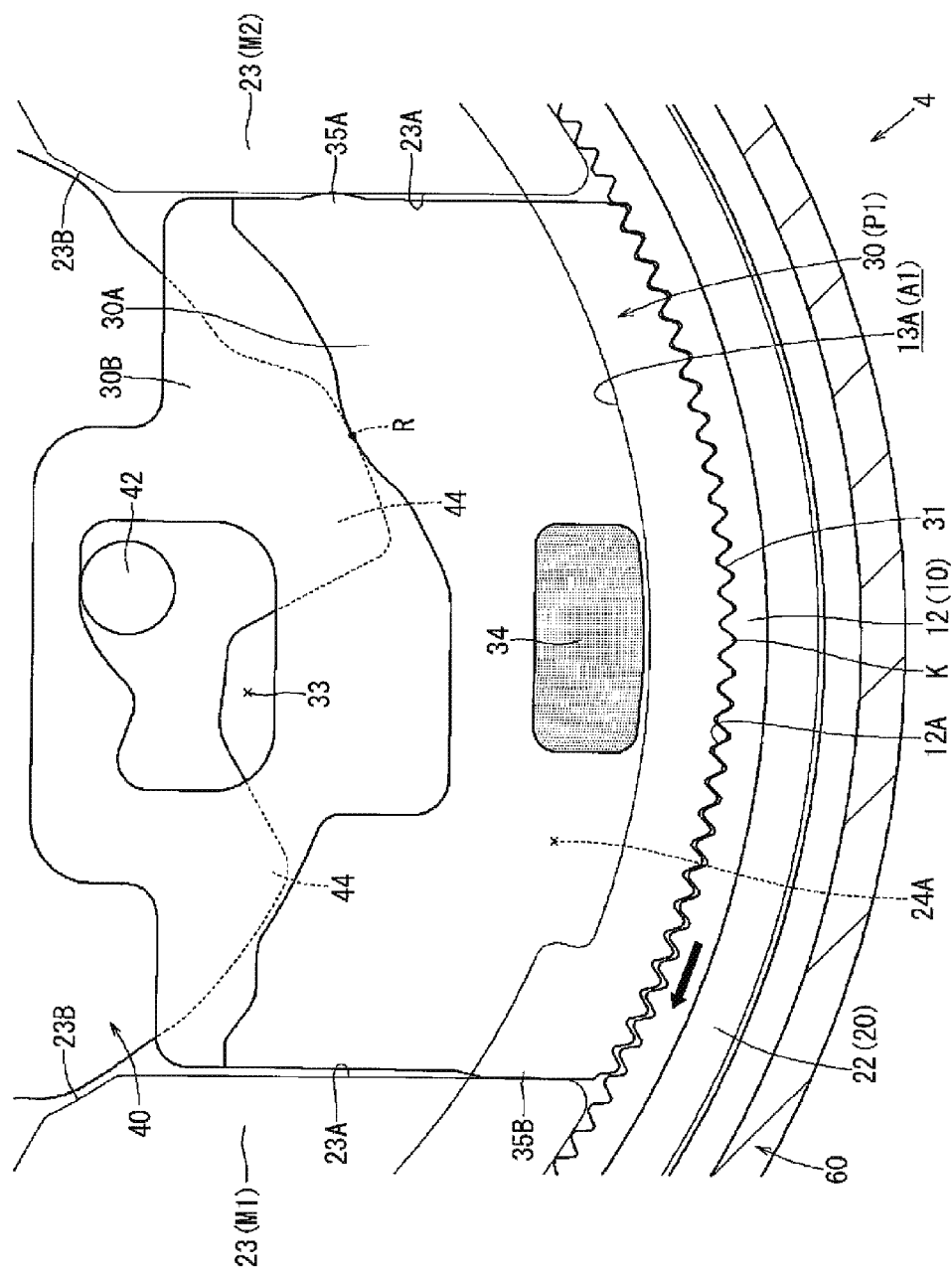
FIG. 36 is a cross-sectional view showing a state in which the ratchet is rotated in a shown counterclockwise direction from FIG. 35 to a position where a second protrusion is abutted against the guide wall.

Accordingly, the main pawl P1 is applied with a pressing force with the above rotational force on the guide wall 23 on a side with which the first protrusion 35A is abutted. Then, as a reaction, the main pawl P1 is applied with a rotational force for pressing and rotating the inner teeth 12A against which the central tooth surface (meshing point K) is abutted to the shown clockwise direction with an abutting point between the first protrusion 35A and the guide wall 23 as a fulcrum. Then, accordingly, as shown in FIG. 36, the main pawl P1 is slightly rotated in the shown clockwise direction with the abutting point between the first protrusion 35A and the guide wall 23 as the fulcrum and pushes and rotates the ratchet 10 in the same direction, and thus the second protrusion 35B is abutted against the facing guide wall 23.

The rotation of the main pawl P1 is stopped at an early stage by abutting of the second protrusion 35B against the guide wall 23. Then, by abutting, the main pawl P1 is meshed with the inner teeth 12A of the ratchet 10 in a state in Which the rattling of the main pawl P1 in the rotation direction between both the guide walls 23 is reduced.

As described above, a structure in which the first protrusion 35A and the second protrusion 35B of the main pawl P1 are abutted against the guide walls 23 on each side appropriately prevents the rattling in which the main pawl P1 is inclined in the rotation direction between both the guide walls 23. Accordingly, the tooth surfaces on both ends of the outer teeth 31 of the main pawl P1 can be held in a well-balanced meshing state of being meshed with the inner teeth 12A of the ratchet 10 without making meshing on one side shallow.

Any phenomenon in the abutment of the main pawl P1 against the guide wall 23 on each side and the meshing of the central tooth surface (meshing point K) of the outer teeth 31 with the inner teeth 12A of the ratchet 10 may occur first. That is, no matter which phenomenon occurs first, a reaction caused by the phenomenon causes the other of the abutment and meshing. As described above, the main pawl P1 is meshed with the ratchet 10 in a state in which the rattling between the main pawl P1 and the guide 20 in the rotation direction is reduced, thus even there is rattling between other sub pawls P2 as described in FIG. 10 and the guide 20 in the rotation direction, the rattling in the rotation direction between the ratchet 10 and the guide 20 can be appropriately reduced.

<Priority Lock Structure of Main Pawl P1>

Figure 37:
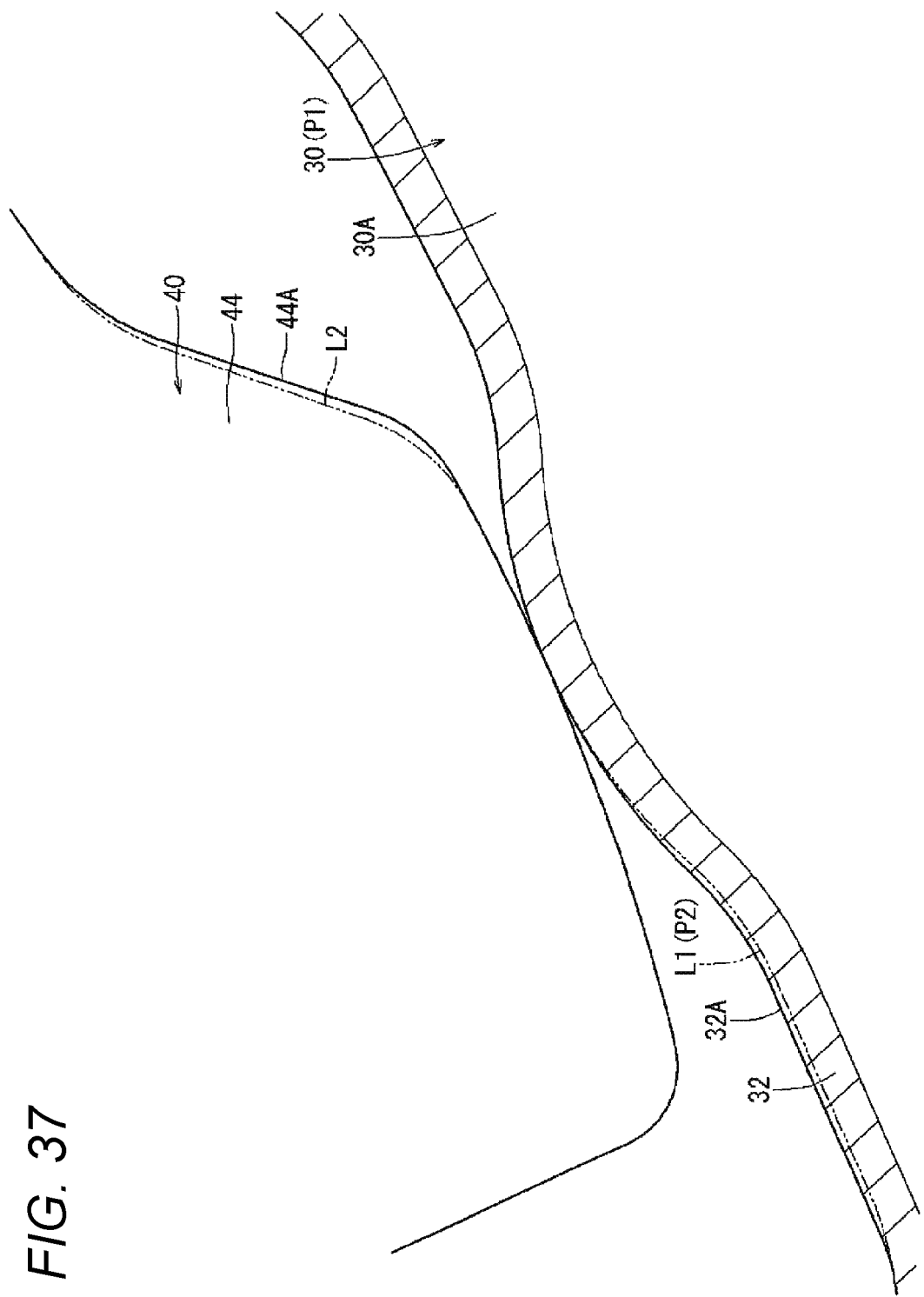
FIG. 37 is an enlarged partial cross-sectional view of each contact surface of a portion XXXVII in FIG. 34.

The main pawl P1 having the rattle prevention structure in the rotation direction is configured to mesh with the inner teeth 12A of the ratchet 10 before the other two sub pawls P2 by the rotation cam 40. Specifically, as shown in FIG. 37, the pressed surface portion 32 of the main pawl P1 pressed from the inner side in the radial direction by the rotation cam 40 is formed with a bulging portion 32A bulging to the inner side in the radial direction than the pressed surface portions 32 of the other two sub pawls P2. In the figure, in order to make it easy to compare a difference in shape between the main pawl P1 and the other two sub pawls P2, a line L1 indicating a shape of the pressed surface portion 32 of the other two sub pawls P2 is superimposed on the pressed surface portion 32 of the main pawl P1 by a virtual line.

In addition, the pressing portion 44 of the rotation cam 40 that presses the main pawl P1 from the inner side in the radial direction is also formed with a bulging portion 44A bulging to the outer side in the radial direction than the pressing portions 44 that press the other two sub pawls P2. In this regard, in order to make it easy to compare a difference in shape between the pressing portion 44 that presses the main pawl P1 and the pressing portions 44 that press the other two sub pawls P2, a line L2 indicating a shape of the pressing portions 44 that press the other two sub pawls P2 is superimposed on the pressing portion 44 of the rotation cam 40 that presses the main pawl P1 by a virtual line.

Since the bulging portions 32A and 44A are formed on the pressed surface portion 32 of the main pawl P1 and the pressing portion 44 of the rotation cam 40 that presses the pressed surface portion 32 from the inner side in the radial direction, the main pawl P1 is pushed out so as to mesh with the inner teeth 12A of the ratchet 10 by the rotation of the rotation cam 40 earlier than the other two sub pawls P2 (see FIG. 10 and the like). Therefore, since the main pawl P1 does not mesh with the inner teeth 12A of the ratchet 10 after the other two sub pawls P2 mesh with the inner teeth 12A of the ratchet 10, as described above, the main pawl P1 can appropriately mesh with the inner teeth 12A of the ratchet 10 in a state in which the main pawl P1 is appropriately inclined between both the guide walls 23 in accordance with the rotation of the rotation cam 40 and the rattling in the rotation direction is reduced.

Specifically, the main pawl P1 is pushed out by the rotation cam 40 so that the outer teeth 31 enter the inner teeth 12A of the ratchet 10 by bulging of the bulging portions 32A and 44A earlier than the other two sub pawls P2. Therefore, the main pawl P1 can be more reliably meshed with the inner teeth 12A of the ratchet 10 earlier than the other two sub pawls P2. In addition, since the bulging portions 32A and 44A are formed on the pressed surface portion 32 of the main pawl P1 and the pressing portion 44 of the rotation cam 40, respectively, sizes of the bulging portions 32A and 44A formed on the pressed surface portion 32 and the pressing portion 44, respectively, can be reduced as compared with a configuration in which the bulging portion is formed on only one of the pressed surface portion 32 and the pressing portion 44. Accordingly, it is possible to prevent each basic structure from being largely broken, and it is possible to prevent problems such as a decrease in strength from occurring.

Summary

In summary, the seat reclining device 4 according to the present embodiment has the following configuration. In the following description, reference signs in parentheses correspond to respective configurations shown in the above embodiment.

That is, the vehicle seat reclining device (4) includes: the ratchet (10) and the guide (20) assembled in the axial direction so as to be rotatable relative to each other; a plurality of pawls (30) that are supported from both sides in the rotation direction by a pair of guide walls (23) provided on the guide (20), mesh with the ratchet (10) by movement of being pushed outward in the radial direction, and are arranged in the rotation direction that restrict the relative rotation between the ratchet (10) and the guide (20); and the cam (40) that pushes and moves the plurality of pawls (30) outward from the inner side in the radial direction.

One of the plurality of pawls (30) is the main pawl (P1) having the rattle preventing structure that reduces rattling in the rotation direction by bringing the pawl (30) into contact with both of the pair of guide walls (23) by being pushed and moved by the cam (40). At least one of the main pawl (P1) and the pressing portion (44) of the cam (40) that presses the main pawl (P1) from the inner side in the radial direction includes the bulging portions (32A, 44A) having a shape in which surfaces of the main pawl (P1) and the pressing portion (44) that abut against the other side bulge toward the other side so that the main pawl (P1) is largely pushed outward in the radial direction more than another pawl (P2).

According to the above configuration, the main pawl (P1) having the rattle preventing structure in the rotation direction can be meshed with the ratchet (10) by the bulging portions (32A, 44A) earlier than the another pawl (P2). Therefore, even if the gap (S) for ensuring sliding performance is provided between the pawl (30) and the guide wall (23), the pawl (30) can be meshed with the ratchet (10) in a state where rattling is appropriately reduced.

The main pawl (P1) is pushed out such that the outer teeth (31) of the main pawl (P1) enter the inner teeth (12A) of the ratchet (10) by the bulging portions (32A, 44A) before the another pawl (P2). According to the above configuration, the main pawl (P1) can be more reliably meshed with the ratchet (10).

The main pawl (P1) has a structure in which the main pawl (P1) is inclined in the rotation direction between the pair of guide walls (23) so that the main pawl (P1) contacts both of the pair of guide walls (23) when the main pawl (P1) is pressed from the inner side in the radial direction as the rattle prevention structure. According to the above configuration, even when the main pawl (P1) is of an inclination type in which the rattling is hardly reduced after the another pawl (P2) meshes with the ratchet (10), the main pawl (P1) can be meshed with the ratchet (10) in a state where the rattling is appropriately reduced.

The bulging portions (32A, 44A) are provided on both the main pawl (P1) and the pressing portion (44). According to the above configuration, the sizes of the bulging portions (32A, 44A) formed on the main pawl (P1) and the pressing portion (44), respectively, can be reduced as compared with a configuration in which the bulging portion is formed on only one of the main pawl (P1) and the pressing portion (44). Accordingly, it is possible to prevent each basic structure from being largely broken, and it is possible to prevent problems such as a decrease in strength from occurring.

Other Embodiments

Although the embodiment of the present invention is described using one embodiment, the present invention can be implemented in various forms other than the above embodiment.

1. The vehicle seat reclining device of the present invention can be applied to a seat other than a right seat of an automobile, and can also be widely applied to a seat provided for a vehicle other than an automobile such as a railway, or various vehicles such as an aircraft and a ship. The vehicle seat reclining device may couple the seat back to the seat cushion in a state in Which the backrest angle can be adjusted, and may also couple the seat back to a base, such as a bracket fixed to a vehicle main body side, in a state in which the backrest angle can be adjusted.
2. The vehicle seat reclining device may be configured such that the ratchet is coupled to the base fixed to a vehicle main body side, such as a seat cushion, and the guide is coupled to the seat back.
3. Two or four or more pawls that lock the relative rotation between the ratchet and the guide may be provided side by side in the rotation direction. That is, one main pawl and one other pawl may be provided, or one main pawl may be provided with three or more other pawls. An arrangement of the pawls in the rotation direction is not limited to an even arrangement, and the pawls may be arranged in a biased manner.
4. The cam that pushes and moves the pawls outward from the inner side in the radial direction is not limited to a rotation type configuration, and may be a sliding type configuration in which the cam pushes the pawls outward in the radial direction by sliding in the radial direction, as disclosed in JP-A-2014-217662 or the like. In addition, an operation of pulling back the pawls inward in the radial direction may be performed using a member separated from the cam such as a release plate as disclosed in JP-A-2015-227071 or the like.
5. The rattle prevention structure of the main pawl may be configured such that the main pawl is obliquely pressed in the rotation direction by the cam and is inclined in a shape to be pulled between both the guide walls. In addition, as disclosed in JP-A-2016-215999 and the like, the rattle prevention structure of the main pawl may be a structure in which the main pawl is divided into two parts in the rotation direction, and the main pawl slides between both the guide walls so as to widen an entire width, thereby preventing the rattling.
6. The bulging portion may be formed on both the main pawl and the cam that presses the main pawl, or may be formed on only one of the main pawl and the cam. In addition, a bulging shape of the bulging portion is not limited to a specific shape, and various rising shapes can be applied.

The present application is based on a Japanese Patent Application No. 2019-215013 filed on Nov. 28, 2019, and the contents thereof are incorporated herein by reference.

INDUSTRIAL APPLICABILITY

According to the vehicle seat reclining device of the present invention, the sliding performance of the pawl can be ensured and the rattling can be prevented at the same time. The present invention having the effect can be used, for example, as a seat reclining device used in a seat of an automobile or the like.

REFERENCE SIGNS LIST 1 seat
2 seat back
2F side frame
2Fa fitting hole
2Fb penetrating hole
2Fc locking plate
3 seat cushion
3F reclining plate
3Fa fitting hole
3Fb penetrating hole
3Fc front stopper
3Fd rear stopper
4 seat reclining device (vehicle seat reclining device)
5 reclining lever
5A operation pin
5B connecting rod
6 return spring
10 ratchet
11 disk main body
11A through hole
11B expanded surface portion
12 cylindrical portion
12A inner teeth
13 intermediate cylindrical portion
13A first region
13B second region
13C third region
13D first convex portion
13E second convex portion
13E1 relief concave portion
Y gap
13G inclined surface
13H protruding inclined surface
13H1 guide inclined surface
A1 lock region
A2 free region
A3 relief region
A4 coupling region
14 dowel
B1 abutting region
B2 non-abutting region
20 guide
21 disk main body
21A through hole
21Aa hook hole
21B dowel
22 cylindrical portion
23 guide wall
23A regulating surface
23B support surface
M1 guide wall
M2 guide wall
T gap
24A pawl accommodating groove
24B cam accommodating groove
30 pawl
30A main body surface portion
30B offset surface portion
31 outer teeth
32 pressed surface portion
32A bulging portion
33 pull-in hole
34 ride-up protrusion
34A outer circumferential surface portion
35A first protrusion
35B second protrusion
P1 main pawl
P2 sub pawl (another pawl)
Q accuracy control surface
40 rotation cam (cam)
41 through hole
42 pull-in pin 43 hook pin
44 pressing portion
44A bulging portion
50 lock spring
51 inner end portion
52 outer end portion
60 outer circumferential ring
61 coupling portion
61A crimped portion
62 flange portion
62A oblique abutting portion
63 stepped portion
C rotation center
Pa forward tilt position
Pb initial lock position
Pc rearward tilt position
Pd torso angle
K meshing point
R pressing point
S gap
L1 line
L2 line

The invention claimed is:

1. A vehicle seat reclining device comprising:
a ratchet and a guide assembled in an axial direction thereof to be rotatable relative to each other;
a plurality of pawls that are supported from both sides in a relative rotation direction of the ratchet and the guide by a pair of guide walls provided on the guide, mesh with the ratchet by movement of being pushed outward in a radial direction of the guide, and are arranged in the relative rotation direction and restrict relative rotation between the ratchet and the guide; and
a cam that includes pressing portions corresponding to the pawls and pushes and moves the plurality of pawls outward from an inner side in the radial direction, wherein
one of the plurality of pawls is a main pawl having a rattle preventing structure that reduces rattling of the main pawl in the relative rotation direction by bringing the pawl into contact with both of the pair of guide walls in a case where the main pawl is pushed and moved by the cam,
the main pawl includes a bulging portion configured to abut against the pressing portion,
each of the pawls other than the main pawl do not include a portion corresponding to the bulging portion of the main pawl, and
the main pawl is pushed out with the bulging portion such that outer teeth of the main pawl enter inner teeth of the ratchet before outer teeth of the other pawls enter inner teeth of the ratchet.

2. The vehicle seat reclining device according to claim 1, wherein
the main pawl has a rattle prevention structure in which the main pawl is inclined in the relative rotation direction between the pair of guide walls so that the main pawl contacts both of the pair of guide walls when the main pawl is pressed from the inner side in the radial direction.

3. The vehicle seat reclining device according to claim 1, wherein
another bulging portion is provided on the cam at a position corresponding to the main pawl.

4. A vehicle seat reclining device comprising:
a ratchet and a guide assembled in an axial direction thereof to be rotatable relative to each other;
a plurality of pawls that are supported from both sides in a relative rotation direction of the rachet and the guide by a pair of guide walls provided on the guide, mesh with the ratchet by movement of being pushed outward in a radial direction of the guide, and are arranged in the relative rotation direction and restrict relative rotation between the ratchet and the guide; and
a cam that includes pressing portions corresponding to the pawls and that pushes and moves the corresponding pawls outward from an inner side in the radial direction, wherein
one of the plurality of pawls is a main pawl having a rattle preventing structure that reduces rattling of the main pawl in the relative rotation direction by bringing the pawl into contact with both of the pair of guide walls in a case where the main pawl is pushed and moved by one of the pressing portions which corresponds to the main pawl,
at least one of the main pawls and the one of the pressing portions includes a bulging portion, and
the main pawl is pushed out with the bulging portion such that outer teeth of the main pawl enter inner teeth of the ratchet before outer teeth of the other pawls enter inner teeth of the ratchet.

* * * * *